(12) United States Patent
Kuhara

(10) Patent No.: US 10,964,218 B2
(45) Date of Patent: Mar. 30, 2021

(54) METHOD FOR ASSIGNING CONTROL RIGHT FOR AUTONOMOUS VEHICLE, AND COMPUTER AND RECORDING MEDIUM FOR EXECUTING SUCH METHOD

(71) Applicant: Panasonic Intellectual Property Corporation of America, Torrance, CA (US)

(72) Inventor: Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 27 days.

(21) Appl. No.: 16/052,128

(22) Filed: Aug. 1, 2018

(65) Prior Publication Data
US 2019/0066516 A1    Feb. 28, 2019

(30) Foreign Application Priority Data

Aug. 24, 2017  (JP) .............................. JP2017-160878
Sep. 5, 2017   (JP) .............................. JP2017-170095
Apr. 18, 2018  (JP) .............................. JP2018-079977

(51) Int. Cl.
G05D 1/00     (2006.01)
G08G 1/00     (2006.01)
(Continued)

(52) U.S. Cl.
CPC ............. G08G 1/202 (2013.01); B60W 40/08 (2013.01); G05D 1/0016 (2013.01);
(Continued)

(58) Field of Classification Search
CPC .................. G08G 1/202; B60W 40/08; B60W 2040/0809; G05D 1/0016; G05D 1/0027;
(Continued)

(56) References Cited

U.S. PATENT DOCUMENTS 9,256,852 B1    2/2016  Myllymaki
10,315,763 B2*  6/2019  Anand .................. B64C 39/024
(Continued)

FOREIGN PATENT DOCUMENTS

WO    2015/099679 A1    7/2015

OTHER PUBLICATIONS

The Extended European Search Report dated Sep. 28, 2018 for European Patent Application No. 18184458.0.

*Primary Examiner* — James M McPherson
*Assistant Examiner* — Tiffany P Ohman
(74) *Attorney, Agent, or Firm* — Greenblum & Bernstein, P.L.C.

(57) ABSTRACT

A method for assigning control rights for an autonomous vehicle is provided. The method includes acquiring, via a network, identification information for identifying a user or a terminal of the user, and dispatch request information that indicates a dispatch request for an autonomous vehicle issued by the user. The method further includes selecting the autonomous vehicle to be dispatched to the user from among a plurality of autonomous vehicles, based on the dispatch request information. Thereafter, the method assigns a control right for the selected autonomous vehicle, to the user or the terminal, based on the identification information.

19 Claims, 44 Drawing Sheets

(51) Int. Cl.
  *G06Q 50/30*   (2012.01)
  *B60W 40/08*   (2012.01)
  *G06Q 10/02*   (2012.01)

(52) U.S. Cl.
  CPC ......... *G05D 1/0027* (2013.01); *G05D 1/0088* (2013.01); *G06Q 10/02* (2013.01); *G06Q 50/30* (2013.01); *B60W 2040/0809* (2013.01); *G05D 2201/0213* (2013.01)

(58) Field of Classification Search
  CPC ......... G05D 1/0088; G05D 2201/0213; G06Q 10/02; G06Q 50/30
  USPC .......................................................... 701/1
  See application file for complete search history.

(56) References Cited

U.S. PATENT DOCUMENTS

| | | | | |
|---|---|---|---|---|
| 2016/0301698 A1* | 10/2016 | Katara | ................... | G07B 13/02 |
| 2018/0113470 A1* | 4/2018 | Iagnemma | ........... | G05D 1/0088 |
| 2019/0367036 A1* | 12/2019 | Brombach | ......... | G06K 9/00832 |

* cited by examiner

FIG. 3

| USER IDENTIFICATION INFORMATION | USER CONTACT ADDRESS INFORMATION |
|---|---|
| A | AAA@xxx.yyy.com |
| B | BBB@xxx.yyy.com |
| C | CCC@xxx.yyy.com |

FIG. 4

| VEHICLE IDENTIFICATION INFORMATION | VEHICLE LOCATION INFORMATION | VEHICLE STATE INFORMATION |
|---|---|---|
| a | (a11 DEGREES, a12 MINUTES, a13 SECONDS NORTH AND a14 DEGREES, a15 MINUTES, a16 SECONDS EAST) | EMPTY |
| b | (b11 DEGREES, b12 MINUTES, b13 SECONDS NORTH AND b14 DEGREES, b15 MINUTES, b16 SECONDS EAST) | MID-DELIVERY |
| c | (c21 DEGREES, c22 MINUTES, c23 SECONDS NORTH AND c24 DEGREES, c25 MINUTES, c26 SECONDS EAST) | EMPTY |
| d | (d21 DEGREES, d22 MINUTES, d23 SECONDS NORTH AND d24 DEGREES, d25 MINUTES, d26 SECONDS EAST) | MID-DELIVERY |

FIG. 5

| DISPATCH REQUEST IDENTIFICATION NUMBER | DELIVERY SOURCE OR DELIVERY DESTINATION | CONTROL-POSSIBLE LOCATION | USER IDENTIFICATION INFORMATION | VEHICLE IDENTIFICATION INFORMATION OF DELIVERY VEHICLE |
|---|---|---|---|---|
| 1 | DELIVERY SOURCE | (x11 DEGREES, x12 MINUTES, x13 SECONDS NORTH AND x14 DEGREES, x15 MINUTES, x16 SECONDS EAST) | A | a |
|   | DELIVERY DESTINATION | (y11 DEGREES, y12 MINUTES, y13 SECONDS NORTH AND y14 DEGREES, y15 MINUTES, y16 SECONDS EAST) | B |   |
| 2 | DELIVERY SOURCE | (x21 DEGREES, x22 MINUTES, x23 SECONDS NORTH AND x24 DEGREES, x25 MINUTES, x26 SECONDS EAST) | C | b |
|   | DELIVERY DESTINATION | (y21 DEGREES, y22 MINUTES, y23 SECONDS NORTH AND y24 DEGREES, y25 MINUTES, y26 SECONDS EAST) | C |   |

FIG. 15
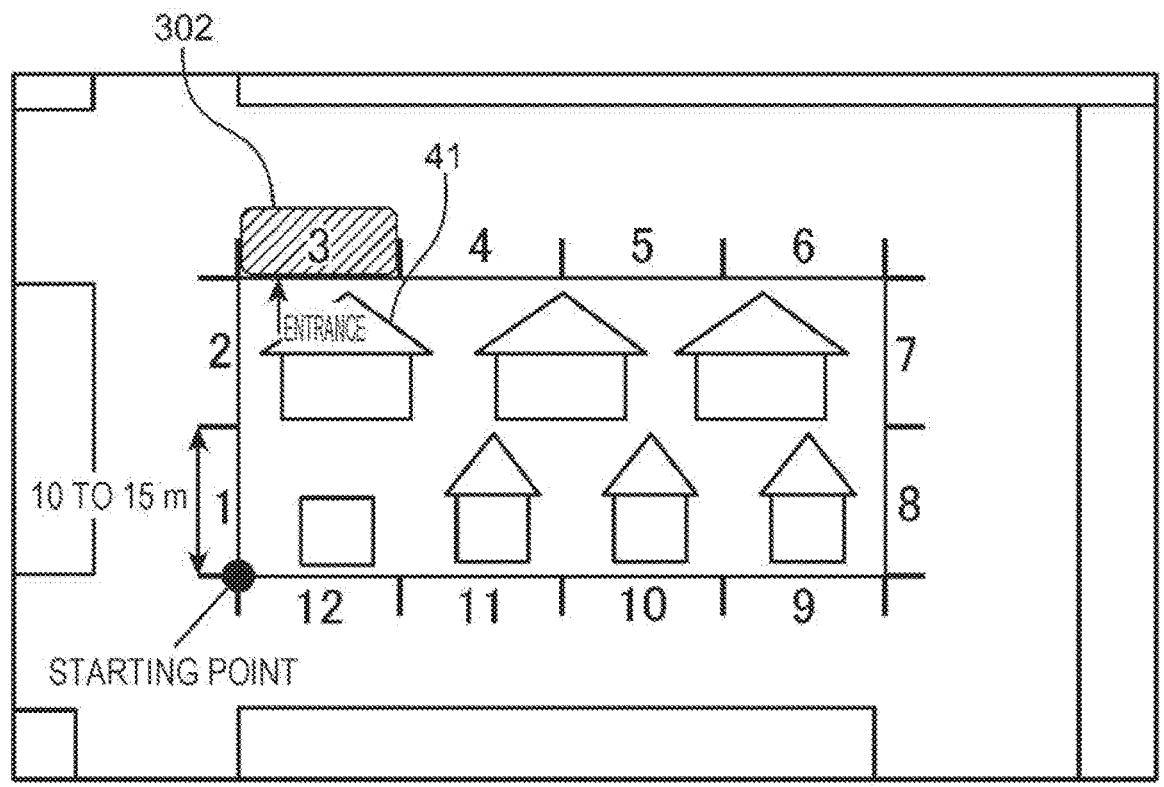
FIG. 16
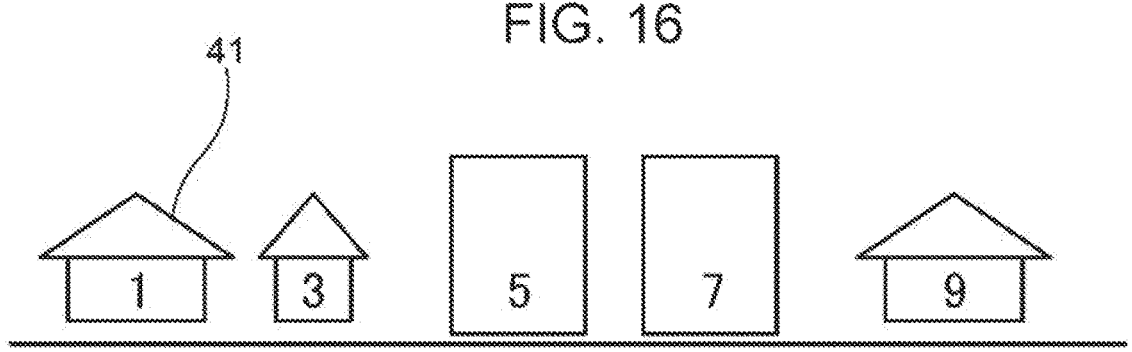
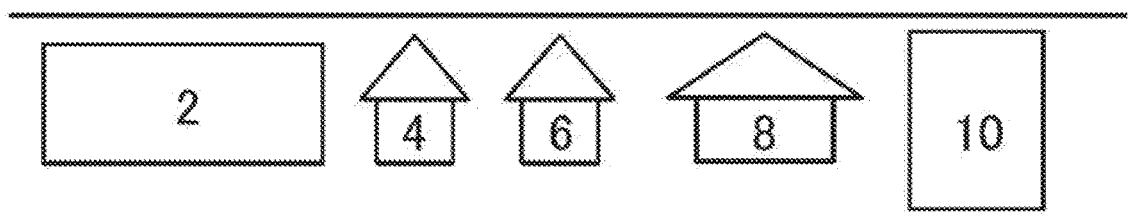

FIG. 22

| DISPATCH REQUEST IDENTIFICATION NUMBER | DELIVERY SOURCE OR DELIVERY DESTINATION | EXPECTED ARRIVAL TIME | USER IDENTIFICATION INFORMATION | VEHICLE IDENTIFICATION INFORMATION OF DELIVERY VEHICLE |
|---|---|---|---|---|
| 1 | DELIVERY SOURCE | 15:30 | A | a |
|   | DELIVERY DESTINATION | 16:00 | B |   |
| 2 | DELIVERY SOURCE | 17:00 | C | b |
|   | DELIVERY DESTINATION | 18:00 | C |   |

FIG. 24

| DELIVERY STATUS | CONTROL RIGHT SETTING ALTERATION PROCESSING |
|---|---|
| NOT YET ARRIVED AT DELIVERY SOURCE | DO NOTHING |
| LOADING/BOARDING COMPLETED AT DELIVERY SOURCE | CANCEL SETTING OF CONTROL RIGHT FOR USER TO CONTROL DELIVERY VEHICLE AT DELIVERY SOURCE |
| MOVING FROM DELIVERY SOURCE TO DELIVERY DESTINATION | DO NOTHING |
| UNLOADING/ALIGHTING COMPLETED AT DELIVERY DESTINATION | CANCEL SETTING OF CONTROL RIGHT FOR USER TO CONTROL DELIVERY VEHICLE AT DELIVERY DESTINATION |

FIG. 25

| DELIVERY STATUS | CONTROL RIGHT SETTING ALTERATION PROCESSING |
|---|---|
| NOT YET ARRIVED AT DELIVERY SOURCE | DO NOTHING |
| LOADING/BOARDING COMPLETED AT DELIVERY SOURCE | DO NOTHING |
| MOVING FROM DELIVERY SOURCE TO DELIVERY DESTINATION | DO NOTHING |
| UNLOADING/ALIGHTING COMPLETED AT DELIVERY DESTINATION | CANCEL SETTING OF CONTROL RIGHT FOR USER TO CONTROL DELIVERY VEHICLE AT DELIVERY SOURCE CANCEL SETTING OF CONTROL RIGHT FOR USER TO CONTROL DELIVERY VEHICLE AT DELIVERY DESTINATION |

| LOCATION INFORMATION OF DISPATCH DESTINATION | MOVEMENT DESTINATION LOCATION INFORMATION |
|---|---|
| (LATITUDE A, LONGITUDE A) | (LATITUDE B, LONGITUDE B) |
| (LATITUDE C, LONGITUDE C) | (LATITUDE D, LONGITUDE D) |
| ... | ... |

METHOD FOR ASSIGNING CONTROL RIGHT FOR AUTONOMOUS VEHICLE, AND COMPUTER AND RECORDING MEDIUM FOR EXECUTING SUCH METHOD

BACKGROUND

1. Technical Field

The present disclosure relates to a method for assigning a control right for an autonomous vehicle, and a computer and a recording medium for executing such a method.

2. Description of the Related Art

An autonomous road vehicle having at least one compartment mounted therein is disclosed as prior art (for example, see the specification of U.S. Pat. No. 9,256,852). In the specification of U.S. Pat. No. 9,256,852, an autonomous road vehicle travels to a destination having a package for delivery loaded in at least one partitioned compartment. When the autonomous road vehicle arrives at the destination, the recipient of the package enters a PIN (personal identification number) code into an access system. Thereby, the compartment is unlocked and the recipient is able to receive the package.

SUMMARY

However, in the prior art, further improvement is required in that consideration is not given to whether or not the recipient of the package is able to receive the package from the autonomous road vehicle when the autonomous road vehicle has arrived at the destination.

One non-limiting and exemplary embodiment provides a vehicle control right setting method, a vehicle control right setting device, a vehicle control right setting program, and vehicle control method with which a user of an autonomous vehicle is able to control the autonomous vehicle at a dispatch destination.

In one general aspect, the techniques disclosed here feature a method that includes: (A) acquiring, via a network, identification information for identifying a user or a terminal of the user, and dispatch request information that indicates a dispatch request for an autonomous vehicle issued by the user; (B) selecting the autonomous vehicle to be dispatched to the user from among a plurality of autonomous vehicles, based on the dispatch request information; and (C) assigning a control right for the selected autonomous vehicle, to the user or the terminal, based on the identification information.

According to the present disclosure, a user of an autonomous vehicle is able to control the autonomous vehicle at a dispatch destination.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a drawing depicting an example of user information stored in a user information storage unit in embodiment 1;

FIG. 4 is a drawing depicting an example of vehicle information stored in a vehicle information storage unit in embodiment 1;

FIG. 5 is a drawing depicting an example of control right information stored in a control right information storage unit in embodiment 1;

FIG. 15 is a schematic drawing for describing the delivery source control right exercisable range and the delivery destination control right exercisable range, which are decided using residence indications of the city block method, in embodiment 1;

FIG. 16 is a schematic drawing for describing residence indications according to a road method in embodiment 1;

FIG. 22 is a drawing depicting another example of control right information stored in the control right information storage unit in embodiment 1;

FIG. 24 is a drawing for describing a relationship between a delivery status and control right setting alteration processing when a control right setting alteration is carried out at the delivery source and the delivery destination in embodiment 2;

FIG. 25 is a drawing for describing a relationship between a delivery status and control right setting alteration processing when a control right setting alteration is carried out at the delivery destination in embodiment 2;

Figure 1:
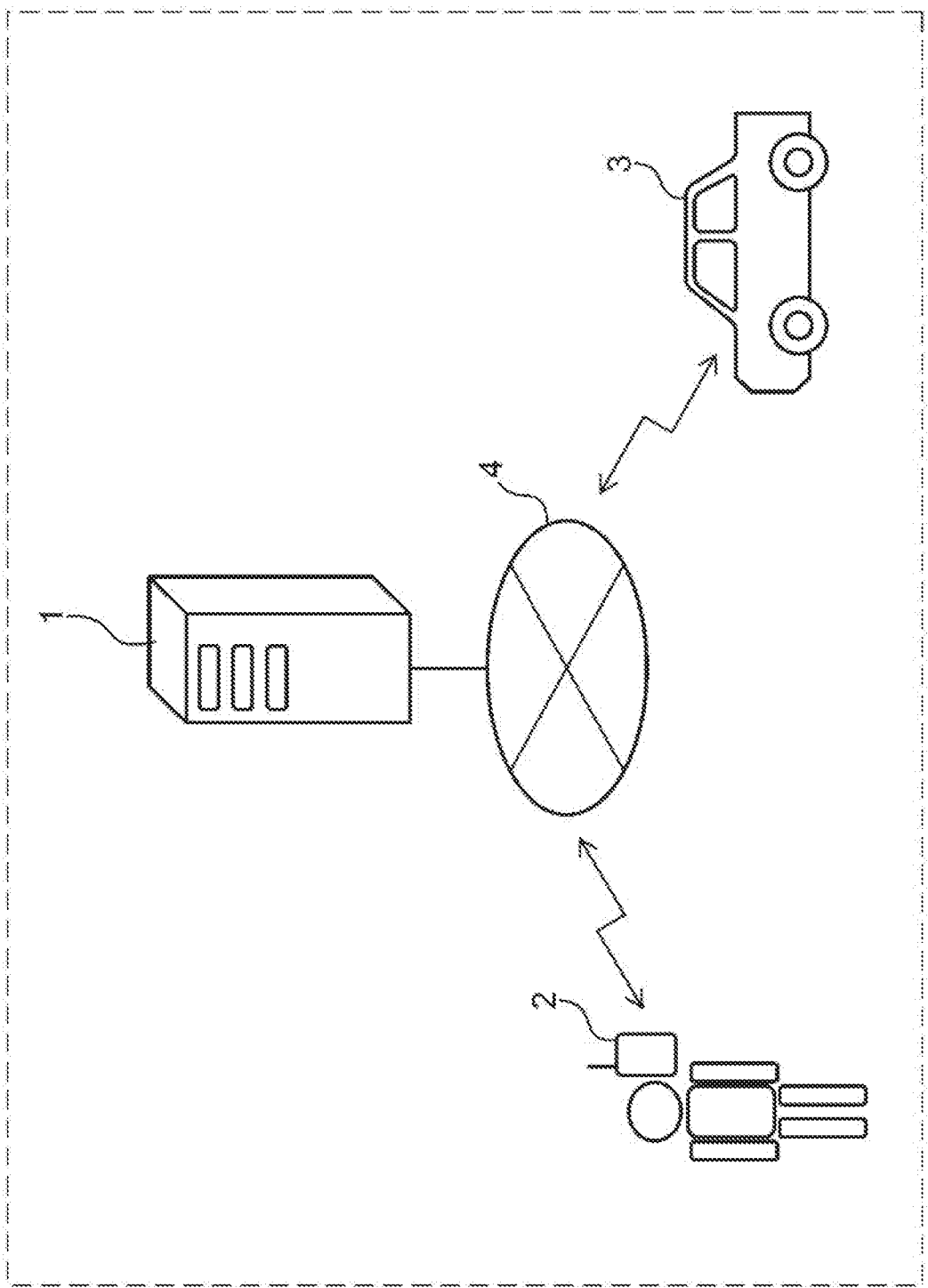
FIG. 1 is a drawing conceptually depicting an overall configuration of a vehicle control system in embodiment 1 of the present disclosure.

DETAILED DESCRIPTION (Underlying Knowledge Forming Basis of the Present Disclosure)

In the prior art, no consideration is given and no disclosure is made at all with respect to whether or not the recipient of a package is able to receive the package from an autonomous road vehicle when the autonomous road vehicle has arrived at the destination. Therefore, in the prior art, there is a risk of the recipient of the package not being able to receive the package from the autonomous road vehicle even though the autonomous road vehicle has arrived at the destination.

For example, in a case where the door of the compartment is facing a fence surrounding a building, a guardrail or a curbstone installed on a road, or the like when the autonomous road vehicle has stopped at the destination, there is a risk of the recipient of the package being obstructed thereby and not being able to take the package out of the compartment.

Furthermore, as another example, in a case where the door of the compartment is facing a sloping surface such as a side ditch like an irrigation channel or an embankment when the autonomous road vehicle has stopped at the destination, there is a risk of the recipient of the package being obstructed thereby and not being able to take the package out of the compartment.

A vehicle control right setting method according to an aspect of the present disclosure is a vehicle control right setting method in a vehicle control right setting device, the method including: acquiring, from an external device, dispatch request information that includes at least location information indicating the location of a dispatch destination to which an autonomous vehicle is to be dispatched, and user identification information for identifying a user who is to use the autonomous vehicle or a user terminal possessed by the user; deciding on a dispatch vehicle representing the autonomous vehicle to be dispatched to the user, on the basis of the dispatch request information; and setting a vehicle control right that permits control of the dispatch vehicle, to the user on the basis of the dispatch request information and the user identification information.

According to this configuration, dispatch request information that includes at least location information indicating the location of a dispatch destination to which an autonomous vehicle is to be dispatched, and user identification information for identifying a user who is to use the autonomous vehicle or a user terminal possessed by the user, are acquired from an external device. A dispatch vehicle representing the autonomous vehicle to be dispatched to the user is decided on the basis of the dispatch request information. A vehicle control right that permits control of the dispatch vehicle is set to the user on the basis of the dispatch request information and the user identification information.

Consequently, a dispatch vehicle representing an autonomous vehicle to be dispatched to the user is decided, and a vehicle control right that permits control of the dispatch vehicle is set to the user, and therefore the user of the autonomous vehicle is able to control the autonomous vehicle at the dispatch destination.

Furthermore, in the aforementioned vehicle control right setting method, in the setting of the vehicle control right, the vehicle control right that permits control of the dispatch vehicle located at the dispatch destination may be set to the user.

According to this configuration, in the setting of the vehicle control right, a vehicle control right that permits control of a dispatch vehicle located at the dispatch destination is set to the user.

Consequently, a vehicle control right that permits control of a dispatch vehicle located at the dispatch destination is set to the user, and therefore the user of the autonomous vehicle is able to control the autonomous vehicle at the dispatch destination.

Furthermore, in the aforementioned vehicle control right setting method, in addition, a control permitted range in which the user is permitted to control the dispatch vehicle at the dispatch destination may be generated on the basis of the location of the dispatch destination, and, in the setting of the vehicle control right, the vehicle control right that permits control of the dispatch vehicle located within the control permitted range may be set to the user.

According to this configuration, a control permitted range in which the user is permitted to control a dispatch vehicle at the dispatch destination is generated on the basis of the location of the dispatch destination. In the setting of the vehicle control right, a vehicle control right that permits control of a dispatch vehicle located within the control permitted range is set to the user.

Consequently, a vehicle control right for a dispatch vehicle located within a control permitted range in which the user is permitted to control the dispatch vehicle at the dispatch destination is set to the user, and therefore the user is able to control the dispatch vehicle located within the control permitted range at the dispatch destination.

Furthermore, in the aforementioned vehicle control right setting method, in addition, a movement control permitted range in which movement of the dispatch vehicle can be controlled by the user at the dispatch destination may be generated on the basis of the location of the dispatch destination, and, in the setting of the vehicle control right, the vehicle control right that permits movement control of the dispatch vehicle within the movement control permitted range may be set to the user.

According to this configuration, a movement control permitted range in which movement of the dispatch vehicle can be controlled by the user at the dispatch destination is generated on the basis of the location of the dispatch destination. In the setting of the vehicle control right, a vehicle control right that permits movement control of the dispatch vehicle within the movement control permitted range is set to the user.

Consequently, a vehicle control right for the dispatch vehicle is set to a user within a movement control permitted range in which the dispatch vehicle can move at the dispatch destination, and therefore the user is able to cause the dispatch vehicle to move within the movement control permitted range at the dispatch destination.

Furthermore, in the aforementioned vehicle control right setting method, in addition, the setting of the vehicle control right may be altered on the basis of a predetermined condition.

According to this configuration, the setting of the vehicle control right is altered on the basis of a predetermined condition, and therefore the setting of the vehicle control right can be altered, and the control right can be set only in a case where control of the dispatch vehicle is required for the user.

Furthermore, in the aforementioned vehicle control right setting method, in addition, delivery status information relating to the status of the dispatch vehicle delivering a delivery object may be acquired from the dispatch vehicle, and, in the altering of the setting of the vehicle control right, the setting of the vehicle control right may be altered on the basis of the delivery status information.

According to this configuration, delivery status information relating to the status of the dispatch vehicle delivering a delivery object is acquired from the dispatch vehicle. In the altering of the setting of the vehicle control right, the setting of the vehicle control right is altered on the basis of the delivery status information.

Consequently, the setting of the vehicle control right can be altered on the basis of delivery status information relating to the status of the dispatch vehicle delivering a delivery object, and the control right can be set to the user only in a case where control of the dispatch vehicle is required in various delivery statuses.

Furthermore, in the aforementioned vehicle control right setting method, the vehicle control right may include a boarding vehicle control right that permits the user to control the dispatch vehicle onto which the user boards at the dispatch destination, and, in the altering of the setting of the vehicle control right, the setting of the boarding vehicle control right may be canceled in a case where the delivery status information indicates that the user has completed boarding at the dispatch destination.

According to this configuration, the vehicle control right includes a boarding vehicle control right that permits the user to control the dispatch vehicle onto which the user boards at the dispatch destination. In the altering of the setting of the vehicle control right, the setting of the boarding vehicle control right is canceled in a case where the delivery status information indicates that the user has completed boarding at the dispatch destination.

Consequently, in a case where the user has completed boarding at the dispatch destination, the setting of the boarding vehicle control right that permits the user to control the dispatch vehicle onto which the user boards at the dispatch destination is canceled, and therefore it is possible to prevent the user controlling the dispatch vehicle at the dispatch destination after the user has completed boarding at the dispatch destination.

Furthermore, in the aforementioned vehicle control right setting method, the vehicle control right may include an alighting vehicle control right that permits the user to control the dispatch vehicle from which the user alights at a destination, and, in the altering of the setting of the vehicle control right, the setting of the alighting vehicle control right may be canceled in a case where the delivery status information indicates that the user has completed alighting at the destination.

According to this configuration, the vehicle control right includes an alighting vehicle control right that permits the user to control the dispatch vehicle from which the user alights at a destination. In the altering of the setting of the vehicle control right, the setting of the alighting vehicle control right is canceled in a case where the delivery status information indicates that the user has completed alighting at the destination.

Consequently, in a case where the user has completed alighting at the destination, the setting of the alighting vehicle control right that permits the user to control the dispatch vehicle from which the user alights at the destination is canceled, and therefore it is possible to prevent the user controlling the dispatch vehicle at the destination after the user has completed alighting at the destination.

Furthermore, in the aforementioned vehicle control right setting method, the vehicle control right may include a boarding vehicle control right that permits the user to control the dispatch vehicle onto which the user boards at the dispatch destination, and an alighting vehicle control right that permits the user to control the dispatch vehicle from which the user alights at a destination, and, in the altering of the setting of the vehicle control right, the setting of the boarding vehicle control right and the alighting vehicle control right may be canceled in a case where the delivery status information indicates that the user has completed alighting at the destination.

According to this configuration, the vehicle control right includes a boarding vehicle control right that permits the user to control the dispatch vehicle onto which the user boards at the dispatch destination, and an alighting vehicle control right that permits the user to control the dispatch vehicle from which the user alights at a destination. In the altering of the setting of the vehicle control right, the setting of the boarding vehicle control right and the alighting vehicle control right is canceled in a case where the delivery status information indicates that the user has completed alighting at the destination.

Consequently, in a case where the user has completed alighting at the destination, the setting of the boarding vehicle control right that permits the user to control the dispatch vehicle onto which the user boards at the dispatch destination, and the alighting vehicle control right that permits the user to control the dispatch vehicle from which the user alights at the destination is canceled, and therefore it is possible to prevent the user controlling the dispatch vehicle at the dispatch destination and the destination after the user has completed alighting at the destination.

Furthermore, in the aforementioned vehicle control right setting method, the vehicle control right may include a delivery source vehicle control right that permits the user to control the dispatch vehicle onto which a delivery object is loaded at the dispatch destination, and, in the altering of the setting of the vehicle control right, the setting of the delivery source vehicle control right may be canceled in a case where the delivery status information indicates that loading of the delivery object has been completed at the dispatch destination.

According to this configuration, the vehicle control right includes a delivery source vehicle control right that permits the user to control the dispatch vehicle onto which a delivery object is loaded at the dispatch destination. In the altering of the setting of the vehicle control right, the setting of the delivery source vehicle control right is canceled in a case where the delivery status information indicates that loading of the delivery object has been completed at the dispatch destination.

Consequently, in a case where loading of the delivery object has been completed at the dispatch destination, the setting of the delivery source vehicle control right that permits the user to control the dispatch vehicle onto which the delivery object is loaded at the dispatch destination is canceled, and therefore it is possible to prevent the user controlling the dispatch vehicle at the dispatch destination after loading of the delivery object has been completed at the dispatch destination.

Furthermore, in the aforementioned vehicle control right setting method, the vehicle control right may include a delivery destination vehicle control right that permits the user to control the dispatch vehicle from which the delivery object is unloaded at the destination, and, in the altering of the setting of the vehicle control right, the setting of the delivery destination vehicle control right may be canceled in a case where the delivery status indicates that unloading of the delivery object has been completed at the destination.

According to this configuration, the vehicle control right includes a delivery destination vehicle control right that permits the user to control the dispatch vehicle from which the delivery object is unloaded at the destination. In the altering of the setting of the vehicle control right, the setting of the delivery destination vehicle control right is canceled in a case where the delivery status indicates that unloading of the delivery object has been completed at the destination.

Consequently, in a case where unloading of the delivery object has been completed at the destination, the setting of the delivery destination vehicle control right that permits the user to control the dispatch vehicle from which the delivery object is unloaded at the destination is canceled, and therefore it is possible to prevent the user controlling the dispatch vehicle at the destination after unloading of the delivery object has been completed at the destination.

Furthermore, in the aforementioned vehicle control right setting method, the vehicle control right may include a delivery source vehicle control right that permits the user to control the dispatch vehicle onto which a delivery object is loaded at the dispatch destination, and a delivery destination vehicle control right that permits the user to control the dispatch vehicle from which the delivery object is unloaded at the destination, and, in the altering of the setting of the vehicle control right, the setting of the delivery source vehicle control right and the delivery destination vehicle control right may be canceled in a case where the delivery status indicates that unloading of the delivery object has been completed at the destination.

According to this configuration, the vehicle control right includes a delivery source vehicle control right that permits the user to control the dispatch vehicle onto which a delivery object is loaded at the dispatch destination, and a delivery destination vehicle control right that permits the user to control the dispatch vehicle from which the delivery object is unloaded at the destination. In the altering of the setting of the vehicle control right, the setting of the delivery source vehicle control right and the delivery destination vehicle control right is canceled in a case where the delivery status indicates that unloading of the delivery object has been completed at the destination.

Consequently, in a case where unloading of the delivery object at the destination has been completed, the setting of the delivery source vehicle control right that permits the user to control the dispatch vehicle onto which the delivery object is loaded at the dispatch destination, and the delivery destination vehicle control right that permits the user to control the dispatch vehicle from which the delivery object is unloaded at the destination is canceled, and therefore it is possible to prevent the user controlling the dispatch vehicle at the dispatch destination and the destination after unloading of the delivery object has been completed at the destination.

Furthermore, in the aforementioned vehicle control right setting method, in addition, valid period information indicating a period during which the vehicle control right is valid may be set for the vehicle control right, and, in the altering of the setting of the vehicle control right, the setting of the vehicle control right may be altered on the basis of the valid period information.

According to this configuration, valid period information indicating a period during which the vehicle control right is valid is set for the vehicle control right. In the altering of the setting of the vehicle control right, the setting of the vehicle control right is altered on the basis of the valid period information.

Consequently, the setting of the vehicle control right is altered in a case where the valid period has been exceeded, and therefore the user is able to control the vehicle within the valid period. Furthermore, for the user, the timing at which the setting of the control right is altered can be easily recognized. Furthermore, the setting of vehicle control rights for which the same valid period has been set can be altered in a batch manner.

A vehicle control right setting device according to another aspect of the present disclosure is provided with: an acquisition unit that acquires, from an external device, dispatch request information that includes at least location information indicating the location of a dispatch destination to which an autonomous vehicle is to be dispatched, and user identification information for identifying a user who is to use the autonomous vehicle or a user terminal possessed by the user; a deciding unit that decides on a dispatch vehicle representing the autonomous vehicle to be dispatched to the user, on the basis of the dispatch request information; and a setting unit that sets a vehicle control right that permits control of the dispatch vehicle, to the user on the basis of the dispatch request information and the user identification information.

According to this configuration, dispatch request information that includes at least location information indicating the location of a dispatch destination to which an autonomous vehicle is to be dispatched, and user identification information for identifying a user who is to use the autonomous vehicle or a user terminal possessed by the user, are acquired from an external device. A dispatch vehicle representing the autonomous vehicle to be dispatched to the user is decided on the basis of the dispatch request information. A vehicle control right that permits control of the dispatch vehicle is set to the user on the basis of the dispatch request information and the user identification information.

Consequently, a dispatch vehicle representing an autonomous vehicle to be dispatched to the user is decided, and a vehicle control right that permits control of the dispatch vehicle is set to the user, and therefore the user of the autonomous vehicle is able to control the autonomous vehicle at the dispatch destination.

A vehicle control right setting program according to another aspect of the present disclosure causes a computer to execute processing including: acquiring, from an external device, dispatch request information that includes at least location information indicating the location of a dispatch destination to which an autonomous vehicle is to be dispatched, and user identification information for identifying a user who is to use the autonomous vehicle or a user terminal possessed by the user; deciding on a dispatch vehicle representing the autonomous vehicle to be dispatched to the user, on the basis of the dispatch request information; and setting a vehicle control right that permits control of the dispatch vehicle, to the user on the basis of the dispatch request information and the user identification information.

According to this configuration, dispatch request information that includes at least location information indicating the location of a dispatch destination to which an autonomous vehicle is to be dispatched, and user identification information for identifying a user who is to use the autonomous vehicle or a user terminal possessed by the user, are acquired from an external device. A dispatch vehicle representing the autonomous vehicle to be dispatched to the user is decided on the basis of the dispatch request information. A vehicle control right that permits control of the dispatch vehicle is set to the user on the basis of the dispatch request information and the user identification information.

Consequently, a dispatch vehicle representing an autonomous vehicle to be dispatched to the user is decided, and a vehicle control right that permits control of the dispatch vehicle is set to the user, and therefore the user of the autonomous vehicle is able to control the autonomous vehicle at the dispatch destination.

A vehicle control method according to another aspect of the present disclosure is a vehicle control method in a vehicle control device, the method including: acquiring, from outside, control right information having associated therein control permitted location information indicating a control permitted location where control of an autonomous vehicle by a user is permitted, and control entity identification information for identifying a control entity that is to control the autonomous vehicle at the control permitted location; acquiring vehicle location information indicating the present location of the autonomous vehicle; acquiring, from outside, control instruction information for controlling the autonomous vehicle, including the control entity identification information; determining whether or not the present location indicated by the vehicle location information is the control permitted location indicated by the control permitted location information; in a case where it is determined that the present location indicated by the vehicle location information is the control permitted location indicated by the control permitted location information, determining whether or not the control entity identification information included in the control instruction information matches the control entity identification information associated with the control permitted location information; and, in a case where it is determined that the control entity identification information included in the control instruction information matches the control entity identification information associated with the control permitted location information, controlling the autonomous vehicle in accordance with the control instruction information.

According to this configuration, control right information is acquired from outside, the control right information having associated therein control permitted location information indicating a control permitted location where control of an autonomous vehicle by a user is permitted, and control entity identification information for identifying a control entity that is to control the autonomous vehicle at the control permitted location. Vehicle location information indicating the present location of the autonomous vehicle is acquired. Control instruction information for controlling the autonomous vehicle, including control entity identification information, is acquired from outside. It is determined whether or not the present location indicated by the vehicle location information is the control permitted location indicated by the control permitted location information. In a case where it has been determined that the present location indicated by the vehicle location information is the control permitted location indicated by the control permitted location information, it is determined whether or not control the entity identification information included in the control instruction information matches the control entity identification information associated with the control permitted location information. In a case where it has been determined that the control entity identification information included in the control instruction information matches the control entity identification information associated with the control permitted location information, the autonomous vehicle is controlled in accordance with the control instruction information.

Consequently, in a case where it has been determined that the present location of the autonomous vehicle is a control permitted location where control of the autonomous vehicle by the user is permitted, and it has been determined that control entity identification information included in control instruction information for controlling the autonomous vehicle matches control entity identification information associated with the control permitted location, the autonomous vehicle is controlled in accordance with the control instruction information, and therefore the user of the autonomous vehicle can control the autonomous vehicle at the dispatch destination.

Hereinafter, embodiments of the present disclosure will be described with reference to the drawings. It should be noted that the embodiments hereinafter are exemplary embodiments of the present disclosure, and do not restrict the technical scope of the present disclosure.

Embodiment 1

In the present embodiment 1, a description will be given regarding a vehicle control right setting method that includes: deciding on a delivery vehicle representing an autonomous vehicle that is to be dispatched to a user, on the basis of dispatch request information that includes at least location information indicating the location of a dispatch destination to which the autonomous vehicle is to be dispatched; setting a control right that permits control of the delivery vehicle located at the dispatch destination, to the user on the basis of the dispatch request information and user identification information for identifying the user who is to use the autonomous vehicle or a user terminal possessed by the user; and transmitting control instruction support information for supporting the input of control instruction information to the delivery vehicle, to the user terminal.

FIG. 1 is a drawing conceptually depicting an overall configuration of a vehicle control system in embodiment 1 of the present disclosure.

The vehicle control system depicted in FIG. 1 is provided with a management device 1, a user terminal 2, and a delivery vehicle 3.

The management device 1 receives, from the user terminal 2 via a network 4: dispatch request information that includes location information of a delivery source and location information of a delivery destination, from the user terminal 2 possessed by the user; delivery source user identification information for identifying a user who is to use the delivery vehicle at the location of the delivery source or the user terminal 2 possessed by the user; and delivery destination user identification information for identifying a user who is to use the delivery vehicle at the location of the delivery destination or the user terminal 2 possessed by the user. The network 4 is the Internet, for example.

Here, the delivery source represents a loading location where a delivery object is loaded onto the vehicle in a case where the delivery vehicle 3 is to deliver a delivery object, and represents a boarding location where a person constituting a delivery object boards the vehicle in a case where the delivery vehicle 3 is to deliver a person in a manner similar to a taxi or the like. Furthermore, the delivery destination represents a location where a delivery object is unloaded from the vehicle in a case where the delivery vehicle 3 is to deliver a delivery object, and the delivery destination represents an alighting location where a person constituting a delivery object alights from the vehicle in a case where the delivery vehicle 3 is to deliver a person.

Furthermore, a user who uses the delivery vehicle 3 at the location of the delivery source represents a person who loads a delivery object onto the delivery vehicle 3 in a case where the delivery vehicle 3 is to deliver a delivery object, and represents a person who boards the delivery vehicle 3 in a case where the delivery vehicle 3 is to deliver a person in a manner similar to a taxi or the like. Similarly, a user who uses the delivery vehicle 3 at the location of the delivery destination represents a person who unloads a delivery object from the delivery vehicle 3, namely a recipient of a delivery object, in a case where the delivery vehicle 3 is to deliver a delivery object, and represents a person who alights from the delivery vehicle 3 in a case where the delivery vehicle 3 is to deliver a person in a manner similar to a taxi or the like. Furthermore, the delivery source represents the dispatch destination to which the autonomous vehicle is dispatched, and the delivery destination represents the destination.

Next, the management device 1 decides on the delivery vehicle 3 from vehicle information of one or more vehicles being managed in advance, on the basis of location information of the delivery destination and location information of the delivery source included in the dispatch request information. The management device 1 then sets a control right that permits control of the delivery vehicle 3 located at the delivery source to a user at the delivery source, on the basis of the location information of the delivery source and the delivery source user identification information. Furthermore, the management device 1 sets a control right that permits control of the delivery vehicle 3 located at the delivery destination to a user at the delivery destination, on the basis of the location information of the delivery destination and the delivery destination user identification information.

Next, the management device 1 transmits, to the user terminal 2 via the network 4, control instruction support information for supporting the input of control instruction information to the delivery vehicle 3 for the user. Furthermore, the management device 1 transmits control right information relating to the control right that has been set, to the delivery vehicle 3 via the network 4.

The user terminal 2 is a terminal possessed by the user, and, for example, is a cellular telephone, a smartphone, a tablet terminal, a personal computer, or the like. The user terminal 2, for example, uses wireless communication to transmit the dispatch request information and the user identification information to the management device 1. The dispatch request information includes location information of the delivery source and location information of the delivery destination. It should be noted that the dispatch request information may include only location information of the delivery source. The user identification information includes: delivery source user identification information for identifying a user who is to use the delivery vehicle at the location of the delivery source or the user terminal 2 possessed by the user; and delivery destination user identification information for identifying a user who is to use the delivery vehicle at the location of the delivery destination or the user terminal 2 possessed by the user. The user identification information may include only the delivery source user identification information.

The user identification information, for example, may be a user ID assigned from a service provider side in the registration of the user when using a service, biological information, or a MAC (media access control) address for identifying the user terminal 2. Furthermore, the biological information is a fingerprint, an iris, or a face, for example.

As a method for the user to issue a dispatch request to the management device 1, a method is feasible in which, for example, an application program for issuing dispatch requests provided by the management device 1 or the like is installed in the user terminal 2, and a dispatch request is issued using that application program. Furthermore, as another method, a method is feasible in which the user accesses a dedicated web page for issuing dispatch requests provided by the management device 1, and issues a dispatch request via that dedicated web page. It should be noted that an arbitrary configuration may be used provided that it is a configuration in which the user issues a dispatch request to the management device 1 using the user terminal 2.

The delivery vehicle 3 is a vehicle that is decided on the basis of the dispatch request information from the vehicle information of one or more vehicles managed by the management device 1, and is a completely autonomous vehicle provided with an autonomous driving function with which a driver is not necessary. Each vehicle of the vehicle group managed by the management device 1 periodically transmits location information of the vehicle in question, vehicle state information indicating the state of the vehicle such as or whether or not the vehicle is carrying out a delivery, and the like to the management device 1. The management device 1 manages these items of information, and decides on the delivery vehicle 3 on the basis of these items of information in a case where dispatch request information has been acquired from the user terminal 2. The delivery vehicle 3 is an example of a dispatch vehicle.

Furthermore, the delivery vehicle 3 acquires and stores control right information relating to control rights for controlling the vehicle when located at the delivery source and the delivery destination, from the management device 1. The delivery vehicle 3 then determines whether or not control of the vehicle is possible on the basis of the stored control right information in a case where control instruction information for controlling the vehicle has been received from outside. The delivery vehicle 3 controls the vehicle in accordance with the control instruction information in a case where it has been determined that control of the vehicle is possible.

Hereinafter, a configuration of the management device 1, the user terminal 2, and the delivery vehicle 3 will be described in detail.

Figure 2:
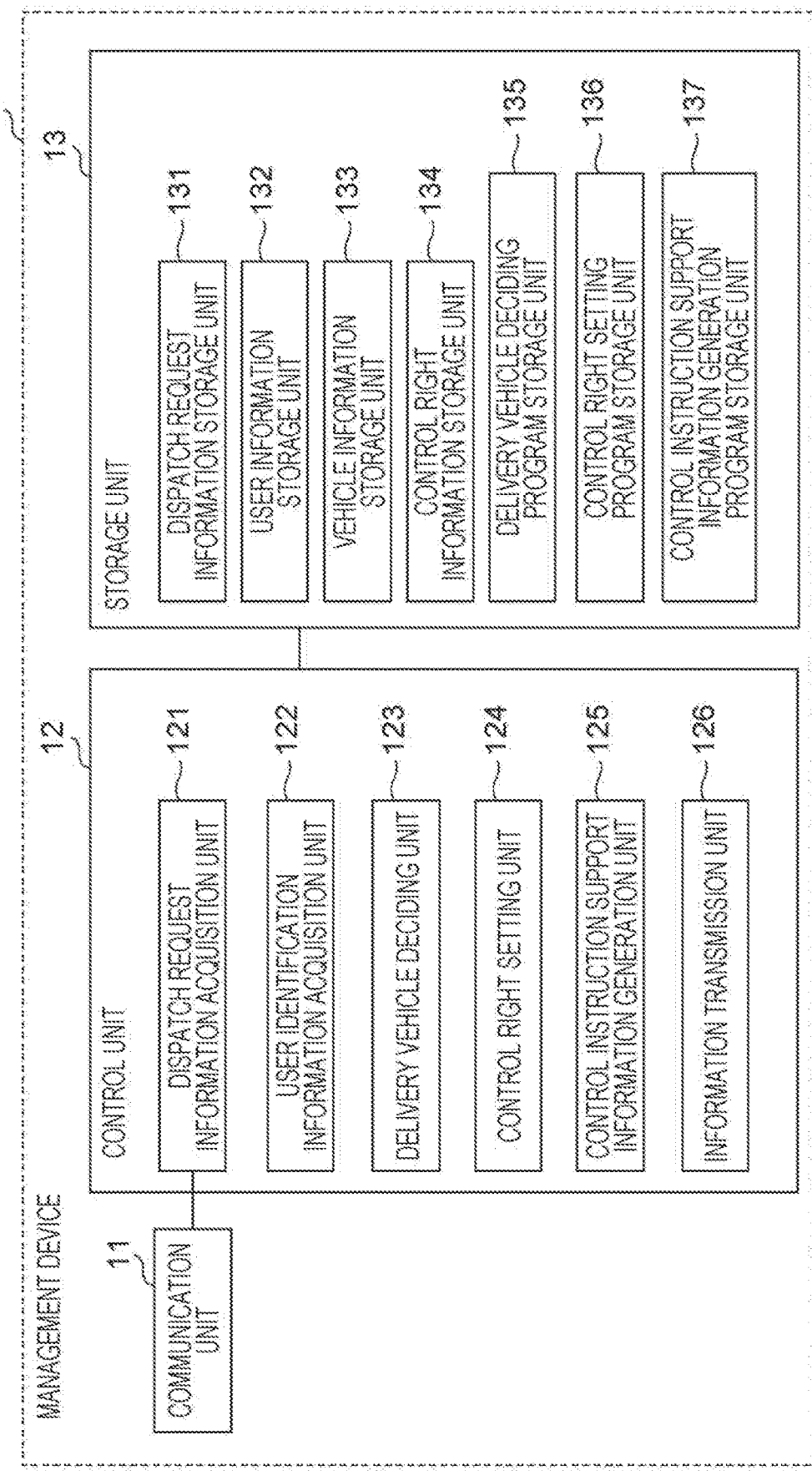
FIG. 2 is a block diagram depicting a configuration of a management device in embodiment 1 of the present disclosure.

FIG. 2 is a block diagram depicting a configuration of the management device in embodiment 1 of the present disclosure. The management device 1 is provided with a communication unit 11, a control unit 12, and a storage unit 13.

The communication unit 11 transmits and receives various information with external devices such as the user terminal 2 and the delivery vehicle 3. The communication unit 11 transmits and receives various information with external devices via the network 4 such as a WAN (wide area network) or a LAN (local area network), for example.

The control unit 12 is a CPU (central processing unit), for example, and is provided with a dispatch request information acquisition unit 121, a user identification information acquisition unit 122, a delivery vehicle deciding unit 123, a control right setting unit 124, a control instruction support information generation unit 125, and an information transmission unit 126.

The dispatch request information acquisition unit 121 acquires dispatch request information that includes user information indicating the user, location information of the delivery source, and location information of the delivery destination, from the user terminal 2 via the communication unit 11. The dispatch request information acquisition unit 121 acquires dispatch request information that includes at least location information indicating the location of the dispatch destination to which an autonomous vehicle is to be dispatched. In embodiment 1, the delivery source is the dispatch destination and the delivery destination is the destination.

The user identification information acquisition unit 122 acquires delivery source user identification information for identifying a user who is to use the delivery vehicle located at the delivery source or the user terminal 2 possessed by the user, and delivery destination user identification information for identifying a user who is to use the delivery vehicle located at the delivery destination or the user terminal 2 possessed by the user, from the user terminal 2 via the communication unit 11. The user identification information acquisition unit 122 acquires user identification information for identifying a user who is to use the autonomous vehicle or the user terminal possessed by the user, from the user terminal 2.

In the present embodiment 1, a configuration is described in which the dispatch request information and the delivery source user identification information and delivery destination user identification information are acquired separately; however, it should be noted that a configuration may be adopted in which these items of information are acquired in a batch manner. For example, the dispatch request information may include the delivery source user identification information and the delivery destination user identification information, or the dispatch request information acquisition unit 121 may acquire the dispatch request information, the delivery source user identification information, and the delivery destination user identification information in a batch manner.

Here, a delivery will be described. Broadly speaking, there are two types of deliveries. The first is the delivery of an object, and the second is the delivery of a person in a manner similar to a taxi or the like.

In a case where the delivery vehicle is to deliver an object, the user who loads a package at the delivery source and the user who receives the package at the delivery destination are different. Therefore, the information of the user indicated in the delivery source user identification information and the delivery destination user identification information is different.

However, in a case where the delivery vehicle is to deliver a person, the user who boards at the delivery source and the user who alights at the delivery destination are the same. Therefore, the information of the user indicated in the delivery source user identification information and the delivery destination user identification information is the same. Therefore, in a case where the delivery vehicle is to deliver a person, the user identification information acquisition unit 122 may simply acquire user identification information for identifying the user who is to use the delivery vehicle or the user terminal 2 possessed by the user, and set the acquired user identification information in the delivery source user identification information and the delivery destination user identification information without distinguishing between the delivery destination and the delivery source.

It should be noted that the user identification information acquisition unit 122 may acquire user identification information each time dispatch request information is acquired, or may reuse user identification information acquired after the initial dispatch request information has been acquired, each time dispatch request information is acquired. In particular, in a case where the delivery vehicle is a taxi that delivers people, it is thought that it is often the case that the person who has requested the dispatch carries out the boarding and alighting. Therefore, causing the user to transmit delivery source user identification information and delivery destination user identification information each time the user transmits dispatch request information becomes a burden for the user.

Thus, in a case where the delivery vehicle is a taxi, it is preferable for the user identification information acquisition unit 122 to reuse user identification information acquired after the initial dispatch request information has been acquired, each time dispatch request information is acquired. Alternatively, user identification information may be registered at the time of user registration that is initially carried out when a user uses a taxi, and the user identification information acquisition unit 122 may automatically use that registered user identification information as delivery source user identification information and delivery destination user identification information. By adopting this configuration, a user can save time and labor for transmitting delivery source user identification information and delivery destination user identification information each time dispatch request information is transmitted.

However, in a case where the delivery vehicle is to deliver an object, either the user at the delivery source or the user at the delivery destination is different from the delivery requester. Therefore, it is necessary for the delivery requester to transmit at least user identification information that is different from the user information of the delivery requester, each time dispatch request information is transmitted. However, for the burden of the user to be reduced as much as possible, it is preferable for the user terminal 2 to register, in advance, user identification information that is often used as delivery source user identification information or delivery destination user identification information, and, next time, simply accept the designation of user identification information when delivery source user identification information or delivery destination user identification information is to be designated.

The delivery vehicle deciding unit 123 decides on a delivery vehicle (dispatch vehicle) representing an autonomous vehicle that is to be dispatched to a user, on the basis of dispatch request information. The delivery vehicle deciding unit 123 decides on a delivery vehicle for dispatch request information, using a predetermined delivery vehicle deciding algorithm, from vehicle information that is the information of the one or more vehicles being managed by the management device 1. Here, the vehicle information managed by the management device 1 includes vehicle identification information for identifying a vehicle, vehicle location information indicating the location of the vehicle, and vehicle state information indicating the state of the vehicle such as whether or not the vehicle is carrying out a delivery. Vehicle location information and vehicle state information are acquired from each vehicle. The vehicle information is stored in a vehicle information storage unit 133. The delivery vehicle deciding algorithm is stored in advance in a delivery vehicle deciding program storage unit 135.

Furthermore, the delivery vehicle deciding algorithm may be an arbitrary algorithm provided that a delivery vehicle for dispatch request information can be decided. For example, the delivery vehicle deciding unit 123 decides, as the delivery vehicle 3, a vehicle that is currently not carrying out a delivery and is nearest the location of the delivery source, from among the vehicle information being managed by the management device 1, from location information of the delivery source included in the dispatch request information. In this example, a delivery vehicle deciding algorithm has been described with which a vehicle present in the location nearest the location of the delivery source is decided as the delivery vehicle 3; however, as another delivery vehicle deciding algorithm, the delivery vehicle deciding unit 123 may calculate the required fees for each vehicle to be dispatched to the delivery source, and decide on the vehicle having the lowest required fee as the delivery vehicle 3. Furthermore, as another example of a delivery vehicle deciding algorithm, the delivery vehicle deciding unit 123 may decide on the vehicle that will arrive at the delivery destination in the shortest time as the delivery vehicle 3.

Furthermore, as another example of a delivery vehicle deciding algorithm, the delivery vehicle deciding unit 123 may generate, for each vehicle, a route from the location of the vehicle to the delivery source, calculate the required time from the location of the vehicle to the delivery source on the basis of the route, and decide on the vehicle having the shortest required time as the delivery vehicle 3. Furthermore, the delivery vehicle deciding program storage unit 135 may store a plurality of delivery vehicle deciding algorithms in advance, and the delivery vehicle deciding unit 123 may decide on one delivery vehicle deciding algorithm according to a preference of an administrator, for example, from among the plurality of delivery vehicle deciding algorithms.

The control right setting unit 124 sets a control right (vehicle control right) that permits control of the delivery vehicle, to a user on the basis of the dispatch request information and the user identification information. The control right setting unit 124 sets a control right (vehicle control right) that permits control of the delivery vehicle located at the dispatch destination, to a user on the basis of the dispatch request information and the user identification information. The control right setting unit 124 sets a control right for controlling the delivery vehicle 3 located at the delivery source, to the delivery source user identification information, and sets a control right for controlling the delivery vehicle 3 located at the delivery destination, to the delivery destination user identification information, on the basis of the dispatch request information, the delivery source user identification information, and the delivery destination user identification information.

The control instruction support information generation unit 125 generates control instruction support information for supporting the input of control instruction information to the delivery vehicle 3. The control instruction support information generation unit 125 generates control instruction support information for supporting the input of control instruction information to the delivery vehicle 3 for a user who has been assigned a control right. The control instruction support information is a control instruction screen for instructing control for the delivery vehicle 3, for example. It should be noted that the control instruction support information may be a screen that depicts an address representing a dedicated web page for instructing control for the delivery vehicle 3. In this case, the user is able to issue a control instruction to the delivery vehicle 3 via the control instruction screen or the web page using the user terminal 2.

Furthermore, in a case where an input device (not depicted) for the user to input control instruction information is mounted in the delivery vehicle 3, the control instruction support information may be information such as a password that is required in order for the user to input control instruction information via the input device mounted in the delivery vehicle 3. In this case, the user inputs information such as a password constituting control instruction support information, to the input device mounted in the delivery vehicle 3. Thereby, if authentication for the input device mounted in the delivery vehicle 3 is successful, the user is able to issue a control instruction to the delivery vehicle 3 via the input device. By adopting this configuration, it is possible to prevent a person other than the user controlling the delivery vehicle 3.

The information transmission unit 126 transmits control instruction support information generated by the control instruction support information generation unit 125 to a user who has been assigned a control right. The management device 1 acquires, from users, user information that includes user contact address information indicating a user contact address for each user, and stores the user information in a user information storage unit 132. The information transmission unit 126 transmits control instruction support information to a user who has been assigned a control right, on the basis of the user information. The user information may be acquired in advance from users, or dispatch request information that includes user information may be acquired from users and the user information may be acquired from the dispatch request information.

In a case where the delivery vehicle is to deliver an object, the user at the delivery source and the user at the delivery destination are different, and either the user at the delivery source or the user at the delivery destination is different from the delivery requester. Therefore, the dispatch request information acquisition unit 121 acquires dispatch request information that includes user information of a person different from the delivery requester.

Furthermore, the information transmission unit 126 transmits control right information relating to control rights that have been set, to the delivery vehicle 3. In addition, the information transmission unit 126 transmits dispatch instruction information that is based on the dispatch request information, to the delivery vehicle 3. The dispatch instruction information includes at least location information of the delivery source and location information of the delivery destination. The dispatch instruction information may include route information that includes a route from the present location of the vehicle to the delivery source and a route from the delivery source to the delivery destination. In this case, the management device 1 generates route information; however, the delivery vehicle 3 may generate route information.

The storage unit 13 is a semiconductor memory, for example, and is provided with a dispatch request information storage unit 131, the user information storage unit 132, the vehicle information storage unit 133, a control right information storage unit 134, the delivery vehicle deciding program storage unit 135, a control right setting program storage unit 136, and a control instruction support information generation program storage unit 137.

The dispatch request information storage unit 131 stores dispatch request information that includes at least user information, location information of the delivery source, and location information of the delivery destination, acquired from the user terminal 2 by the dispatch request information acquisition unit 121.

The user information storage unit 132 stores user information that includes user identification information for identifying a user or the user terminal 2 possessed by the user, and user contact address information indicating a contact address of the user, acquired from the user terminal 2. It should be noted that the user identification information and the user contact address information may be the same.

FIG. 3 is a drawing depicting an example of user information stored in the user information storage unit in the present embodiment 1.

The user information includes user identification information for identifying a user and user contact address information for transmitting and receiving information with the user terminal 2. In FIG. 3, email addresses are stored as user contact address information. It should be noted that user contact address information is not restricted to an email address, and may be an IP (Internet protocol) address or a MAC (media access control) address, for example. User contact address information may be arbitrary information provided that it is information for transmitting information to a user. Furthermore, user contact address information is extracted from the user information storage unit 132 on the basis of delivery source user identification information and delivery destination user identification information.

The vehicle information storage unit 133 stores vehicle information relating to each vehicle from among one or more vehicles to be dispatched.

FIG. 4 is a drawing depicting an example of vehicle information stored in the vehicle information storage unit in the present embodiment 1. The vehicle information includes vehicle identification information for identifying a vehicle, vehicle location information indicating the location of a vehicle, and vehicle state information indicating the state of a vehicle regarding whether the vehicle is empty or carrying out a delivery, for example. The case where there is an empty state and a mid-delivery state as vehicle state information is depicted in the example depicted in FIG. 4.

The vehicle location information of each vehicle changes from moment to moment, and it is therefore preferable for vehicle location information to be acquired from each vehicle periodically. However, vehicle state information is information that changes at predetermined events such as when a delivery vehicle has acquired a dispatch instruction from the management device 1 and when a delivery vehicle has completed a delivery. Therefore, it is preferable for vehicle state information to be acquired from each vehicle at the predetermined events. It should be noted that an effect similar to the aforementioned can be obtained even if a configuration is adopted in which vehicle state information is acquired from each vehicle periodically, similar to vehicle location information.

The control right information storage unit 134 stores control right information that indicates a control right for controlling the delivery vehicle 3 located at the delivery source and a control right for controlling the delivery vehicle 3 located at the delivery destination, set by the control right setting unit 124 on the basis of dispatch request information, delivery source user identification information, and delivery destination user identification information.

FIG. 5 is a drawing depicting an example of control right information stored in the control right information storage unit in the present embodiment 1. The control right information depicted in FIG. 5 includes a dispatch request identification number for identifying dispatch request information, information indicating either a delivery source or a delivery destination, a control-possible location, user identification information, and vehicle identification information of a delivery vehicle. The control-possible location indicates location information of the delivery source and location information of the delivery destination. The control-possible location is represented by longitude and latitude, for example.

In FIG. 5, for example, a control right for controlling a delivery vehicle having the vehicle identification information "a" is set for a user having the user identification information "A" in a control-possible location at the delivery source that is (x11 degrees, x12 minutes, x13 seconds north and x14 degrees, x15 minutes, x16 seconds east). Furthermore, a control right for controlling the delivery vehicle having the vehicle identification information "a" is set for a user having the user identification information "B" in a control-possible location at the delivery destination that is (y11 degrees, y12 minutes, y13 seconds north and y14 degrees, y15 minutes, y16 seconds east).

The delivery vehicle deciding program storage unit 135 stores a delivery vehicle deciding program for deciding a delivery vehicle, which is executed by the delivery vehicle deciding unit 123.

The control right setting program storage unit 136 stores a control right setting program for setting a control right for controlling the delivery vehicle 3 located at the delivery source and a control right for controlling the delivery vehicle 3 located at the delivery destination, which is executed by the control right setting unit 124.

The control instruction support information generation program storage unit 137 stores a control instruction support information generation program for generating control instruction support information for supporting the input of control instruction information to the delivery vehicle 3 for a user who has been assigned a control right, which is executed by the control instruction support information generation unit 125.

Next, a configuration of the user terminal 2 in the present embodiment 1 will be described in detail.

Figure 6:
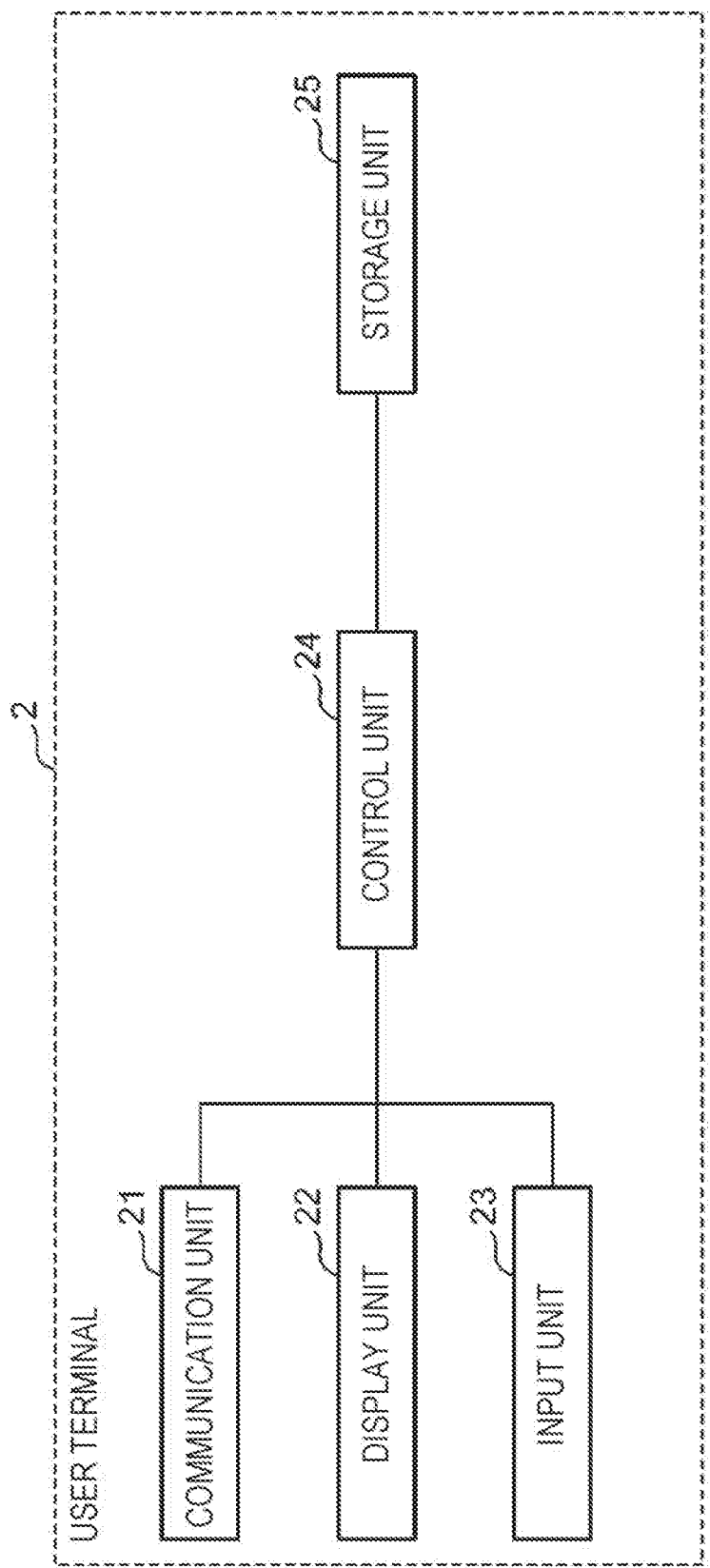
FIG. 6 is a block diagram depicting a configuration of a user terminal in embodiment 1 of the present disclosure.

FIG. 6 is a block diagram depicting a configuration of the user terminal in embodiment 1 of the present disclosure. The user terminal 2 is provided with a communication unit 21, a display unit 22, an input unit 23, a control unit 24, and a storage unit 25.

The communication unit 21 transmits dispatch request information to the management device 1, receives control instruction support information from the management device 1, and transmits control instruction information for the delivery vehicle 3 by way of the control instruction support information. The communication unit 21 transmits and receives information with external devices such as the management device 1 or the delivery vehicle 3. The communication unit 21 transmits and receives information with external devices via the network 4 such as a WAN or a LAN, for example.

The display unit 22, for example, is a liquid crystal display or the like, and displays an input screen for when dispatch request information is input, and displays control instruction support information received from the management device 1.

The input unit 23, for example, is a keyboard, a mouse, or the like, and accepts input operations performed by the user. The user inputs information to the user terminal 2 via the input unit 23. It should be noted that the display unit 22 and the input unit 23 may be configured integrally in a manner similar to a touch panel of a smartphone. In this case, the user inputs information by touching a touch panel of the display unit 22. The user inputs location information of the delivery source and location information of the delivery destination, which are included in the dispatch request information, for example, via the input unit 23. As method for inputting location information of the delivery source and location information of the delivery destination, there is the input method of the user touching the location of the delivery source and the location of the delivery destination using his or her finger on map information displayed on the touch panel, for example. Furthermore, as another input method, there is the input method of the user inputting an address for the delivery source and an address for the delivery destination from a keyboard into input fields for location information of the delivery source and location information of the delivery destination, displayed on the display unit 22, for example. In addition, the user may input a facility name for the delivery source and a facility name for the delivery destination from a keyboard into input fields for location information of the delivery source and location information of the delivery destination, displayed on the display unit 22, for example.

The control unit 24 is a CPU, for example, and carries out processing relating to various types of control for the user terminal 2.

The storage unit 25 is, for example, a semiconductor memory or the like, and stores various information such as information acquired from the management device 1 and information input from a user. Furthermore, the storage unit 25 stores address information of the management device 1 in order to transmit dispatch request information to the management device 1. The address information is acquired from a dedicated application for transmitting dispatch request information provided by the management device 1, for example. Furthermore, in a case where a dedicated web page or the like for transmitting dispatch request information is provided, the address information may be acquired from that web page. It should be noted that the method for acquiring address information of the management device 1 may be an arbitrary method.

Next, a configuration of the delivery vehicle 3 in the present embodiment 1 will be described in detail.

Figure 7:
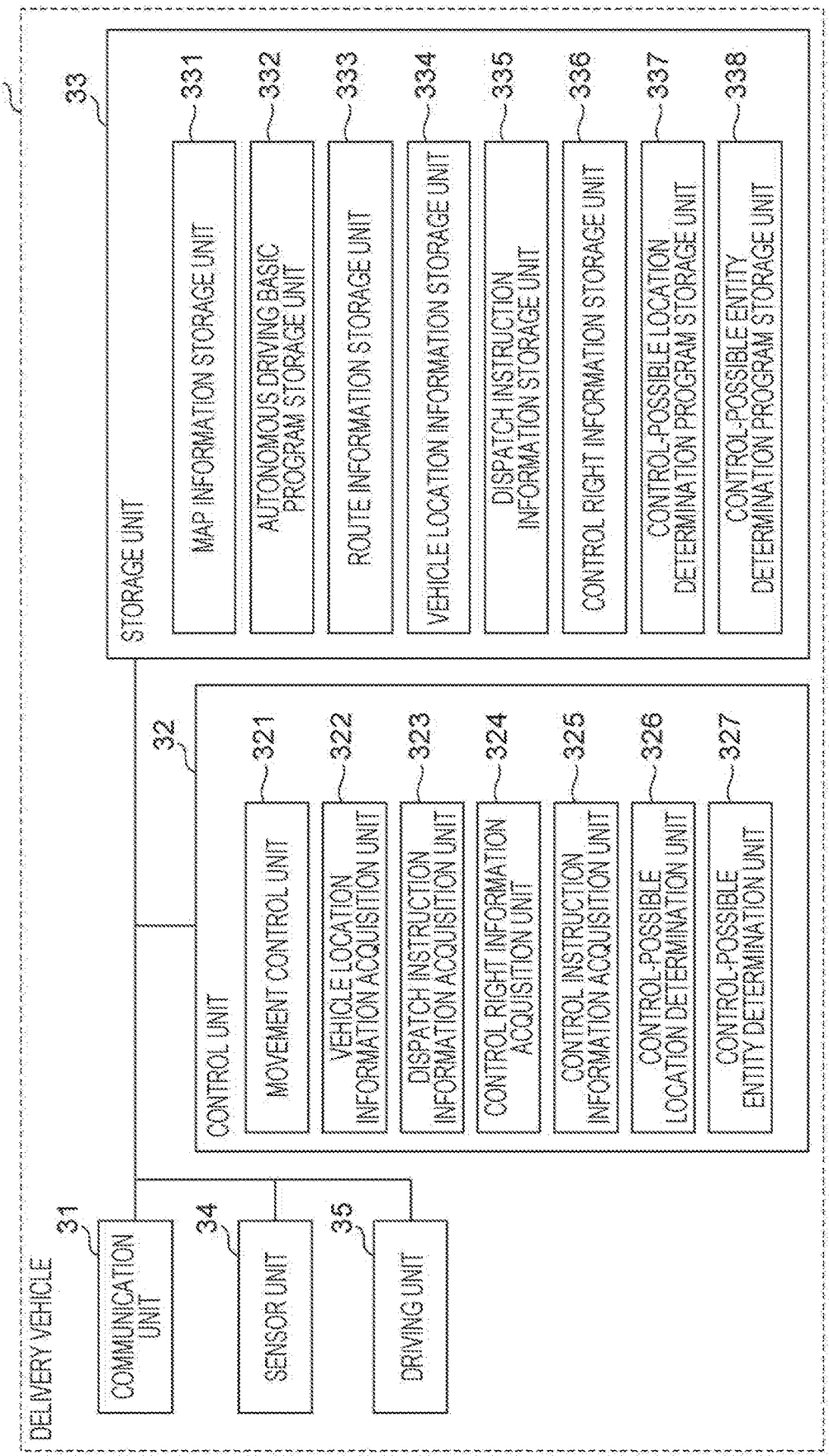
FIG. 7 is a block diagram depicting a configuration of a delivery vehicle in embodiment 1 of the present disclosure.

FIG. 7 is a block diagram depicting a configuration of the delivery vehicle in embodiment 1 of the present disclosure. The delivery vehicle 3 is provided with a communication unit 31, a control unit 32, a storage unit 33, a sensor unit 34, and a driving unit 35.

The communication unit 31 receives control right information from the management device 1, receives control instruction information for control thereof from outside, transmits vehicle location information indicating the location thereof to the management device 1, and transmits vehicle state information indicating the state thereof to the management device 1, using wireless communication, for example. The communication unit 31 transmits and receives information with external devices such as the management device 1 or the user terminal 2. The communication unit 31 transmits and receives various information with external devices via the network 4 such as a WAN or a LAN, for example.

The control unit 32 is a CPU, for example, and is provided with a movement control unit 321, a vehicle location information acquisition unit 322, a dispatch instruction information acquisition unit 323, a control right information acquisition unit 324, a control instruction information acquisition unit 325, a control-possible location determination unit 326, and a control-possible entity determination unit 327.

The movement control unit 321 controls the movement of the delivery vehicle 3 on the basis of an autonomous driving basic program stored in an autonomous driving basic program storage unit 332. Specifically, the movement control unit 321 decides a movement direction for the delivery vehicle 3 from a route stored in a route information storage unit 333 and vehicle location information acquired by the sensor unit 34, and controls the movement of the delivery vehicle 3 on the basis of the autonomous driving basic program in the decided movement direction.

Furthermore, in a case where control instruction information transmitted from outside for controlling the delivery vehicle 3 has been acquired, the movement control unit 321 controls the delivery vehicle 3 when it has been determined that the delivery vehicle 3 is to be controlled in accordance with the acquired control instruction information by the control-possible location determination unit 326 and the control-possible entity determination unit 327.

Specifically, first, the movement control unit 321 determines whether or not the movement of the delivery vehicle 3 can be controlled in accordance with the control instruction information. This determination is carried out because, in a case where there is an obstruction at a movement destination to which movement is to be attempted in accordance with the control instruction information, it is not possible to move to the movement destination. Before actually moving, the movement control unit 321 confirms whether or not it is possible to move the delivery vehicle 3 in accordance with the control instruction information. The movement control unit 321 determines whether or not movement is possible by, for example, specifying the movement destination on the basis of the control instruction information, and determining whether or not an obstruction is present on the basis of information obtained by the sensor unit 34 carrying out sensing with respect to the specified movement destination. Next, the movement control unit 321 actually controls the movement of the delivery vehicle 3 on the basis of this determination result. Specifically, in a case where it is determined that it is possible for the delivery vehicle 3 to move, the movement control unit 321 controls the movement of the delivery vehicle 3 in accordance with the control instruction information. However, in a case where it is determined that it is not possible for the delivery vehicle 3 to move, the movement control unit 321 does not follow the control instruction information and does not cause the delivery vehicle 3 to move.

The vehicle location information acquisition unit 322 acquires location information indicating the present location of the delivery vehicle 3, via the sensor unit 34. The management device 1 manages location information of each vehicle of a vehicle group to be dispatched. Each vehicle acquires location information thereof, and periodically transmits the location information to the management device 1. Therefore, the vehicle location information acquisition unit 322 acquires location information of the delivery vehicle 3 via the sensor unit 34, and transmits location information to the management device 1 via the communication unit 31.

Furthermore, the delivery vehicle 3, when having received control instruction information for controlling the delivery vehicle 3 from outside, acquires location information of the delivery vehicle 3 via the sensor unit 34 by means of the vehicle location information acquisition unit 322 in order to determine whether or not the location of the delivery vehicle 3 is a location corresponding to a control right that has been set in control right information.

The dispatch instruction information acquisition unit 323 acquires dispatch instruction information indicating a dispatch instruction with respect to the dispatch request information, transmitted from the management device 1. The dispatch instruction information includes at least location information of the delivery source and location information of the delivery destination. The delivery vehicle 3 starts moving toward the delivery source on the basis of the acquired dispatch instruction information. The delivery vehicle 3 moves toward the delivery destination after a delivery object has been loaded, or after a user has boarded the delivery vehicle 3, at the delivery source. It should be noted that the dispatch instruction information may include route information from the present location of the delivery vehicle 3 to the delivery source or route information from the delivery source to the delivery destination. In this case, the management device 1 creates route information from the present location of the delivery vehicle 3 to the delivery source or route information from the delivery source to the delivery destination. Alternatively, the delivery vehicle 3 may create route information from the present location of the delivery vehicle 3 to the delivery source or route information from the delivery source to the delivery destination, on the basis of location information of the delivery source and location information of the delivery destination included in the dispatch instruction information. In this case, the management device 1 is not provided with a function for creating route information, and the delivery vehicle 3 is provided with a function for creating route information.

The control right information acquisition unit 324 acquires control right information that has been set by the management device 1. The control right information acquisition unit 324 acquires, from outside, control right information having associated therein control permitted location information indicating a control permitted location where control of an autonomous vehicle by a user is permitted, and control entity identification information for identifying a control entity that is to control the autonomous vehicle at the control permitted location. It should be noted that a control entity represents a user or a user terminal possessed by the user.

In the present embodiment 1, control right information is transmitted from the management device 1 to the delivery vehicle 3; however, the delivery vehicle 3 may acquire control right information from the management device 1 by requesting the management device 1 for the control right information. For example, in a case where control instruction information for controlling the delivery vehicle 3 has been received from outside, the control right information acquisition unit 324 may request the management device 1 for control right information and acquire the control right information from the management device 1.

The control instruction information acquisition unit 325 acquires control instruction information for controlling the delivery vehicle 3, including control entity identification information, from outside. For example, location information that indicates a location to which the delivery vehicle 3 is to be moved is feasible as an example of control instruction information. In this case, the delivery vehicle 3 moves toward the location indicated by the control instruction information. It should be noted that the control instruction information may include not only the location of the delivery vehicle 3 but also information indicating the orientation of the delivery vehicle 3. In this case, the delivery vehicle 3 moves toward the location indicated by the control instruction information, in such a way that the orientation of the delivery vehicle 3 matches the orientation indicated by the control instruction information.

Furthermore, as another example, the control instruction information may include information indicating a direction in which the delivery vehicle 3 is to be moved and a distance by which the delivery vehicle 3 is to be moved. For example, in a case where information indicating a direction in which the delivery vehicle 3 is to be moved indicates to the front of the vehicle and information indicating a distance by which the delivery vehicle 3 is to be moved indicates 50 cm, the delivery vehicle 3 moves 50 cm to the front of the vehicle.

The control-possible location determination unit 326 determines whether or not the present location indicated by location information acquired by the vehicle location information acquisition unit 322 is a control permitted location indicated by the control permitted location information. In a case where control instruction information transmitted from outside for controlling the delivery vehicle 3 has been acquired, the control-possible location determination unit 326 determines on the basis of control right information whether or not the present location of the delivery vehicle 3 is the location of the delivery source or the location of the delivery destination indicated in the control right information. In a case where it has been determined as a result of the aforementioned determination that the location of the delivery vehicle 3 is the location of the delivery source or the location of the delivery destination, processing transitions to the control-possible entity determination unit 327. However, in a case where it has been determined as a result of the aforementioned determination that the location of the delivery vehicle 3 is not the location of the delivery source or the location of the delivery destination, processing ends without following the control instruction information.

In a case where it has been determined that the present location indicated by the vehicle location information is a control permitted location indicated by the control permitted location information, the control-possible entity determination unit 327 determines whether or not control entity identification information included in the control instruction information matches control entity identification information associated with the control permitted location information.

In a case where it has been determined by the control-possible location determination unit 326 that the present location of the delivery vehicle 3 is the location of the delivery source or the location of the delivery destination indicated in the control right information, the control-possible entity determination unit 327 determines whether or not control entity identification information included in the control instruction information matches user identification information included in the control right information. In a case where it has been determined as a result of the aforementioned determination that the control entity identification information included in the control instruction information matches the user identification information included in the control right information, the control-possible entity determination unit 327 requests control processing to the movement control unit 321 in order to carry out control processing in accordance with the control instruction information. In a case where it has been determined that the control entity identification information included in the control instruction information matches the control entity identification information associated with the control permitted location information, the movement control unit 321 controls the delivery vehicle 3 in accordance with the control instruction information.

However, in a case where it has been determined as a result of the aforementioned determination that the control entity identification information included in the control instruction information does not match the user identification information included in the control right information, processing ends without following the control instruction information.

The storage unit 33 is a semiconductor memory, for example, and is provided with a map information storage unit 331, the autonomous driving basic program storage unit 332, the route information storage unit 333, a vehicle location information storage unit 334, a dispatch instruction information storage unit 335, a control right information storage unit 336, a control-possible location determination program storage unit 337, and a control-possible entity determination program storage unit 338.

The map information storage unit 331 stores map information such as a road map. The map information includes, for example, road data relating to road links, intersection data relating to intersections, facility data relating to facilities, display item data indicating display items installed or formed on roads in order to provide various types of travel information and give guidance to driven vehicles (for example, information on legal speeds), and the like. The map information is acquired from an external server or the like and is stored in advance, for example. Road situations change due to roads or facilities being newly formed or altered, and therefore it should be noted that it is desirable for the delivery vehicle 3 to periodically access the external server or the like to acquire map information and update map information. The map information is used when the delivery vehicle 3 is to deliver a delivery object by means of autonomous driving.

The autonomous driving basic program storage unit 332 stores a basic program for controlling autonomous driving of the delivery vehicle 3. The movement control unit 321 controls the movement of the delivery vehicle 3 by controlling the driving unit 35 on the basis of sensing information and vehicle location information measured by the sensor unit 34 of the delivery vehicle 3, in accordance with the autonomous driving basic program.

The route information storage unit 333 stores route information from the present location of the delivery vehicle 3 to the delivery source and route information from the delivery source to the delivery destination. It is possible for route information to be generated by an existing route generation program or the like. The delivery vehicle 3 can acquire route information by receiving route information generated by the management device 1, from the management device 1. It should be noted that the delivery vehicle 3 may generate route information on the basis of dispatch instruction information that includes location information of the delivery source and location information of the delivery destination acquired from the management device 1.

The vehicle location information storage unit 334 stores location information indicating the present location of the delivery vehicle 3 acquired by the vehicle location information acquisition unit 322. The movement control unit 321 can decide the movement direction of the delivery vehicle 3 on the basis of the location information of the delivery vehicle 3 stored in the vehicle location information storage unit 334 and the route information stored in the route information storage unit 333.

The dispatch instruction information storage unit 335 stores dispatch instruction information indicating a dispatch instruction with respect to dispatch request information acquired by the dispatch instruction information acquisition unit 323. The dispatch instruction information includes at least location information of the delivery source and location information of the delivery destination.

The control right information storage unit 336 stores control right information indicating a control right for controlling the delivery vehicle 3 located at the delivery source which has been set to the delivery source user identification information, and a control right for controlling the delivery vehicle 3 located at the delivery destination which has been set to the delivery destination user identification information, acquired by the control right information acquisition unit 324.

The control-possible location determination program storage unit 337 stores a control-possible location determination program for determining on the basis of control right information whether or not the present location of the delivery vehicle 3 is the location of the delivery source or the location of the delivery destination indicated in the control right information, in a case where control instruction information transmitted from outside for controlling the delivery vehicle 3 has been acquired. The control-possible location determination program is executed by the control-possible location determination unit 326.

The control-possible entity determination program storage unit 338 stores a control-possible entity determination program for determining whether or not the control entity identification information included in the control instruction information matches the user identification information included in the control right information. The control-possible entity determination program is executed by the control-possible entity determination unit 327.

The sensor unit 34 senses location information of the delivery vehicle 3, senses information on the peripheral environment of the delivery vehicle 3, and senses information relating to the state of the delivery vehicle 3. Information sensed by the sensor unit 34 is used when the movement of the delivery vehicle 3 is to be controlled autonomously. Furthermore, from among the information that is sensed, the location information of the delivery vehicle 3 is transmitted to the management device 1. Hereinafter, specific examples of sensors of the sensor unit 34 will be described.

First, sensors that sense the location information of the delivery vehicle 3 include the GPS (Global Positioning System), for example. The location information of the delivery vehicle 3 is represented by latitude and longitude, for example.

Furthermore, sensors that sense information on the peripheral environment of the delivery vehicle 3 include LIDAR (Light Detection and Ranging) or millimeter-wave radar, for example. LIDAR detects the distance to an object in the periphery of the delivery vehicle 3 or the relative speed of the delivery vehicle 3 by measuring the time from an infrared laser being radiated to the infrared laser being reflected by an object and returning. The delivery vehicle 3 can thereby read in a three-dimensional structure of the peripheral environment. Furthermore, with millimeter-wave radar, a measurement that is similar to that of LIDAR is performed but, rather than infrared rays, radio waves are used to measure the time to radio waves being reflected by an object and returning. LIDAR using radio waves can be used even at night but has the characteristic of functionality declining in poor weather, whereas millimeter-wave radar using radio waves, although having a resolution that is inferior to LIDAR, has the characteristic of detection being possible regardless of the weather. Therefore, by combining LIDAR and millimeter-wave radar rather than using these independently, the respective demerits thereof can be complemented.

Sensors that sense the state of the delivery vehicle 3 include, for example, odometers, inertial sensors, or the like. An odometer measures the distance advanced by the delivery vehicle 3 by measuring the number of tire revolutions. An inertial sensor is a sensor for detecting the amount of inertial movement, configured from a triaxial angular velocity sensor and a three-directional acceleration sensor, and detects the behavior of the delivery vehicle 3.

It should be noted that the sensors described above are examples, and the delivery vehicle 3 may perform autonomous driving using sensing information of other sensors. An arbitrary sensor may be used provided that the sensor is used for autonomous driving by the delivery vehicle 3.

The driving unit 35 is an engine and a transmission, for example, in a case where the delivery vehicle 3 is an engine vehicle. Furthermore, the driving unit 35 is a traveling motor and a transmission, for example, in a case where the delivery vehicle 3 is an electric automobile (battery vehicle) in the narrow sense. In both an engine and a traveling motor, starting and stopping are carried out by way of an ignition switch.

Next, using the flowchart of FIG. 8, a detailed description will be given regarding a vehicle control method that includes: deciding on a delivery vehicle on the basis of dispatch request information transmitted by a user and user identification information that identifies the user; setting control rights for controlling the movement of the delivery vehicle at a delivery source and a delivery destination; transmitting, to the user, control instruction support information for supporting the input of control instruction information to the delivery vehicle; and transmitting control right information to the delivery vehicle.

Figure 8:
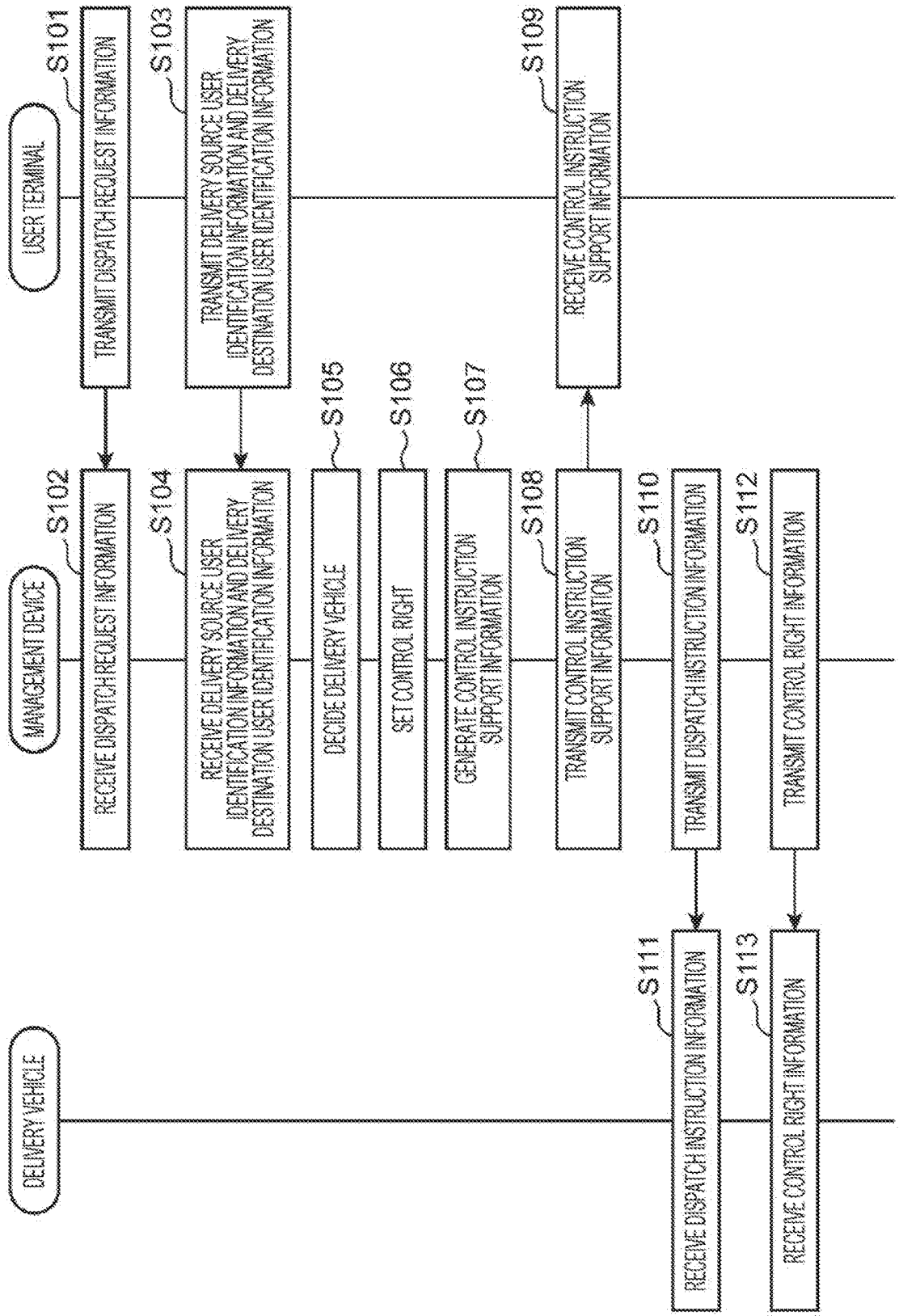
FIG. 8 is a flowchart for describing vehicle control processing carried out by the management device, the user terminal, and the delivery vehicle in embodiment 1 of the present disclosure.

FIG. 8 is a flowchart for describing vehicle control processing carried out by the management device, the user terminal, and the delivery vehicle in embodiment 1 of the present disclosure.

First, the communication unit 21 of the user terminal 2 transmits, to the management device 1, dispatch request information that includes user identification information for identifying a user or the user terminal 2 possessed by the user, and location information of a delivery source and location information of a delivery destination (step S101). The location information of the delivery source and the location information of the delivery destination includes GPS information constituted by latitude and longitude, an address, or the name of a facility, for example.

Next, the dispatch request information acquisition unit 121 of the management device 1 receives the dispatch request information transmitted from the user terminal 2, and stores the received dispatch request information in the dispatch request information storage unit 131 (step S102).

Next, the communication unit 21 of the user terminal 2 transmits, to the management device 1, delivery source user identification information for identifying a user who is to use the delivery vehicle 3 located at the delivery source or the user terminal 2 possessed by the user, and delivery destination user identification information for identifying a user who is to use the delivery vehicle 3 located at the delivery destination or the user terminal 2 possessed by the user (step S103). It should be noted that the user terminal 2 may transmit dispatch request information including the delivery source user identification information and the delivery destination user identification information to the management device 1. Furthermore, the user terminal 2 may transmit the delivery source user identification information and the delivery destination user identification information before transmitting the dispatch request information.

Furthermore, there are cases where the user terminal that transmits dispatch request information and the user terminal possessed by the user who is to use the delivery vehicle 3 located at the delivery source are different. For example, in a case where the user terminal that transmits the dispatch request information is a personal computer and the user terminal possessed by the user who is to use the delivery vehicle 3 located at the delivery source is a smartphone, the user terminal that transmits the dispatch request information and the user terminal possessed by the user who is to use the delivery vehicle 3 located at the delivery source are different. In this case, the user terminal 2 that transmits the dispatch request information may accept the selection of a user terminal possessed by the user who is to use the delivery vehicle 3 located at the delivery source, which is different from the user terminal 2, and may accept the input of delivery source user identification information that is different from the user identification information of the user terminal 2. Furthermore, after the user terminal possessed by the user who is to use the delivery vehicle 3 located at the delivery source has been selected, the user terminal 2 may accept, from the user, an alteration for the user terminal possessed by the user who is to use the delivery vehicle 3 located at the delivery source.

Similarly, the user terminal 2 that transmits the dispatch request information may accept the selection of a user terminal possessed by the user who is to use the delivery vehicle 3 located at the delivery destination, which is different from the user terminal 2, and may accept the input of delivery destination user identification information that is different from the user identification information of the user terminal 2. Furthermore, after the user terminal possessed by the user who is to use the delivery vehicle 3 located at the delivery destination has been selected, the user terminal 2 may accept, from the user, an alteration for the user terminal possessed by the user who is to use the delivery vehicle 3 located at the delivery destination.

Next, the user identification information acquisition unit 122 of the management device 1 receives the delivery source user identification information and the delivery destination user identification information transmitted from the user terminal 2 (step S104). It should be noted that, in a case where the delivery vehicle 3 is to deliver a person, the user who boards at the delivery source and the user who alights at the delivery destination are the same, and, in a case where the delivery requester is the user of the delivery vehicle 3, the user identification information included in the dispatch request information can be deemed to be the delivery source user identification information and the delivery destination user identification information. Therefore, in a case where the delivery requester is the user of the delivery vehicle 3, step S103 and step S104 in which the delivery source user identification information and the delivery destination user identification information are transmitted and received can be omitted.

Next, the delivery vehicle deciding unit 123 of the management device 1 decides on a delivery vehicle to be dispatched to the delivery source, using a predetermined delivery vehicle deciding algorithm, from the vehicle information of one or more vehicles being managed by the management device 1 (step S105). For example, the delivery vehicle deciding unit 123 uses a delivery vehicle deciding algorithm that decides, as the delivery vehicle, a vehicle that is in the location nearest the delivery source, from among the vehicles being managed by the management device 1, from the location information of the delivery source included in the dispatch request information. It should be noted that the delivery vehicle deciding algorithm may be an arbitrary delivery vehicle deciding algorithm provided that a delivery vehicle for the dispatch request information can be decided.

Next, the control right setting unit 124 of the management device 1 sets a control right for controlling the delivery vehicle 3 located at the delivery source, to the delivery source user identification information, and sets a control right for controlling the delivery vehicle 3 located at the delivery destination, to the delivery destination user identification information, on the basis of the dispatch request information, the delivery source user identification information, and the delivery destination user identification information (step S106).

It should be noted that, for example, a case where a child and a guardian thereof use the delivery vehicle, a case where an elderly person and a carer thereof use the delivery vehicle, or a case where a plurality of users use the delivery vehicle as a group at the delivery source or the delivery destination is feasible. Thus, in the present embodiment 1, the control right setting unit 124 may set a control right (vehicle control right) that permits control of the delivery vehicle located at the dispatch destination, to a plurality of users on the basis of the dispatch request information and the user identification information.

More specifically, the input unit 23 of the user terminal 2 accepts the input of: a plurality of items of delivery source user identification information for identifying a plurality of users who are to use the delivery vehicle 3 located at the delivery source or a plurality of user terminals 2 possessed by the plurality of users; and a plurality of items of delivery destination user identification information for identifying a plurality of users who are to use the delivery vehicle 3 located at the delivery destination or a plurality of user terminals 2 possessed by the plurality of users. The communication unit 21 transmits the plurality of items of delivery source user identification information and the plurality of items of delivery destination user identification information to the management device 1. The user identification information acquisition unit 122 of the management device 1 receives the plurality of items of delivery source user identification information and the plurality of items of delivery destination user identification information transmitted from the user terminals 2. The control right setting unit 124 sets control rights for controlling the delivery vehicle 3 located at the delivery source, to the plurality of items of delivery source user identification information, and sets control rights for controlling the delivery vehicle 3 located at the delivery destination, to the plurality of items of delivery destination user identification information. At such time, the control right setting unit 124 stores, in the control right information storage unit 134, control right information having associated therein a dispatch request identification number, information indicating either the delivery source or the delivery destination, a control-possible location, a plurality of items of user identification information, and vehicle identification information.

Furthermore, there are cases where a substitute recipient is to receive a package at a convenience store or the like when it is difficult for the user at the delivery destination to receive the package. Thus, in the present embodiment 1, the control right setting unit 124 may set a control right (vehicle control right) that permits control of the delivery vehicle located at the dispatch destination, to a substitute recipient who is different from the user on the basis of the dispatch request information and the user identification information. More specifically, the input unit 23 of the user terminal 2 accepts the input of delivery destination user identification information for identifying substitute recipients who are different from the user and are to use the delivery vehicle 3 located at the delivery destination or a plurality of user terminals 2 possessed by the substitute recipients. It should be noted that the control right setting unit 124 may automatically alter the control right to a substitute recipient.

Furthermore, there are also cases where the user alters the receiving destination of a package to a convenience store using the user terminal 2 because the condition of the user has suddenly deteriorated. In this case, the user terminal 2 transmits, to the management device 1, a receiving destination alteration request for altering the receiving destination of a package to a convenience store desired by the user. The control right setting unit 124 of the management device 1 alters the dispatch destination to the convenience store desired by the user, and also sets the control right to a terminal of the convenience store or an employee of the convenience store. The storage unit 13 of the management device 1 stores, in advance, receiving destination information having associated therein a receiving destination (for example, the name of a convenience store), location information of the receiving destination (for example, the address of the convenience store), and identification information of the receiving destination (for example, the terminal of an employee of the convenience store). It should be noted that the management device 1 may refer to or acquire receiving destination information from an external server. Upon acquiring a receiving destination alteration request from the user terminal 2, the management device 1 refers to the receiving destination information and alters the dispatch destination and the setting for assigning the control right.

Next, the control instruction support information generation unit 125 of the management device 1 generates control instruction support information for supporting the input of control instruction information to the delivery vehicle 3, with respect to delivery source user identification information or delivery destination user identification information to which a control right has been set (step S107). The control instruction support information is a control instruction screen for instructing control for the delivery vehicle 3, for example. Furthermore, the control instruction support information may be a screen that depicts an address representing a dedicated web page for instructing control for the delivery vehicle 3. In this case, a user is able to issue a control instruction to the delivery vehicle 3 via the control instruction screen or the control instruction dedicated web page using the user terminal 2.

Figure 9:
FIG. 9 is a drawing depicting an example of control instruction support information displayed on the user terminal in embodiment 1.

FIG. 9 is a drawing depicting an example of control instruction support information displayed on the user terminal 2 in the present embodiment 1. The control instruction support information depicted in FIG. 9 depicts an example of a screen indicating an address representing a control instruction dedicated web page. The user touches the address displayed on the screen, and the control instruction dedicated web page is thereby displayed on the display unit 22 of the user terminal 2.

Furthermore, in a case where an input device (not depicted) for the user to input control instruction information is mounted in the delivery vehicle 3, the control instruction support information may be information such as a password that is required in order for the user to input control instruction information via the input device mounted in the delivery vehicle 3. In this case, the user inputs information such as a password constituting control instruction support information, to the input device mounted in the delivery vehicle 3. The user can thereby issue a control instruction to the delivery vehicle 3. By adopting this configuration, it is possible to prevent a person other than the user controlling the delivery vehicle 3.

Next, the information transmission unit 126 of the management device 1 transmits control instruction support information to the user terminal 2 at the delivery source or the delivery destination to which a control right has been assigned, via the communication unit 11 (step S108). The management device 1 acquires, from users, user information that includes user contact address information indicating a user contact address for each user, and stores the user information in the user information storage unit 132. The information transmission unit 126 transmits control instruction support information to a user who has been assigned a control right, on the basis of the user information. The user information may be acquired in advance from users, or dispatch request information that includes user information may be acquired from users and the user information may be acquired from the dispatch request information. In a case where the delivery vehicle 3 is to deliver an object, the user at the delivery source and the user at the delivery destination are different, and either the user at the delivery source or the user at the delivery destination is different from the delivery requester. Therefore, the dispatch request information acquisition unit 121 acquires dispatch request information that includes user information of a person different from the delivery requester.

Next, the communication unit 21 of the user terminal 2 receives the control instruction support information transmitted from the management device 1 (step S109). The user can issue a control instruction for the delivery vehicle 3 on the basis of the control instruction support information transmitted to the user terminal 2.

Next, the information transmission unit 126 of the management device 1 transmits dispatch instruction information that is based on the dispatch request information, to the delivery vehicle 3 (step S110). The dispatch instruction information includes at least location information of the delivery source and location information of the delivery destination. The dispatch instruction information may include route information from the present location of the delivery vehicle 3 to the delivery source and route information from the delivery source to the delivery destination. In this case, the management device 1 generates route information. It should be noted that, as another configuration, the delivery vehicle 3 may generate route information from the present location of the vehicle to the delivery source and route information from the delivery source to the delivery destination, on the basis of location information of the delivery source and location information of the delivery destination in the dispatch instruction information.

The dispatch instruction information acquisition unit 323 of the delivery vehicle 3 receives dispatch instruction information that is based on the dispatch request information, transmitted from the management device 1 (step S111). The movement control unit 321 of the delivery vehicle 3 controls the movement of the vehicle on the basis of the dispatch instruction information.

Next, the information transmission unit 126 of the management device 1 transmits control right information relating to control rights that have been set by the control right setting unit 124, to the delivery vehicle 3 (step S112).

Next, the control right information acquisition unit 324 of the delivery vehicle 3 receives the control right information relating to control rights that have been set by the control right setting unit 124, transmitted from the management device 1 (step S113). The movement control unit 321 of the delivery vehicle 3 controls the delivery vehicle 3 on the basis of the control right information in a case where control instruction information for the delivery vehicle 3 has been received from outside.

Next, using the flowchart of FIG. 10, a detailed description will be given regarding processing for a case where the delivery vehicle 3 having acquired control right information from the management device 1 receives control instruction information for controlling the delivery vehicle 3 from outside.

Figure 10:
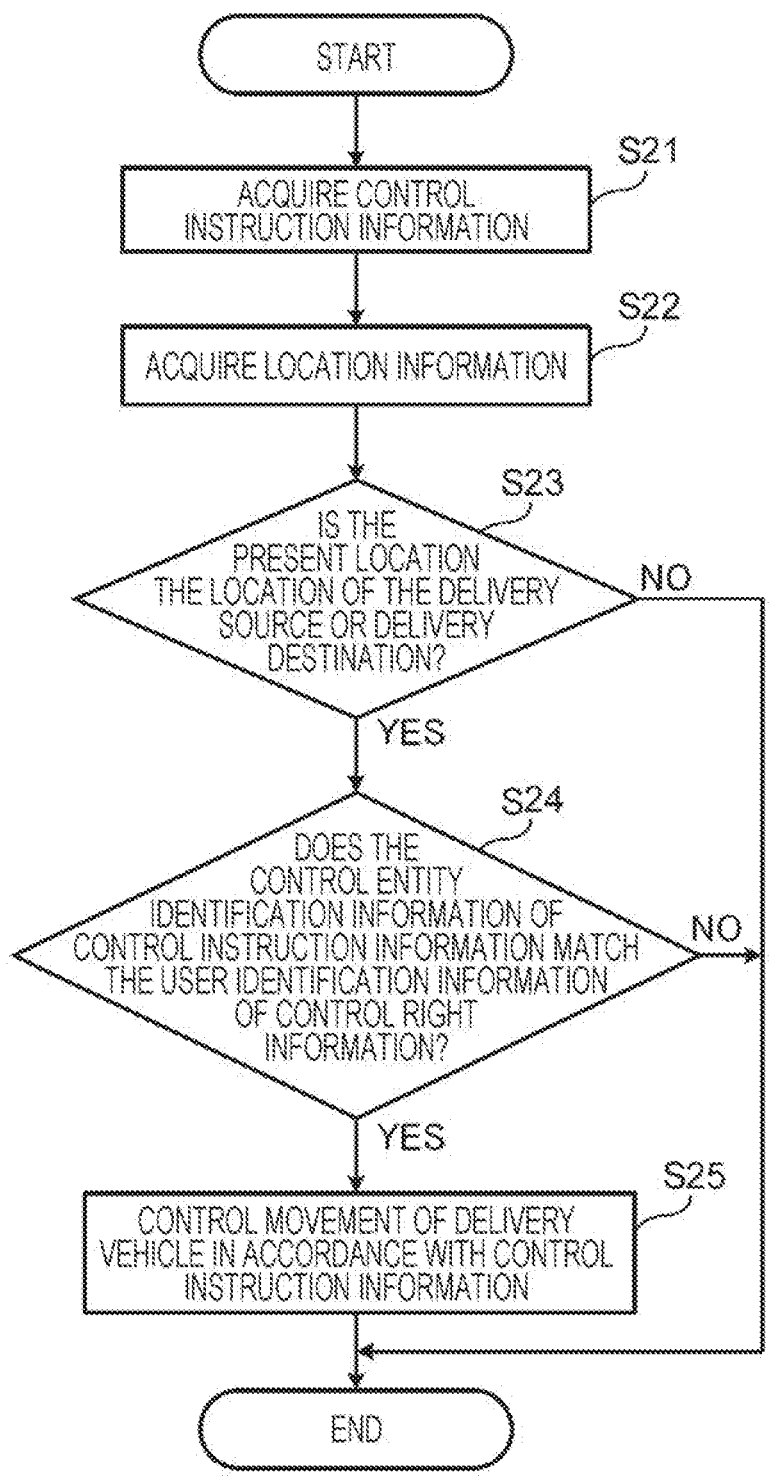
FIG. 10 is a flowchart for describing vehicle control processing carried out by the delivery vehicle in embodiment 1 of the present disclosure.

FIG. 10 is a flowchart for describing vehicle control processing carried out by the delivery vehicle in embodiment 1 of the present disclosure.

First, the control instruction information acquisition unit 325 of the delivery vehicle 3 receives control instruction information for controlling the delivery vehicle 3 (step S21). The control instruction information includes location information indicating a location to which the delivery vehicle 3 is to be moved by the user, for example.

Figure 11:
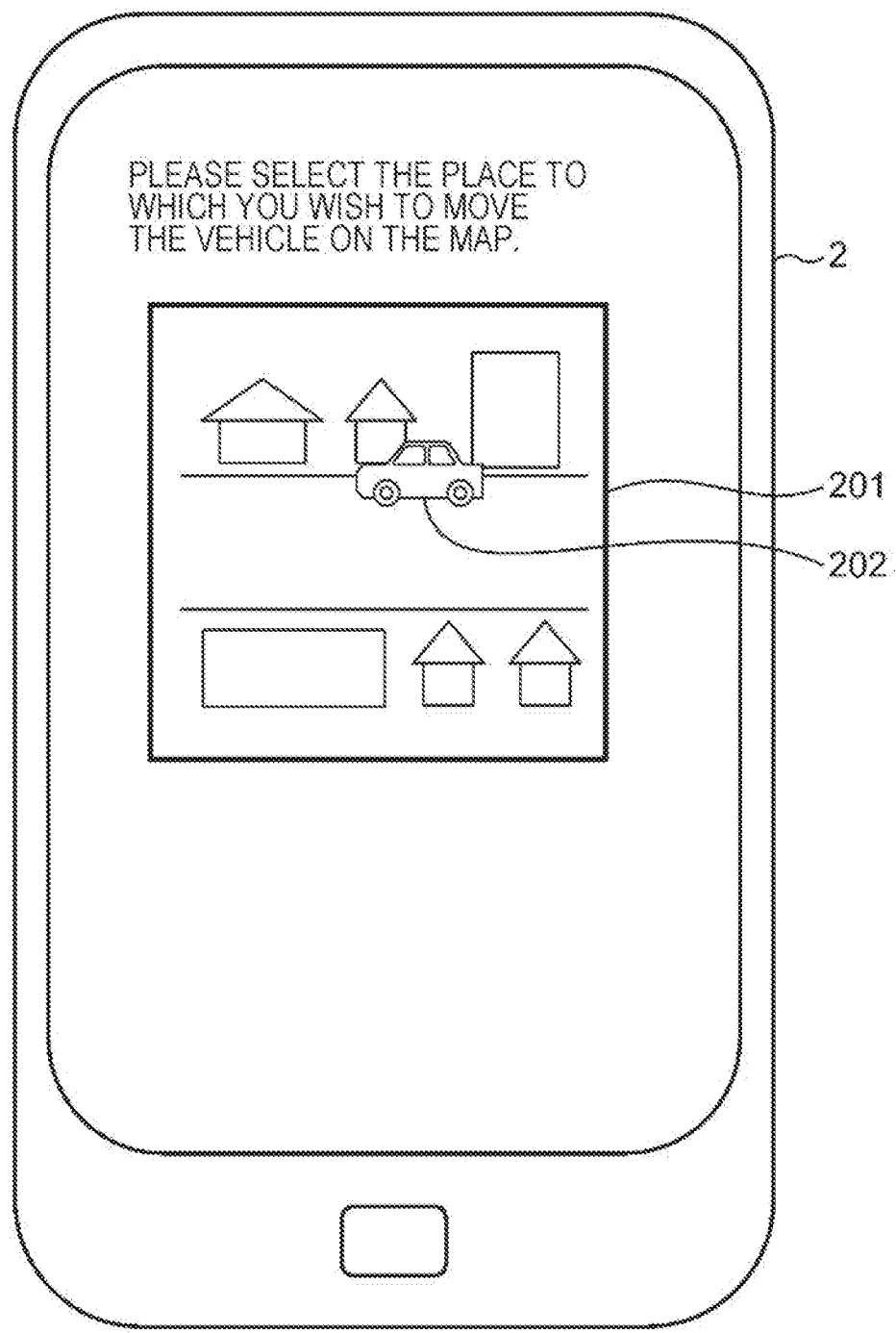
FIG. 11 is a drawing depicting an example of a display screen that accepts user input of control instruction information in the user terminal in embodiment 1.

FIG. 11 is a drawing depicting an example of a display screen that accepts user input of control instruction information in the user terminal 2 in the present embodiment 1. The display screen depicted in FIG. 11 displays a map image 201 of the vicinity of the delivery source or the delivery destination, and a vehicle image 202 representing the delivery vehicle 3 at the location of the delivery source or the delivery destination on the map image 201. In the display screen, the user designates a location to which he or she wishes the delivery vehicle 3 to be moved. For example, the user causes the vehicle image 202 on the map image 201 to move to a desired location. The communication unit 21 of the user terminal 2 transmits, to the delivery vehicle 3, control instruction information that includes location information indicating the location of the delivery vehicle 3 designated by the user. In this case, the delivery vehicle 3 moves toward the location indicated by the control instruction information. It should be noted that the control instruction information may include not only the location of the vehicle but also information indicating the orientation of the vehicle. In this case, the delivery vehicle 3 moves in such a way that the orientation of the vehicle matches the direction designated by the control instruction information, as well as moving toward the location designated by the control instruction information.

Furthermore, the user terminal 2 may display regions where vehicle parking or stopping is prohibited, in an identifiable manner on the map image 201. Regions where vehicle parking or stopping is prohibited can be acquired from map information. In addition, the user terminal 2 may determine whether or not the location of the vehicle image 202 after the movement that has been input by the user is within a region where parking or stopping is prohibited. In a case where it has been determined that the location of the vehicle image 202 after the movement is within a region where parking or stopping is prohibited, the user terminal 2 may display a warning image or may output a warning sound.

Furthermore, a method in which a direction in which the delivery vehicle 3 is to be moved and a distance by which the delivery vehicle 3 is to be moved are input is feasible as another method for inputting the control instruction information.

Figure 12:
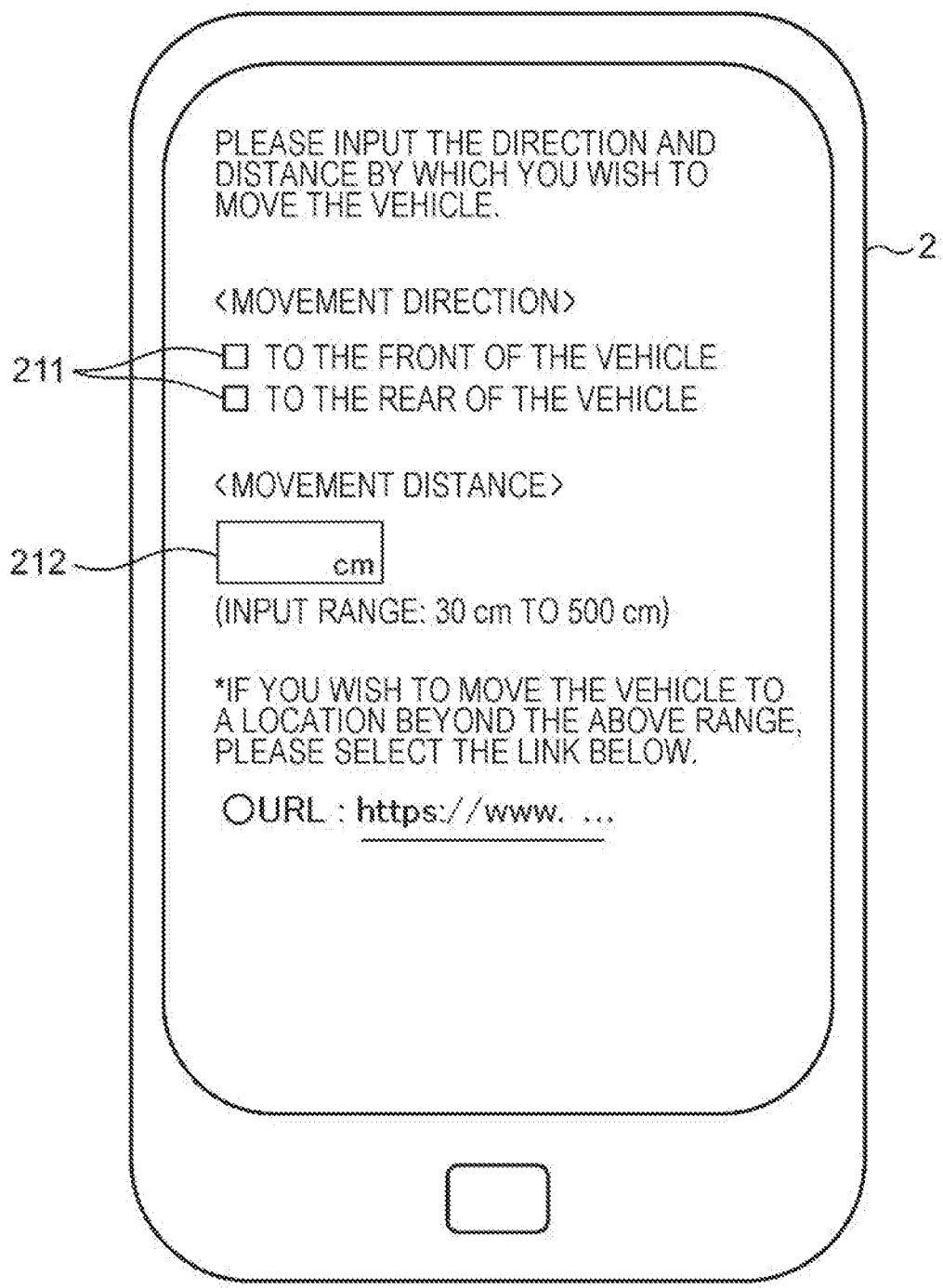
FIG. 12 is a drawing depicting another example of a display screen that accepts user input of control instruction information in the user terminal in embodiment 1.

FIG. 12 is a drawing depicting another example of a display screen that accepts user input of control instruction information in the user terminal 2 in the present embodiment 1. The display screen depicted in FIG. 12 displays first input fields 211 for inputting a direction in which the delivery vehicle 3 is to be moved, and a second input field 212 for inputting a distance by which the delivery vehicle 3 is to be moved. The first input fields 211 accept the selection of whether the vehicle is to be moved to the front or to the rear. The second input field 212 accepts the input of a distance by which the vehicle is to be moved. The communication unit 21 of the user terminal 2 transmits control instruction information that includes the direction and distance designated by the user to the delivery vehicle 3. In the display screen in FIG. 12, for example, in a case where information indicating the direction in which the delivery vehicle 3 is to be moved indicates to the front of the vehicle and information indicating the distance by which the delivery vehicle 3 is to be moved indicates 50 cm, the delivery vehicle 3 moves 50 cm to the front of the vehicle.

Returning to FIG. 10, next, the vehicle location information acquisition unit 322 acquires location information indicating the present location of the delivery vehicle 3 from the sensor unit 34 (step S22).

Next, the control-possible location determination unit 326 determines on the basis of the control right information whether or not the present location of the delivery vehicle 3 acquired by the vehicle location information acquisition unit 322 is the location of the delivery source or the location of the delivery destination indicated in the control right information (step S23).

Here, in a case where it has been determined the present location of the delivery vehicle 3 is not the location of the delivery source or the location of the delivery destination ("no" in step S23), processing ends without following the control instruction information.

However, in a case where it has been determined the present location of the delivery vehicle 3 is the location of the delivery source or the location of the delivery destination ("yes" in step S23), the control-possible entity determination unit 327 determines whether or not control entity identification information included in the control instruction information matches user identification information included in the control right information (step S24).

Here, in a case where it has been determined that the control entity identification information included in the control instruction information does not match the user identification information included in the control right information ("no" in step S24), processing ends without following the control instruction information.

However, in a case where it has been determined that the control entity identification information included in the control instruction information matches the user identification information included in the control right information ("yes" in step S24), the movement control unit 321 controls the movement of the delivery vehicle 3 in accordance with the acquired control instruction information (step S25).

Specifically, first, the movement control unit 321 determines whether or not the delivery vehicle 3 can be moved in accordance with the control instruction information. For example, in a case where there is an obstruction at the place of a movement destination to which movement is to be attempted in accordance with the control instruction information, it is not possible to move to that place. Therefore, before actually moving, the movement control unit 321 determines whether or not the delivery vehicle 3 can be moved in accordance with the control instruction information. This determination processing is carried out by, for example, specifying the place of the movement destination on the basis of the control instruction information, and determining whether or not an obstruction is present on the basis of information obtained by the sensor unit 34 carrying out sensing with respect to the specified place.

Next, the movement control unit 321 actually controls the movement of the delivery vehicle 3 on the basis of this determination result. Specifically, in a case where it has been determined that the delivery vehicle 3 can be moved to the movement destination, the movement control unit 321 controls the movement of the delivery vehicle 3 in accordance with the control instruction information. However, in a case where it has been determined that the delivery vehicle 3 cannot be moved to the movement destination, the movement control unit 321 does not follow the control instruction information and does not cause the delivery vehicle 3 to move.

It should be noted that there are cases where it is not possible to determine whether or not the delivery vehicle 3 can be moved to the movement destination when there is an obstruction between the present location of the delivery vehicle 3 and the place of the movement destination indicated by the control instruction information, or when the route from the present location of the delivery vehicle 3 to the place of the movement destination indicated by the control instruction information is curved. Thus, as another movement control method for the delivery vehicle 3, first, the movement control unit 321 starts movement of the delivery vehicle 3 in accordance with the control instruction information. The movement control unit 321 then repeatedly determines, while moving, whether or not it is possible for the delivery vehicle 3 to stop at the movement destination. In a case where it is determined that stopping is possible, the movement control unit 321 continues movement to the movement destination. However, in a case where it is determined that stopping is not possible, the movement control unit 321 causes the delivery vehicle 3 to stop at the present location.

It should be noted that, in a case where it is determined that stopping is not possible, the movement control unit 321 may notify the user terminal 2 that the delivery vehicle 3 cannot be stopped at the instructed movement destination. In this case, the user terminal 2 may accept user input of another movement destination. Furthermore, the user terminal 2 may present stopping-possible locations in the vicinity of the movement destination, and accept the user selection of a stopping-possible location. Furthermore, in a case where it is determined that stopping is not possible, the movement control unit 321 may search for the stopping-possible location that is nearest the present place on the movement route, and cause the delivery vehicle 3 to stop at that stopping-possible location. Furthermore, in a case where it is determined that stopping is not possible, the movement control unit 321 may search for the nearest stopping-possible location, and cause the delivery vehicle 3 to stop at that stopping-possible location.

Furthermore, in the present embodiment 1, the control instruction information may further include location information indicating the present location of the user terminal 2. The control unit 32 of the delivery vehicle 3 may be further provided with a user location determination unit that determines whether or not the present location of the user terminal 2 is in the vicinity of the present location of the delivery vehicle 3. In a case where it has been determined that the present location of the user terminal 2 is in the vicinity of the present location of the delivery vehicle 3, the movement control unit 321 controls the movement of the delivery vehicle 3 in accordance with the acquired control instruction information. However, in a case where it has been determined that the present location of the user terminal 2 is not in the vicinity of the present location of the delivery vehicle 3, processing ends without following the control instruction information. It should be noted that the user location determination unit determines that the present location of the user terminal 2 is in the vicinity of the present location of the delivery vehicle 3 in a case where the present location of the user terminal 2 is within a predetermined range from the present location of the delivery vehicle 3. Furthermore, the user location determination unit determines that the present location of the user terminal 2 is not in the vicinity of the present location of the delivery vehicle 3 in a case where the present location of the user terminal 2 is not within a predetermined range from the present location of the delivery vehicle 3.

The delivery vehicle 3 is thereby moved in a state in which the user is in the vicinity of the delivery vehicle 3, and therefore the user is able to cause the delivery vehicle 3 to move more safely while checking the periphery of the delivery vehicle 3.

It should be noted that the user location determination unit of the delivery vehicle 3 may determine whether or not short-range wireless communication radio waves output from the user terminal 2 have been detected. In a case where it has been determined that short-range wireless communication radio waves output from the user terminal 2 have been detected, the movement control unit 321 controls the movement of the delivery vehicle 3 in accordance with the acquired control instruction information. However, in a case where it has been determined that short-range wireless communication radio waves output from the user terminal 2 have not been detected, processing ends without following the control instruction information. The delivery vehicle 3 can detect short-range wireless communication radio waves output from the user terminal 2 if the distance between the delivery vehicle 3 and the user terminal 2 is short. Therefore, whether or not the user is in the vicinity of the delivery vehicle 3 can be easily determined by determining whether or not short-range wireless communication radio waves output from the user terminal 2 have been detected.

Furthermore, the user location determination unit of the delivery vehicle 3 may determine whether or not the strength of short-range wireless communication radio waves output from the user terminal 2 is greater than a predetermined threshold value. In a case where it has been determined that the strength of short-range wireless communication radio waves output from the user terminal 2 is greater than the predetermined threshold value, the movement control unit 321 controls the movement of the delivery vehicle 3 in accordance with the acquired control instruction information. However, in a case where it has been determined that the strength of short-range wireless communication radio waves output from the user terminal 2 is less than or equal to the predetermined threshold value, processing ends without following the control instruction information. The strength of short-range wireless communication radio waves detected by the delivery vehicle 3 increases if the distance between the delivery vehicle 3 and the user terminal 2 is short. Therefore, whether or not the user is in the vicinity of the delivery vehicle 3 can be easily determined by determining whether or not the strength of short-range wireless communication radio waves output from the user terminal 2 is greater than the predetermined threshold value.

In the present embodiment 1, the processing of step S24 performed by the control-possible entity determination unit 327 is carried out after the processing of step S23 performed by the control-possible location determination unit 326; however, it should be noted that the processing performed by the control-possible location determination unit 326 may be carried out after the processing performed by the control-possible entity determination unit 327, and an effect similar to the aforementioned can be obtained.

It should be noted that the control unit 32 of the delivery vehicle 3 may be further provided with a control-possible state determination unit (not depicted) in addition to the control-possible location determination unit 326 and the control-possible entity determination unit 327. The control-possible state determination unit determines whether the delivery vehicle 3 is moving or has stopped. In a case where it has been determined by the control-possible state determination unit that the delivery vehicle 3 has stopped, the movement control unit 321 may control the movement of the delivery vehicle 3 in accordance with the control instruction information. Furthermore, in a case where it has been determined by the control-possible state determination unit that the delivery vehicle 3 is moving, the movement control unit 321 may prohibit movement of the delivery vehicle 3.

When the delivery vehicle 3 is to be moved in accordance with the control instruction information while the delivery vehicle 3 has not yet arrived at the destination, that is, while the delivery vehicle 3 is moving, determination processing for selecting whether to move to the destination or to move in accordance with the control instruction information is necessary. However, this determination processing becomes unnecessary by adopting the present configuration, and therefore the amount of processing can be reduced.

Furthermore, in a case where the user is to cause the delivery vehicle 3 to move via an input device mounted in the delivery vehicle 3, it is dangerous for the user to input control instruction information via the input device of the delivery vehicle 3 while the delivery vehicle 3 is moving. Therefore, the user is able to input control instruction information in a safe manner by adopting a configuration in which the input of control instruction information is not accepted while the delivery vehicle 3 is moving.

According to the above configuration, a control right for controlling the delivery vehicle 3 located at the delivery source and the delivery destination can be set to a user, and therefore the user is able to cause the delivery vehicle 3 to move in a case where the delivery vehicle 3 has stopped in a location that is inconvenient for the user.

Furthermore, in the present configuration, it is possible for the delivery vehicle 3 to be controlled only when the delivery vehicle 3 is located at the delivery source or the delivery destination. It is therefore possible to prevent the user causing the delivery vehicle 3 to move when the delivery vehicle 3 is located in a place other than the delivery source and the delivery destination, that is, when control of the delivery vehicle 3 is not necessary.

In the present embodiment 1, a control right for controlling the delivery vehicle 3 located at the delivery source is set to delivery source user identification information, and a control right for controlling the delivery vehicle 3 located at the delivery destination is set to delivery destination user identification information; however, it should be noted that a delivery source control right exercisable range and a delivery destination control right exercisable range representing regions in which control instructions can be issued to the delivery vehicle 3 may be decided in accordance with a predetermined rule and on the basis of location information of the delivery source and location information of the delivery destination, a control right for controlling the delivery vehicle 3 located in the delivery source control right exercisable range may be set to the delivery source user identification information, and a control right for controlling the delivery vehicle 3 located in the delivery destination control right exercisable range may be set to the delivery destination user identification information.

In the present embodiment 1, in a case where the user inputs control instruction information that causes the delivery vehicle 3 to move, the delivery vehicle 3 is moved, and then the user once again instructs control for the delivery vehicle 3, even if the user has once again input control instruction information for the delivery vehicle 3, the location of the delivery vehicle 3 is now different from the location of the delivery source and the location of the delivery destination, and therefore the delivery vehicle 3 is never controlled in accordance with the control instruction information. However, in the present configuration, in a case where the user inputs control instruction information that causes the delivery vehicle 3 to move, the delivery vehicle 3 is moved, and then the user once again instructs control for the delivery vehicle 3, provided that the location of the delivery vehicle 3 is within the delivery source control right exercisable range or the delivery destination control right exercisable range, it is possible for the user to issue a control instruction to the delivery vehicle 3. In a case where the location of the delivery vehicle 3 is to be moved in a precise manner, in other words, in a case where the delivery vehicle 3 is to be moved in units of tens of cm, for example, it is difficult for the delivery vehicle 3 to be moved to the desired place with a single control instruction, and therefore the delivery vehicle 3 is moved several times. In this kind of situation, with the present configuration, it is possible for the user to issue control instructions a plurality of times, although within a limited range.

It should be noted that, in the present configuration, it is desirable for information indicating the decided delivery source control right exercisable range and the delivery destination control right exercisable range to be included in the control instruction support information and transmitted to the user. By adopting this configuration, the user is able to issue a control instruction for the delivery vehicle 3 while checking the delivery source control right exercisable range and the delivery destination control right exercisable range. It should be noted that, in a case where control instruction support information that includes information indicating the delivery source control right exercisable range and the delivery destination control right exercisable range is displayed on the user terminal 2, it is preferable for the location of the delivery vehicle 3 to be displayed in a superposed manner. It is thereby possible for the user to comprehend the location of the delivery vehicle 3, the delivery source control right exercisable range, and the delivery destination control right exercisable range even when having issued control instructions a plurality of times. In this case, it is desirable for the user terminal 2 to periodically update the location of the delivery vehicle 3 after having moved in accordance with a control instruction. By adopting this configuration, the user is able to comprehend the present location of the delivery vehicle 3, and is therefore able to comprehend where the delivery vehicle 3 is present within the delivery source control right exercisable range and the delivery destination control right exercisable range.

The control right setting unit 124 generates a control right exercisable range (control permitted range) in which a user is permitted to control the delivery vehicle at the dispatch destination, on the basis of the location of the dispatch destination. It should be noted that the control right setting unit 124 generates a delivery source control right exercisable range in which a user is permitted to control the delivery vehicle at the delivery source, on the basis of the location of the delivery source. Furthermore, the control right setting unit 124 generates a delivery destination control right exercisable range in which a user is permitted to control the delivery vehicle at the delivery destination, on the basis of the location of the delivery destination. The location of the delivery source and the location of the delivery destination are represented by latitude and longitude (GPS information), an address, or the name of a facility, for example.

The control right setting unit 124 then sets a control right (vehicle control right) that permits control of the delivery vehicle located within a control right exercisable range, to a user. It should be noted that the control right setting unit 124 sets a control right that permits control of the delivery vehicle located within the delivery source control right exercisable range, to a user. Furthermore, the control right setting unit 124 sets a control right that permits control of the delivery vehicle located within the delivery destination control right exercisable range, to a user.

As a method for deciding the delivery source control right exercisable range and the delivery destination control right exercisable range on the basis of location information of the delivery source and location information of the delivery destination, a method is feasible in which predetermined ranges from the places indicated by the location information of the delivery source and the delivery destination are decided as the delivery source control right exercisable range and the delivery destination control right exercisable range, for example.

Figure 13:
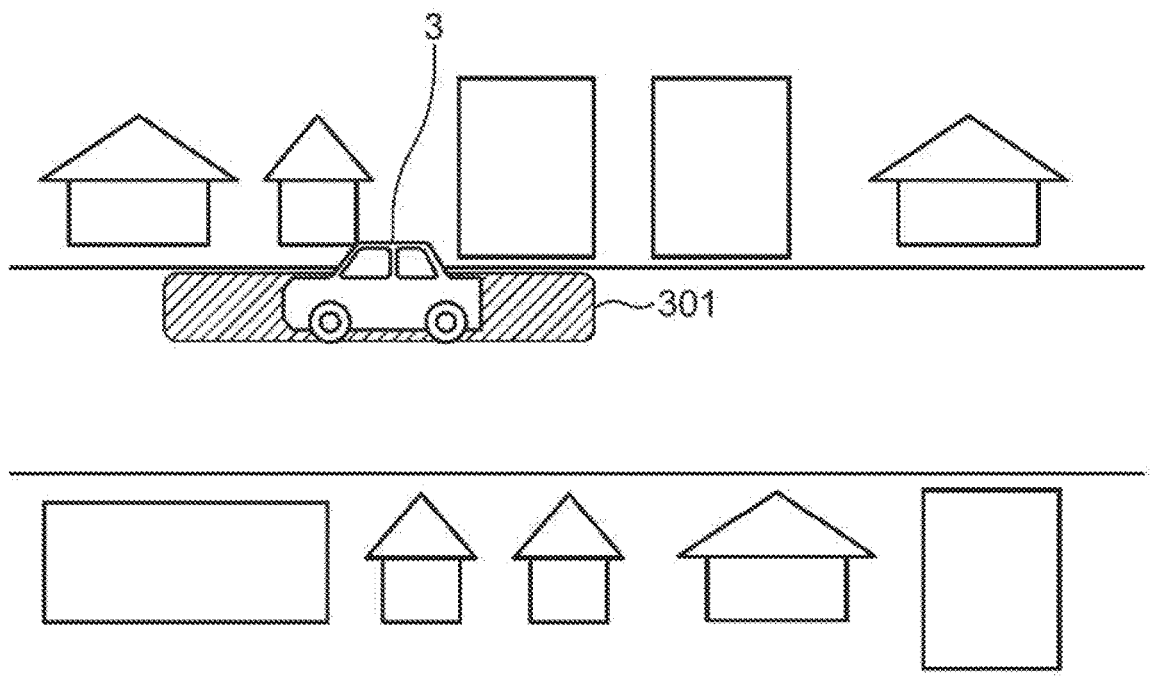
FIG. 13 is a schematic drawing for describing a delivery source control right exercisable range and a delivery destination control right exercisable range in embodiment 1.

FIG. 13 is a schematic drawing for describing the delivery source control right exercisable range and the delivery destination control right exercisable range in the present embodiment 1. As a specific example, the control right setting unit 124 decides a delivery source control right exercisable range 301 as being a region obtained by a region having the width of the delivery vehicle 3 being extended 3 m to the front and to the rear along a roadway from the location of the delivery source. The region indicated by the diagonal lines in FIG. 13 is the delivery source control right exercisable range 301. It should be noted that the delivery destination control right exercisable range is decided in a manner similar to the delivery source control right exercisable range. Furthermore, the location of the delivery source and the location of the delivery destination are represented by latitude and longitude (GPS information), for example.

Furthermore, as another method for deciding the delivery source control right exercisable range and the delivery destination control right exercisable range, a method is feasible in which, in a case where location information of the delivery source or location information of the delivery destination is indicated by an address, the residence indication scheme is used and regions indicated by addresses are decided as the delivery source control right exercisable range and the delivery destination control right exercisable range.

Residence indication schemes are broadly divided into the city block method and the road method, and these schemes and the regions indicated by addresses for the delivery source and the delivery destination will be described next.

First, the scheme of the city block method that is mainly adopted in Japan will be described. In the city block method, in principle, divisions (blocks) surrounded by roads are taken as units (city blocks), and one town name is configured of one or more city blocks. Codes that are referred to as city block codes are assigned in the city block method. These city block codes are a scheme in which the periphery of a city block is divided every 10 to 15 m, with the corner near the center of the municipality serving as the starting point and the distance being measured in the clockwise direction along the outer periphery of the city block from the starting point, and basic numbers of 1, 2, 3, . . . being sequentially assigned to the divisions. For example, in the case of a residence indication such as " . . . district X, block Y, building Z", the Y portion is a number indicating the city block, and the Z portion is the basic number.

A residence indication according to this city block method is represented by a basic number for a location adjoining the entrance or main doorway of a building that is the subject of the residence indication.

Figure 14:
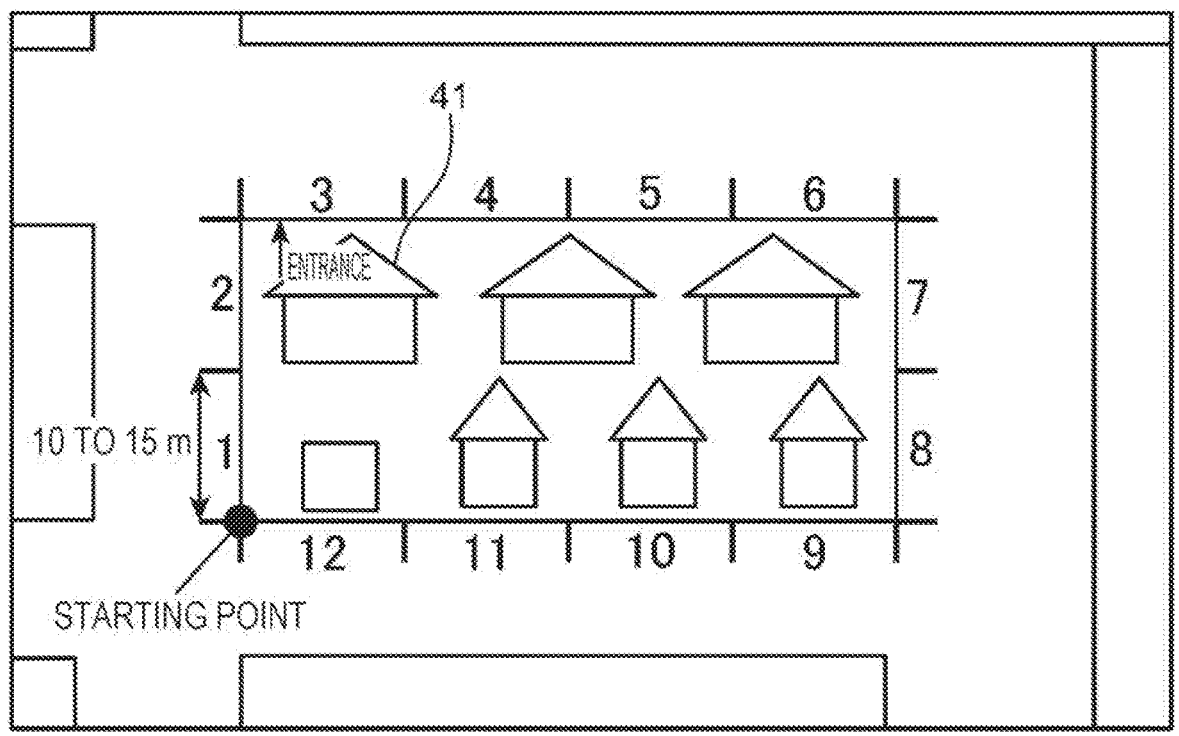
FIG. 14 is a schematic drawing for describing residence indications according to a city block method in embodiment 1.

FIG. 14 is a schematic drawing for describing residence indications according to the city block method in the present embodiment 1. In the city block depicted in FIG. 14, basic numbers of "1", "2", "3", . . . "12" are sequentially assigned in the clockwise direction along the outer periphery from a starting point. In FIG. 14, the residence indication of a building 41 is represented by the basic number of the location adjoining the entrance of the building 41, and therefore, for example, the portion corresponding to the building (the aforementioned Z) of the residence indication for the building 41 is "3". Therefore, in a case where the address of the building 41 has been designated as the delivery source, the delivery source control right exercisable range becomes the entire region corresponding to the basic number "3" indicated by the residence indication. In a case where residence indications according to the city block method are used, a range of 1.5 m, for example, from the edge of the road within a region indicated by an address may be decided as the delivery source control right exercisable range and the delivery destination control right exercisable range.

FIG. 15 is a schematic drawing for describing the delivery source control right exercisable range and the delivery destination control right exercisable range, which are decided using residence indications according to the city block method, in the present embodiment 1. The control right setting unit 124, using residence indications according to the city block method, decides a range of 1.5 m from the edge of the road within the region indicated by the address of the building 41 that is the delivery source as a delivery source control right exercisable range 302. The region indicated by the diagonal lines in FIG. 15 is the delivery source control right exercisable range 302. It should be noted that the delivery destination control right exercisable range is decided in a manner similar to the delivery source control right exercisable range.

Next, the scheme of the road method that is mainly adopted outside of Japan will be described. The road method is a scheme configured of road names and residence numbers that are assigned to buildings adjoining the road in question or having a road that leads to the road in question. Therefore, a residence indication according to the road method is represented by the name of the road faced by a building and a residence number assigned to the building.

FIG. 16 is a schematic drawing for describing residence indications according to the road method in the present embodiment 1. In FIG. 16, residence numbers are assigned to buildings along a road having the name "ABC Street". In FIG. 16, residence numbers that are odd numbers are assigned to the buildings on one side of the road, and residence numbers that are even numbers are assigned to buildings on the other side. The method for assigning residence numbers is different depending on the country or region, but the scheme for indicating residences is the same due to the names of roads and the residence numbers that are assigned to buildings. In FIG. 16, the residence indication for the building 41 is "1", and the range of the building 41 is the region of the portion of the road adjoined by the building 41. Therefore, in a case where the address for the building 41 is designated as the delivery source, the location designated as the delivery source is the region of the portion of the road adjoined by the building 41 indicated by the residence indication.

In a case where residence indications according to the road method are used, a range of 1.5 m, for example, from the edge of the road within the region indicated by an address may be decided as the delivery source control right exercisable range and the delivery destination control right exercisable range.

Figure 17:
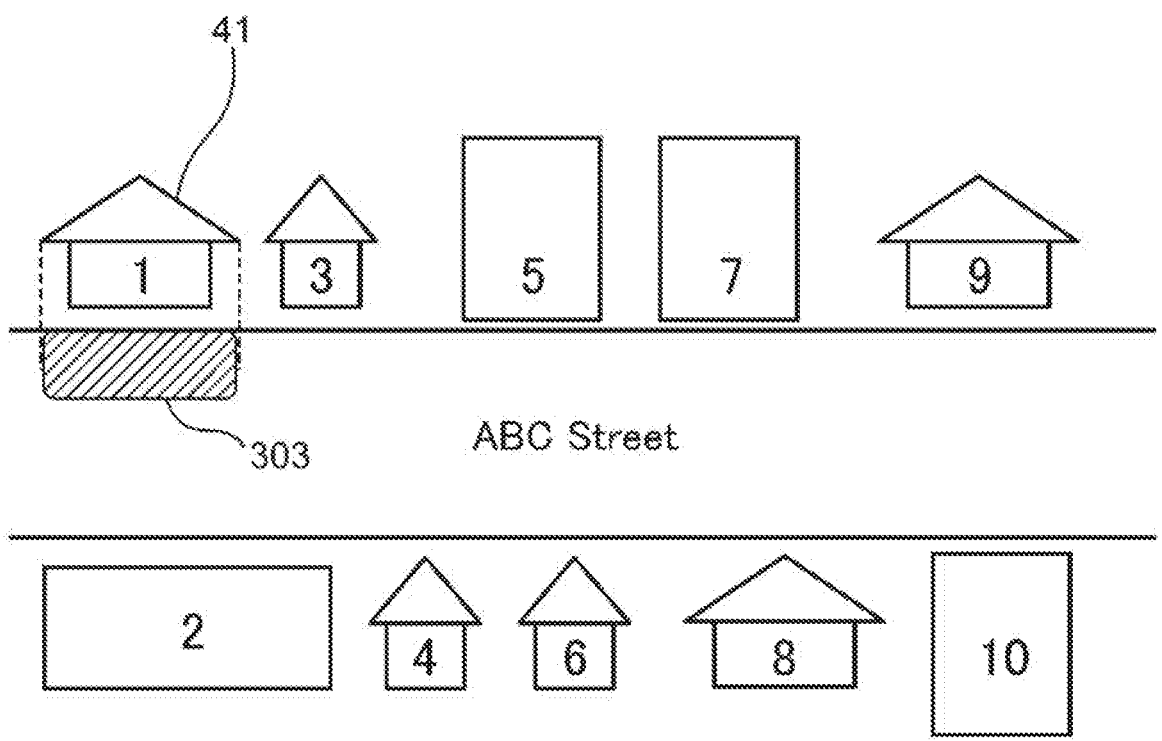
FIG. 17 is a schematic drawing for describing the delivery source control right exercisable range and the delivery destination control right exercisable range, which are decided using residence indications according to the road method, in embodiment 1.

FIG. 17 is a schematic drawing for describing the delivery source control right exercisable range and the delivery destination control right exercisable range, which are decided using residence indications according to the road method, in the present embodiment 1. The control right setting unit 124, using residence indications according to the road method, decides a range of 1.5 m from the edge of the road within the region indicated by the address of the building 41 that is the delivery source as a delivery source control right exercisable range 303. The region indicated by the diagonal lines in FIG. 17 is the delivery source control right exercisable range 303.

In this way, an address represented by a residence indication indicates a region rather than indicating a point, and therefore, in a case where location information of the delivery source is indicated by an address, the control right setting unit 124 may decide the delivery source control right exercisable range on the basis of the residence indication scheme. With this configuration, since the scheme of residence indication is used, the delivery source control right exercisable range or the delivery destination control right exercisable range can be decided by means of a simple configuration. In the aforementioned example, a range of 1.5 m from the edge of the road is decided as the delivery source control right exercisable range or the delivery destination control right exercisable range; however, it should be noted that an arbitrary method may be used provided it is a method for deciding the delivery source control right exercisable range or the delivery destination control right exercisable range using a residence indication scheme.

Furthermore, as another method for deciding the delivery source control right exercisable range and the delivery destination control right exercisable range, a method is feasible in which, in a case where location information of the delivery source or location information of the delivery destination are indicated by the name of a facility, the address of a facility is specified by means of the name of the facility, and a region indicated by the specified address is decided as the delivery source control right exercisable range and the delivery destination control right exercisable range. It should be noted that it may be possible for the size of the delivery source control right exercisable range and the delivery destination control right exercisable range decided on the basis of the name of a facility to be altered by the owner of the facility, an administrator, or the like. For example, in a case where there are places where stopping is permitted and places where stopping is prohibited within a facility, the owner of the facility, the administrator, or the like may set the delivery source control right exercisable range and the delivery destination control right exercisable range to the range of a place where stopping within the facility is permitted.

It should be noted that, in a case where the user wishes to control the delivery vehicle 3 beyond the delivery source control right exercisable range or the delivery destination control right exercisable range, a vehicle operator of a dispatch service provider may receive a request from the user and control the delivery vehicle 3. At such time, control instruction support information may include control request information for requesting the vehicle operator of the dispatch service provider to control the delivery vehicle 3. With this configuration, the vehicle operator of the dispatch service provider who has received the request remotely operates the delivery vehicle 3.

Here, in a case where the delivery vehicle 3 is to be controlled without assigning a control right for the delivery vehicle 3 to the user, a configuration is feasible in which, ordinarily, the user controls the delivery vehicle 3 via the vehicle operator of the dispatch service provider. However, in the present embodiment 1, it is assumed that the user, who is in the same place as the delivery vehicle 3, causes the delivery vehicle 3 to move in a very precise range of several cm to several tens of cm. Therefore, the delivery vehicle 3 being controlled directly by the user at the delivery source or the delivery destination is more desirable than the delivery vehicle 3 being controlled by way of a vehicle operator of the dispatch service provider in a remote location.

In the present embodiment 1, a control right for controlling the delivery vehicle 3 located at the delivery source is set to the delivery source user identification information, and a control right for controlling the delivery vehicle 3 located at the delivery destination is set to the delivery destination user identification information; however, it should be noted that a delivery source control-possible range and a delivery destination control-possible range representing regions in which the delivery vehicle 3 can move according to control instruction information may be decided in accordance with a predetermined rule and on the basis of location information of the delivery source and location information of the delivery destination, a control right for controlling, within the delivery source control-possible range, the delivery vehicle 3 located at the delivery source may be set to the delivery source user identification information, and a control right for controlling, within the delivery destination control-possible range, the delivery vehicle 3 located at the delivery destination may be set to the delivery destination user identification information.

The control right setting unit 124 generates a control-possible range (movement control permitted range) in which the movement of the delivery vehicle can be controlled by the user at the dispatch destination, on the basis of the location of the delivery destination. It should be noted that the control right setting unit 124 generates a delivery source control-possible range in which the delivery vehicle can move at the delivery source, on the basis of the location of the delivery source. Furthermore, the control right setting unit 124 generates a delivery destination control-possible range in which the delivery vehicle can move at the delivery destination, on the basis of the location of the delivery destination. The location of the delivery source and the location of the delivery destination are represented by latitude and longitude (GPS information), an address, or the name of a facility, for example.

The control right setting unit 124 then sets a control right (vehicle control right) that permits movement control of the delivery vehicle within a control-possible range, to a user. It should be noted that the control right setting unit 124 sets a control right that permits movement control of the delivery vehicle within the delivery source control-possible range, to a user. Furthermore, the control right setting unit 124 sets a control right that permits movement control of the delivery vehicle within the delivery destination control-possible range, to a user.

In the case of the present embodiment 1, there are no restrictions to the regions in which the delivery vehicle 3 can move according to control instruction information, and therefore a user is able to issue a control instruction to the delivery vehicle 3 to move to an arbitrary place. Therefore, a user is able to issue a control instruction to the delivery vehicle 3 having arrived at the delivery source, in such a way that the delivery vehicle 3 moves to a transit point that is different from the delivery destination. For example, if a user causes the delivery vehicle 3 to move from the delivery source to a transit point and loads a package at the transit point, a user is able to load a package also at the transit point in addition to the delivery source, and is able to deliver the packages loaded at the delivery source and the transit point to the delivery destination. This goes beyond the category of the original purpose of causing the delivery vehicle 3 to move to a location where it is easy for a user to load a package or a location where it is easy for a user to unload a package, or causing the delivery vehicle 3 to move to a location where it is easy for a user to board or a location where it is easy for a user to alight.

However, by adopting the present configuration, it is possible to limit the regions in which the delivery vehicle 3 can move according to control instruction information, and therefore a user is able to prevent the delivery vehicle 3 being controlled for a purpose that is different from the original purpose, such as a transit point being set between the delivery source and the delivery destination and a package being loaded at that transit point and being delivered to the delivery destination. Furthermore, also in the case where the delivery vehicle 3 is to deliver a person, a user is able to prevent the delivery vehicle being controlled for a purpose that is different from the original purpose, such as a transit point being set between the delivery source and the delivery destination and a person other than the user being allowed to board at that transit point and being delivered to the delivery destination.

It should be noted that, in a case where a user wishes to control the delivery vehicle 3 beyond the delivery source control-possible range or the delivery destination control-possible range, the vehicle operator of the dispatch service provider may receive a request from the user and control the delivery vehicle 3. At such time, control instruction support information may include control request information for requesting the vehicle operator of the dispatch service provider to control the delivery vehicle 3. With this configuration, the vehicle operator of the dispatch service provider who has received the request remotely operates the delivery vehicle 3.

It should be noted that, in the present configuration, it is desirable for information indicating the decided delivery source control-possible range and delivery destination control-possible range to be included in the control instruction support information and transmitted to a user. By adopting this configuration, the user is able to issue a control instruction for the delivery vehicle 3 while checking the delivery source control-possible range and the delivery destination control-possible range.

As methods for deciding the delivery source control-possible range and the delivery destination control-possible range on the basis of location information of the delivery source and location information of the delivery destination, it is possible to use methods exemplified by the methods for deciding the delivery source control right exercisable range and the delivery destination control right exercisable range.

In other words, the control right setting unit 124 may decide a predetermined range from places indicated by GPS information (latitude and longitude) of the delivery source and the delivery destination as the delivery source control-possible range and the delivery destination control-possible range. Furthermore, the control right setting unit 124 may decide regions indicated by addresses for the delivery source and the delivery destination as the delivery source control-possible range and the delivery destination control-possible range. Furthermore, the control right setting unit 124 may specify addresses of facilities from names of facilities for the delivery source and the delivery destination, and decide regions indicated by the specified addresses as the delivery source control-possible range and the delivery destination control-possible range. It should be noted that it may be possible for the size of the delivery source control-possible range and the delivery destination control-possible range decided on the basis of the name of a facility to be altered by the owner of the facility, the administrator, or the like. For example, in a case where there are places where stopping is permitted and places where stopping is prohibited within a facility, the owner of the facility, the administrator, or the like may set the delivery source control-possible range and the delivery destination control-possible range to the range of a place where stopping within the facility is permitted.

It should be noted that both the delivery source control right exercisable range and the delivery source control-possible range may be set in the delivery source user identification information. Similarly, both the delivery destination control right exercisable range and the delivery destination control-possible range may be set in the delivery destination user identification information. In this case, the delivery source control-possible range and the delivery source control right exercisable range may be the same. With this configuration, the amount of processing can be reduced since it is not necessary to decide the regions separately, and the amount of information that is stored can also be reduced since the same region information is used.

It should be noted that, in a case where a control instruction for the delivery vehicle 3 is issued from the user terminal 2, a configuration in which the user terminal 2 transmits control instruction information directly to the delivery vehicle 3 and a configuration in which the user terminal 2 transmits control instruction information to the delivery vehicle 3 via the management device 1 are feasible. Furthermore, with regard to control possibility determination processing for determining whether or not the movement of the delivery vehicle 3 is to be controlled on the basis of control instruction information, a configuration in which said processing is carried out by the delivery vehicle 3 and a configuration in which said processing is carried out by the management device 1 are feasible.

In a case where the user terminal 2 transmits control instruction information directly to the delivery vehicle 3, as described in the present embodiment 1, the delivery vehicle 3 determines whether or not the movement of the delivery vehicle 3 is to be controlled in accordance with the control instruction information from the user terminal 2. However, in a case where the user terminal 2 transmits control instruction information to the delivery vehicle 3 via the management device 1, the management device 1 or the delivery vehicle 3 may determine whether or not the movement of the delivery vehicle 3 is to be controlled in accordance with the control instruction information from the user terminal 2. Furthermore, a portion of the determination processing as to whether or not the movement of the delivery vehicle 3 is to be controlled may be carried out by the management device 1 and the remaining portion may be carried out by the delivery vehicle 3, in accordance with the control instruction information from the user terminal 2.

Figure 18:
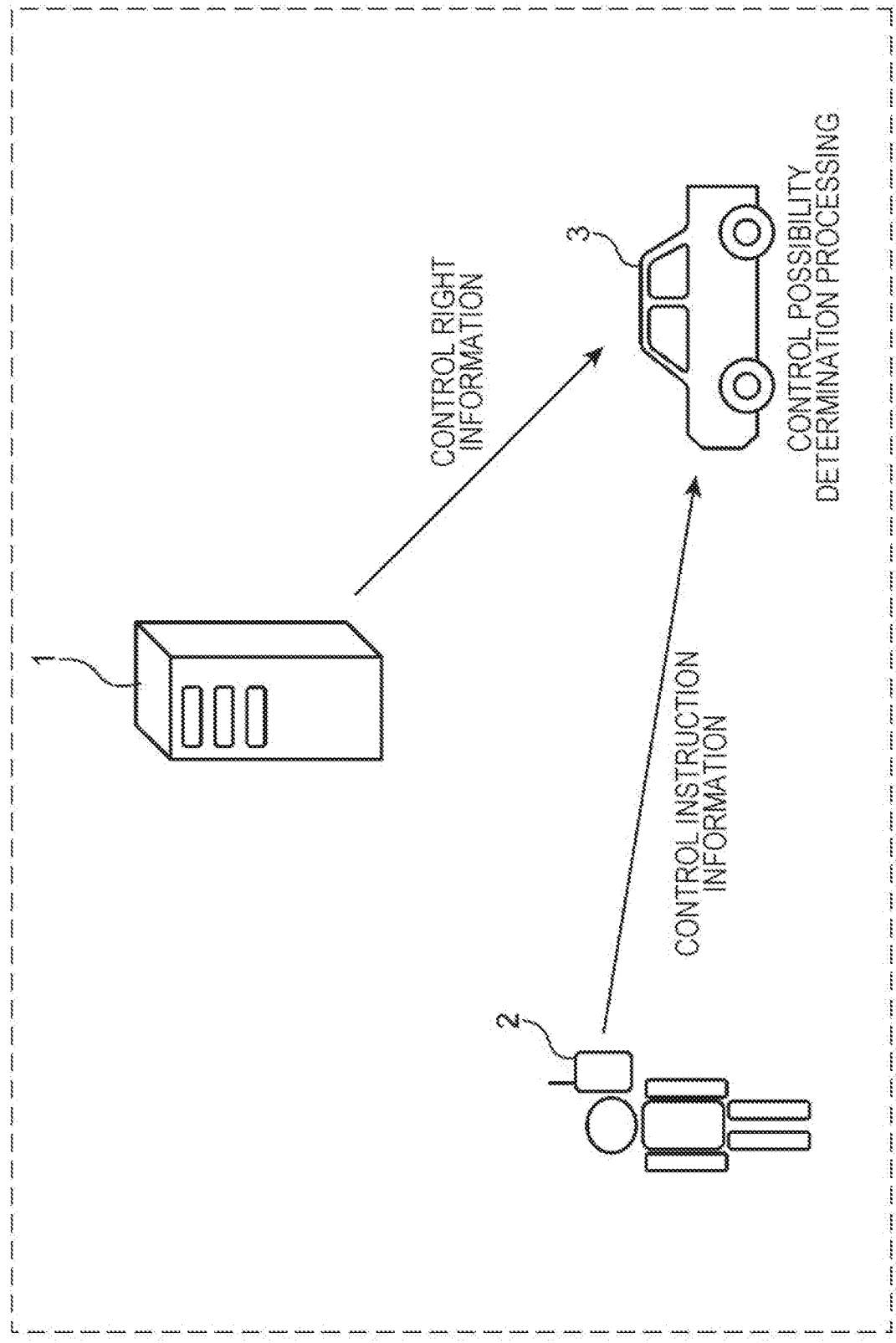
FIG. 18 is a schematic drawing for describing processing for controlling the movement of the delivery vehicle in embodiment 1.

FIG. 18 is a schematic drawing for describing processing for controlling the movement of the delivery vehicle in the present embodiment 1.

In the present embodiment 1, the management device 1 transmits control right information to the delivery vehicle 3, as depicted in FIG. 18. The delivery vehicle 3 receives the control right information transmitted by the management device 1. The control right information includes control permitted location information indicating a control permitted location where control of the delivery vehicle 3 by a user is permitted, and control entity identification information for identifying a control entity that is to control the delivery vehicle 3 at the control permitted location. The user terminal 2 transmits control instruction information to the delivery vehicle 3. The control instruction information includes location information indicating a location to which the delivery vehicle 3 is to be moved, and control entity identification information for identifying the user terminal 2. The delivery vehicle 3 receives the control instruction information transmitted by the user terminal 2.

The delivery vehicle 3 then carries out control possibility determination processing for determining whether or not the movement of the delivery vehicle 3 is to be controlled. It should be noted that the control possibility determination processing includes: processing for determining whether or not the present location is a control permitted location indicated by the control permitted location information, carried out by the control-possible location determination unit 326; and processing for determining whether or not the control entity identification information included in the control instruction information matches the control entity identification information included in the control right information, carried out by the control-possible entity determination unit 327. Then, in a case where it has been determined as a result of the control possibility determination processing that the movement of the delivery vehicle 3 is to be controlled, the delivery vehicle 3 controls the movement of the delivery vehicle 3 on the basis of location information included in the control instruction information.

Figure 19:
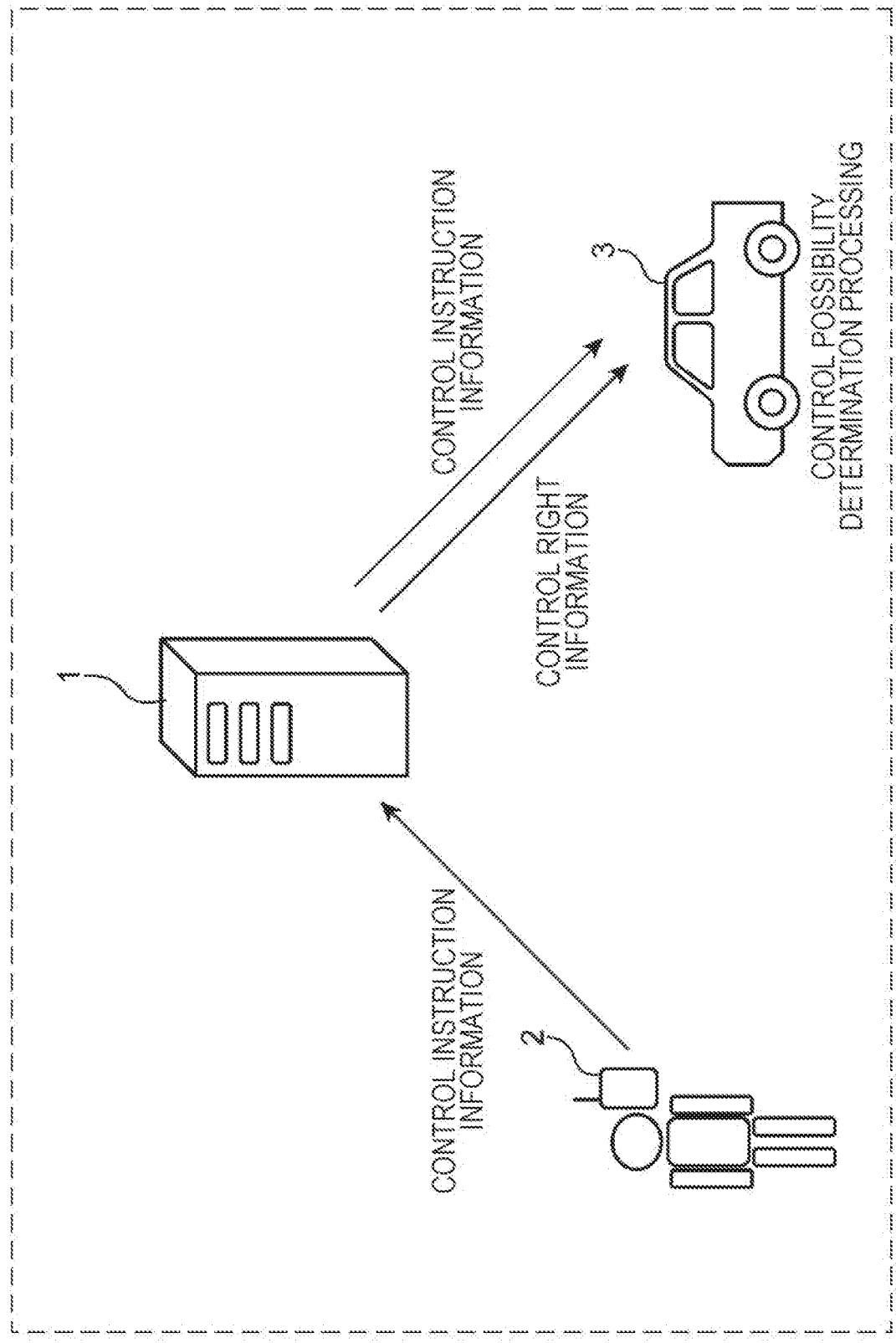
FIG. 19 is a schematic drawing for describing processing for controlling the movement of the delivery vehicle in a first modified example of embodiment 1.

FIG. 19 is a schematic drawing for describing processing for controlling the movement of the delivery vehicle in a first modified example of the present embodiment 1.

In the first modified example of the present embodiment 1, the management device 1 transmits control right information to the delivery vehicle 3, as depicted in FIG. 19. The delivery vehicle 3 receives the control right information transmitted by the management device 1. The control right information includes control permitted location information indicating a control permitted location where control of the delivery vehicle 3 by a user is permitted, and control entity identification information for identifying a control entity that is to control the delivery vehicle 3 at the control permitted location. The user terminal 2 transmits control instruction information to the management device 1. The control instruction information includes location information indicating a location to which the delivery vehicle 3 is to be moved, and control entity identification information for identifying the user terminal 2. The management device 1 receives the control instruction information transmitted by the user terminal 2. The management device 1 transmits the control instruction information received from the user terminal 2 to the delivery vehicle 3. The delivery vehicle 3 receives the control instruction information transmitted by the management device 1.

The delivery vehicle 3 then carries out control possibility determination processing for determining whether or not the movement of the delivery vehicle 3 is to be controlled. It should be noted that the control possibility determination processing includes: processing for determining whether or not the present location is a control permitted location indicated by the control permitted location information, carried out by the control-possible location determination unit 326; and processing for determining whether or not the control entity identification information included in the control instruction information matches the control entity identification information included in the control right information, carried out by the control-possible entity determination unit 327. Then, in a case where it has been determined as a result of the control possibility determination processing that the movement of the delivery vehicle 3 is to be controlled, the delivery vehicle 3 controls the movement of the delivery vehicle 3 on the basis of location information included in the control instruction information.

Figure 20:
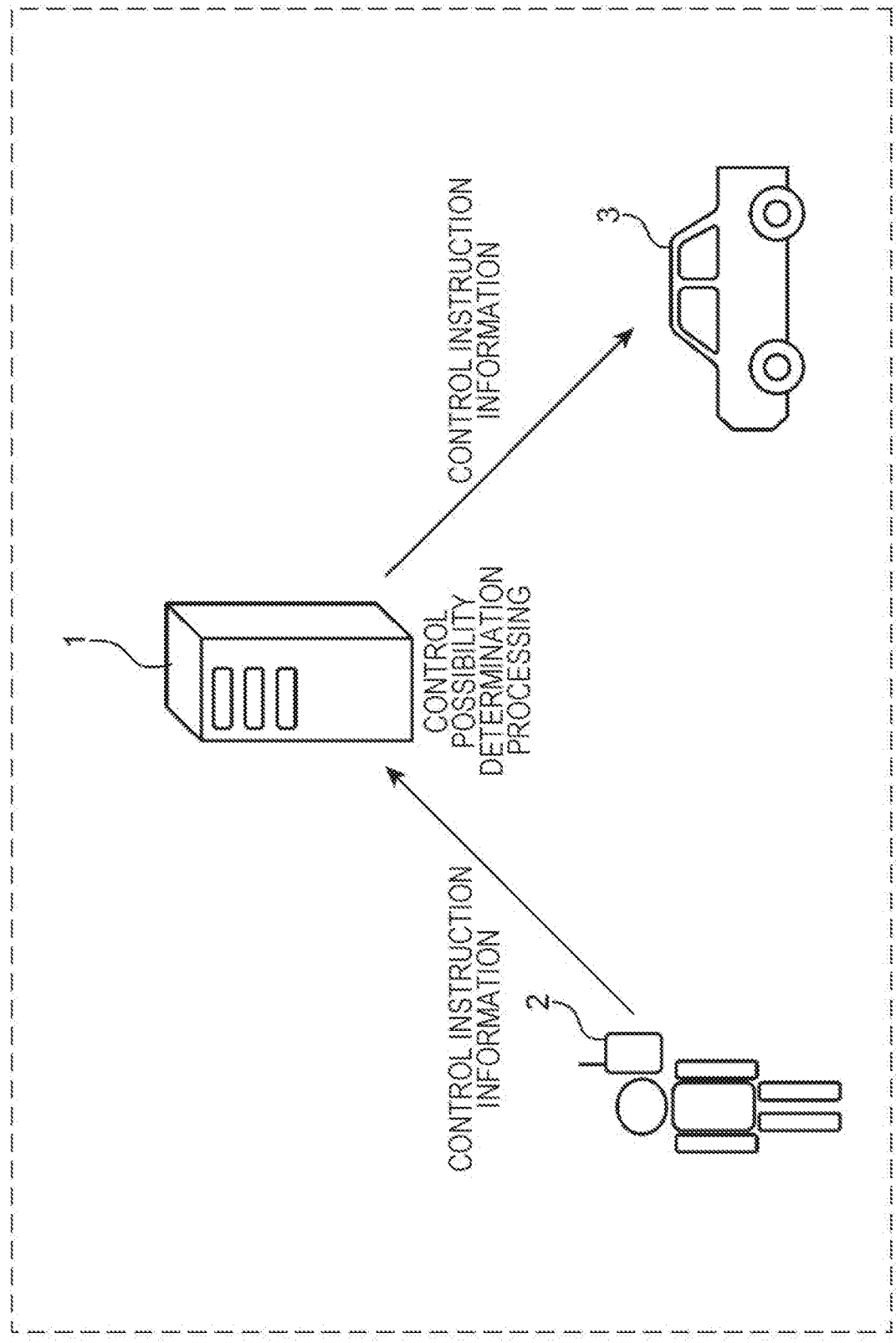
FIG. 20 is a schematic drawing for describing processing for controlling the movement of the delivery vehicle in a second modified example of embodiment 1.

FIG. 20 is a schematic drawing for describing processing for controlling the movement of the delivery vehicle in a second modified example of the present embodiment 1.

In the second modified example of the present embodiment 1, the management device 1 stores control right information but does not transmit control right information to the delivery vehicle 3, as depicted in FIG. 20. The control right information includes control permitted location information indicating a control permitted location where control of the delivery vehicle 3 by a user is permitted, and control entity identification information for identifying a control entity that is to control the delivery vehicle 3 at the control permitted location. The user terminal 2 transmits control instruction information to the management device 1. The control instruction information includes location information indicating a location to which the delivery vehicle 3 is to be moved, and control entity identification information for identifying the user terminal 2. The management device 1 receives the control instruction information transmitted by the user terminal 2.

The management device 1 then carries out control possibility determination processing for determining whether or not the movement of the delivery vehicle 3 is to be controlled. It should be noted that the control possibility determination processing includes: processing for determining whether or not the present location is a control permitted location indicated by the control permitted location information; and processing for determining whether or not the control entity identification information included in the control instruction information matches the control entity identification information included in the control right information. In a case where this processing is to be carried out, information on the present location of the delivery vehicle 3 is necessary, and therefore the management device 1 acquires the present location of the delivery vehicle 3 from the delivery vehicle 3. The management device 1 requests the delivery vehicle 3 for the transmission of location information at a timing at which control instruction information has been received from the user terminal 2. Furthermore, in a case where location information of the delivery vehicle 3 is acquired immediately before the timing at which control instruction information is received, the management device 1 may have a configuration in which the location information acquired immediately before is used without newly issuing a transmission request for location information to the delivery vehicle 3.

In this case, the control unit 12 of the management device 1 is further provided with: a control-possible location determination unit that determines whether or not the present location is a control permitted location indicated by the control permitted location information; and a control-possible entity determination unit that determines whether or not the control entity identification information included in the control instruction information matches the control entity identification information included in the control right information. In a case where it has been determined as a result of the control possibility determination processing that the movement of the delivery vehicle 3 is to be controlled, the management device 1 transmits control instruction information received from the user terminal 2 to the delivery vehicle 3. At such time, the control instruction information does not include control entity identification information and includes only location information. The delivery vehicle 3 receives the control instruction information transmitted by the management device 1. The delivery vehicle 3 then controls the movement of the delivery vehicle 3 on the basis of the location information included in the received control instruction information. Furthermore, the control instruction information may include control entity identification information. In such a case, a configuration may be adopted in which the control entity identification information is ignored by the delivery vehicle 3 side.

Furthermore, in a case where it has been determined as a result of the control possibility determination processing that the movement of the delivery vehicle 3 is not to be controlled, the management device 1 may have a configuration in which control instruction information is not transmitted to the delivery vehicle 3, or a configuration in which the delivery vehicle 3 is notified that control instruction information has been received but was not a legitimate control instruction. According to the former configuration, the amount of communication can be reduced, and the delivery vehicle 3 is not made to carry out unnecessary processing.

Figure 21:
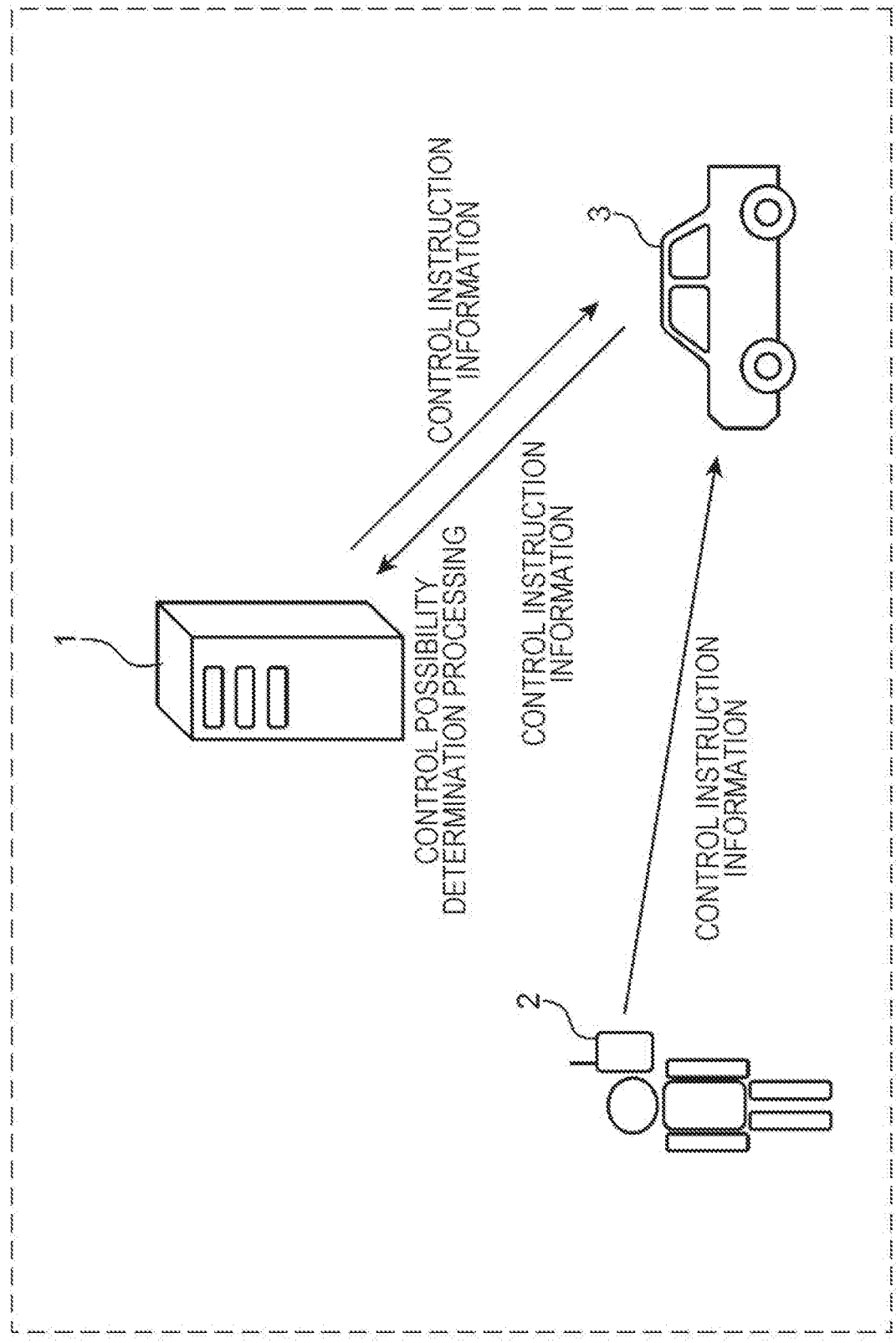
FIG. 21 is a schematic drawing for describing processing for controlling the movement of the delivery vehicle in a third modified example of embodiment 1.

FIG. 21 is a schematic drawing for describing processing for controlling the movement of the delivery vehicle in a third modified example of the present embodiment 1.

In the third modified example of the present embodiment 1, the management device 1 stores control right information but does not transmit control right information to the delivery vehicle 3, as depicted in FIG. 21. The control right information includes control permitted location information indicating a control permitted location where control of the delivery vehicle 3 by a user is permitted, and control entity identification information for identifying a control entity that is to control the delivery vehicle 3 at the control permitted location. The user terminal 2 transmits control instruction information to the delivery vehicle 3. The control instruction information includes location information indicating a location to which the delivery vehicle 3 is to be moved, and control entity identification information for identifying the user terminal 2. The delivery vehicle 3 receives the control instruction information transmitted by the user terminal 2. The delivery vehicle 3 transmits the control instruction information received from the user terminal 2 to the management device 1. The management device 1 receives the control instruction information transmitted by the delivery vehicle 3. It should be noted that, at this timing, the delivery vehicle 3 transmits location information of the delivery vehicle 3. Furthermore, there is no restriction to this configuration, and, in a case where the management device 1 ordinarily acquires location information of the delivery vehicle 3, the delivery vehicle 3 may not transmit location information at this timing.

The management device 1 then carries out control possibility determination processing for determining whether or not the movement of the delivery vehicle 3 is to be controlled. It should be noted that the control possibility determination processing includes: processing for determining whether or not the present location is a control permitted location indicated by the control permitted location information; and processing for determining whether or not the control entity identification information included in the control instruction information matches the control entity identification information included in the control right information. In this case, the control unit 12 of the management device 1 is further provided with: a control-possible location determination unit that determines whether or not the present location is a control permitted location indicated by the control permitted location information; and a control-possible entity determination unit that determines whether or not the control entity identification information included in the control instruction information matches the control entity identification information included in the control right information. In a case where it has been determined as a result of the control possibility determination processing that the movement of the delivery vehicle 3 is to be controlled, the management device 1 transmits the control instruction information received from the delivery vehicle 3 to the delivery vehicle 3. At such time, the control instruction information does not include control entity identification information and includes only location information. The delivery vehicle 3 receives the control instruction information transmitted by the management device 1. The delivery vehicle 3 then controls the movement of the delivery vehicle 3 on the basis of the location information included in the received control instruction information. Furthermore, the management device 1 may transmit the result of the control possibility determination processing to the delivery vehicle 3. The delivery vehicle 3 may determine whether or not control is to be performed in accordance with the control instruction information, on the basis of the result of the control possibility determination processing.

In the case where the user terminal 2 controls the delivery vehicle 3 via the management device 1, a situation is also feasible where the communication state is poor and communication is not possible from the user terminal 2 to the management device 1. Therefore, a configuration is desirable in which the management device 1 transmits control right information to the delivery vehicle 3 in advance, the user terminal 2 transmits control instruction information directly to the delivery vehicle 3, and the delivery vehicle 3 determines whether or not control is possible.

In the present embodiment 1, the delivery vehicle 3 determines whether or not the user is a legitimate control entity on the basis of the control entity identification information included in the control instruction information and the user identification information included in the control right information; however, it should be noted that the delivery vehicle 3 may authenticate whether or not the user is a legitimate control entity before acquiring control instruction information. For example, the delivery vehicle 3 may carry out authentication processing using the user identification information of a user who has accessed from outside, and, after having determined that the user is legitimate, may receive control instruction information transmitted from that user and control the movement of the delivery vehicle 3 in accordance with the control instruction information.

Here, the user identification information may be a combination of a user ID and a password, or biological information, for example. The biological information is a fingerprint, an iris, or a face, for example. The user terminal 2, before accepting the input of control instruction information, accepts user input of user identification information, and transmits the accepted user identification information to the delivery vehicle 3. The delivery vehicle 3 receives the user identification information transmitted by the user terminal 2 and authenticates the received user identification information. It should be noted that the user identification information used for authentication is registered in advance in the delivery vehicle 3. The delivery vehicle 3 maintains a log-in state with the user terminal 2 in a case where the received user identification information has been approved. Thereafter, when the input of control instruction information is accepted, the user terminal 2 does not need to accept the input of user identification information if the log-in state with the delivery vehicle 3 is maintained. It should be noted that the authentication of user identification information transmitted by the user terminal 2 may be carried out by the management device 1.

It should be noted that, at the delivery source and the delivery destination in a case where the delivery vehicle 3 is to deliver an object, and at the delivery source in a case where the delivery vehicle 3 is to deliver a person, the user controls the delivery vehicle 3 from outside of the delivery vehicle 3 and is therefore able to issue a control instruction while checking the periphery of the delivery vehicle 3. However, at the delivery destination in a case where the delivery vehicle 3 is to deliver a person, the user is inside the vehicle and therefore controls the delivery vehicle 3 from inside the delivery vehicle 3. In this case, the user is not able to issue a control instruction while checking the periphery of the delivery vehicle 3. Thus, in a case where the delivery vehicle 3 is to deliver a person, when the delivery vehicle 3 has arrived at the delivery destination, the delivery vehicle 3 may transmit vehicle periphery information relating to the periphery of the delivery vehicle 3 to the user terminal 2. The vehicle periphery information is, for example, information of an image or video including a section in which the user alights, or the like. By adopting this configuration, the user is able to issue a control instruction to the delivery vehicle 3 while checking the periphery of the delivery vehicle 3, when inside the vehicle. It should be noted that the delivery vehicle 3 may transmit vehicle periphery information directly to the user terminal 2, or may transmit vehicle periphery information to the user terminal 2 via another device such as the management device 1.

Furthermore, in the present embodiment 1, the movement of the delivery vehicle 3 is controlled at the delivery source or the delivery destination; however, the present disclosure is not particularly restricted thereto, and the opening and closing of the doors of the delivery vehicle 3 may be controlled, the turning on of the lights of the delivery vehicle 3 may be controlled, and other operations of the delivery vehicle 3 may be controlled at the delivery source or the delivery destination.

Furthermore, in the present embodiment 1, the control instruction support information generation unit 125 of the management device 1 generates control instruction support information, the information transmission unit 126 transmits the control instruction support information, and the communication unit 21 of the user terminal 2 receives the control instruction support information from the management device 1; however, the present disclosure is not particularly restricted thereto. For example, in a case where the user terminal 2 has installed an application program for issuing dispatch requests, the storage unit 25 of the user terminal 2 may store control instruction support information in advance. Then, the display unit 22 may display the control instruction support information stored in the storage unit 25, and the input unit 23 may accept user input of control instruction information. In this case, the management device 1 may not be provided with the control instruction support information generation unit 125, and the information transmission unit 126 may not have a function for transmitting control instruction support information. Furthermore, the display unit 22 may vary between a display mode for a state in which control instructions for the delivery vehicle 3 are possible, and a display mode for a state in which control instructions for the delivery vehicle 3 are not possible.

Specifically, the display unit 22 displays control instruction support information in the display mode for the state in which control instructions are possible, at a timing at which the location of the delivery vehicle 3 has become a location where dispatch control by the user terminal 2 is permitted, and displays control instruction support information in the display mode for the state in which control instructions are not possible, at a timing at which the location of the delivery vehicle 3 has moved away from a location where dispatch control by the user terminal 2 is permitted. With this configuration, the management device 1 monitors the location of the delivery vehicle 3. The management device 1 then issues an instruction that switches the display mode, to an application of the user terminal 2, at the timing at which the location of the delivery vehicle 3 has become a location where dispatch control by the user terminal 2 is permitted.

It should be noted that the display unit 22 may display control instruction support information in the display mode for the state in which control instructions are possible, in a case where it is a timing at which the location of the delivery vehicle 3 has become a location where dispatch control by the user terminal 2 is permitted and the delivery vehicle 3 has stopped, that is, the delivery vehicle 3 has arrived at the delivery destination or the delivery source. Furthermore, the display unit 22 may have a configuration in which the display mode is not switched, and the user is notified that a control-possible state has been entered.

Furthermore, in a case where the delivery vehicle 3 is mounted with an input device (not depicted) for the user to input control instruction information, the storage unit 33 of the delivery vehicle 3 may store control instruction support information in advance. Then, a display unit (not depicted) of the delivery vehicle 3 may display the control instruction support information stored in the storage unit 33, and the input device may accept user input of control instruction information.

Furthermore, in the present embodiment 1, the control right information includes location information of the delivery source and location information of the delivery destination; however, the present disclosure is not particularly restricted thereto, and the control right information may include an expected arrival time at the delivery source for the delivery vehicle and an expected arrival time at the delivery destination for the delivery vehicle, instead of location information of the delivery source and location information of the delivery destination.

FIG. 22 is a drawing depicting another example of control right information stored in the control right information storage unit in the present embodiment 1. The control right information depicted in FIG. 22 includes a dispatch request identification number for identifying dispatch request information, information indicating either a delivery source or a delivery destination, expected arrival times, user identification information, and vehicle identification information of a delivery vehicle. The expected arrival times indicate an expected arrival time at the delivery source for the delivery vehicle and an expected arrival time at the delivery destination for the delivery vehicle.

The user terminal 2 accepts user input of an expected arrival time at the delivery source for the delivery vehicle and an expected arrival time at the delivery destination for the delivery vehicle. The user terminal 2 transmits, to the management device 1, dispatch request information that includes user information, the expected arrival time at the delivery source for the delivery vehicle, and the expected arrival time at the delivery destination for the delivery vehicle.

It should be noted that the user terminal 2 may transmit, to the management device 1, dispatch request information that includes user information, location information of the delivery source, and location information of the delivery destination. The management device 1 may calculate an expected arrival time from the departure from the present location of a dispatch vehicle to the location of the delivery source, on the basis of the present location of the dispatch vehicle and location information of the delivery source. Furthermore, the management device 1 may calculate an expected arrival time from the departure from the present location of the dispatch vehicle to the location of the delivery destination, on the basis of the present location of the dispatch vehicle and location information of the delivery destination.

In FIG. 22, for example, a control right for controlling a delivery vehicle having the vehicle identification information "a" is set to a user having the user identification information "A", at the expected arrival time for the delivery source which is 15:30. Furthermore, for example, a control right for controlling the delivery vehicle having the vehicle identification information "a" is set to a user having the user identification information "B", at the expected arrival time for the delivery destination which is 16:00.

The delivery vehicle 3 is provided with a control-possible time determination unit instead of the control-possible location determination unit 326. The control-possible time determination unit determines whether or not the present time is an expected arrival time included in the control right information. In a case where control instruction information transmitted from outside for controlling the delivery vehicle 3 has been acquired, the control-possible time determination unit determines on the basis of the control right information whether or not the present time is the expected arrival time for the delivery source or the expected arrival time for the delivery destination indicated in the control right information. In a case where it has been determined as a result of the aforementioned determination that the present time is the expected arrival time for the delivery source or the expected arrival time for the delivery destination indicated in the control right information, processing transitions to the control-possible entity determination unit 327. However, in a case where it has been determined as a result of the aforementioned determination that the present time is not the expected arrival time for the delivery source or the expected arrival time for the delivery destination indicated in the control right information, processing ends without following the control instruction information.

It should be noted that it is not necessary to determine whether or not the present time completely matches the expected arrival time for the delivery source or the expected arrival time for the delivery destination, and, for example, it may be determined whether or not the present time is between 15 minutes before the expected arrival time for the delivery source or the expected arrival time for the delivery destination, and 15 minutes after the expected arrival time for the delivery source or the expected arrival time for the delivery destination.

It should be noted that a configuration may be adopted in which a control right is assigned to the user terminal 2 during a predetermined period from an arrival time at the timing at which a delivery vehicle actually arrived, rather than a configuration in which a control right is assigned on the basis of an expected arrival time. If a control right is assigned in accordance with an expected arrival time, the delivery vehicle 3 may not necessarily actually arrive at that expected arrival time, and therefore it is feasible that the user may not be able to control the delivery vehicle 3 due to the arrival being before or after the expected time. However, this can be prevented with the present configuration.

Furthermore, in a case where a control right is to be assigned to a user according to time, it is preferable for the display unit 22 of the user terminal 2 to display a period in which control is permitted. By adopting the present configuration, a user is able to comprehend up to when the delivery vehicle 3 can be controlled.

Embodiment 2

In the present embodiment 2, a method will be described in which a management device alters the setting of a control right for controlling a delivery vehicle that has been set based on dispatch request information, in accordance with the delivery status of the delivery vehicle.

Figure 23:
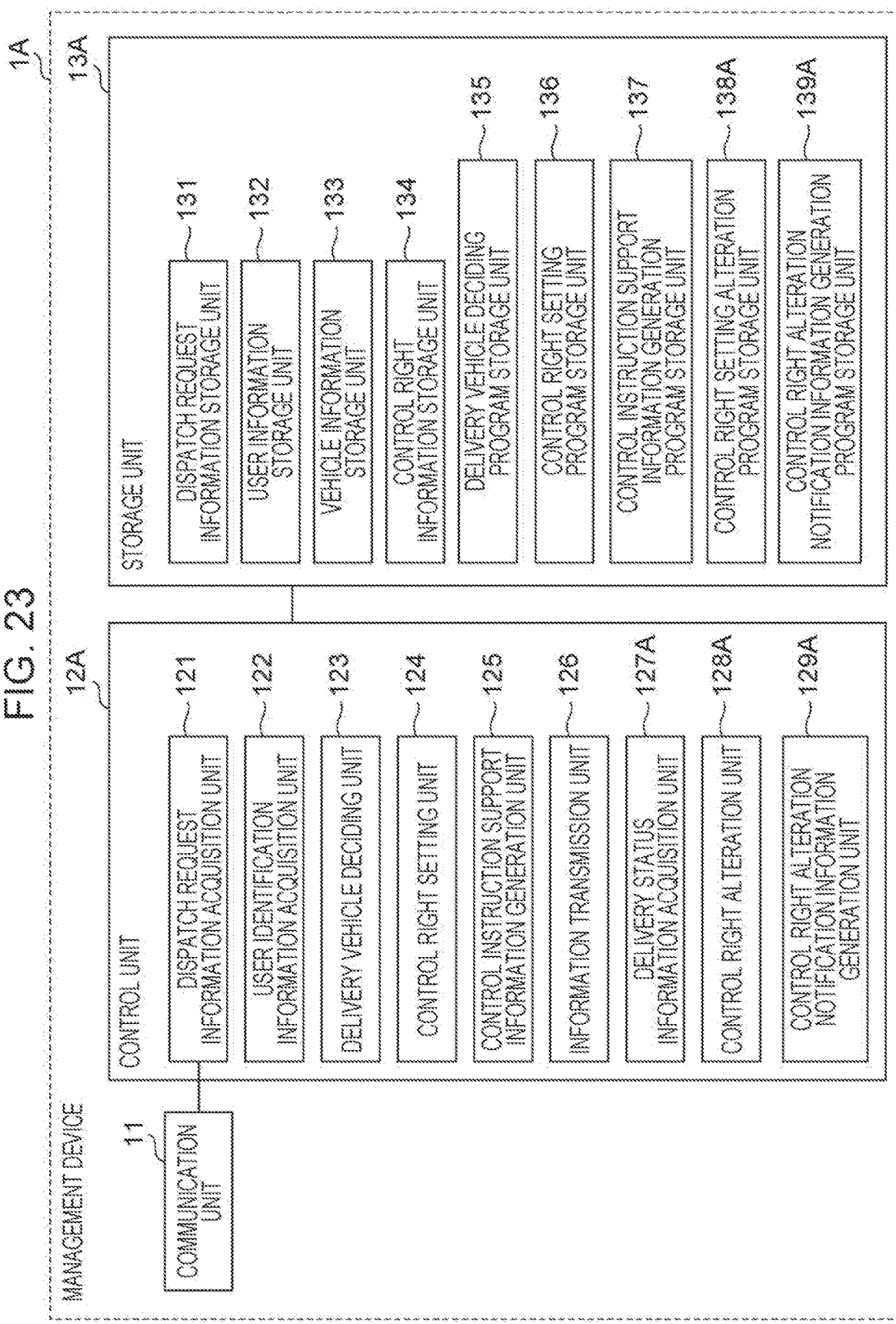
FIG. 23 is a block diagram depicting a configuration of a management device in embodiment 2 of the present disclosure.

FIG. 23 is a block diagram depicting a configuration of the management device in embodiment 2 of the present disclosure. A management device 1A is provided with the communication unit 11, a control unit 12A, and a storage unit 13A. It should be noted that, in FIG. 23, elements similar to those as in FIG. 2 are denoted by the same reference numbers, and detailed descriptions thereof are omitted.

The control unit 12A and the storage unit 13A in the management device 1A depicted in FIG. 23 are different from the management device 1 depicted in FIG. 2.

The control unit 12A is provided with the dispatch request information acquisition unit 121, the user identification information acquisition unit 122, the delivery vehicle deciding unit 123, the control right setting unit 124, the control instruction support information generation unit 125, the information transmission unit 126, a delivery status information acquisition unit 127A, a control right alteration unit 128A, and a control right alteration notification information generation unit 129A. The delivery status information acquisition unit 127A, the control right alteration unit 128A, and the control right alteration notification information generation unit 129A in the control unit 12A depicted in FIG. 23 are different from the control unit 12 of the management device 1 depicted in FIG. 2.

The delivery status information acquisition unit 127A acquires, from a delivery vehicle 3A, delivery status information relating to the status of the delivery vehicle 3A delivering a delivery object with respect to dispatch request information. The delivery status information is information indicating the delivery status of the delivery vehicle 3A such as the delivery vehicle 3A not having arrived at the delivery source, the delivery vehicle 3A having completed loading of the delivery object at the delivery source, the delivery vehicle 3A being in the middle of delivering the delivery object from the delivery source to the delivery destination, and the delivery vehicle 3A having completed unloading of the delivery object at the delivery destination, for example. This delivery status information is information that is generated on the basis of vehicle location information of the delivery vehicle 3A acquired from the sensor unit 34 by a delivery status information generation unit 328A of the delivery vehicle 3A described hereinafter, or loading detection information acquired from a loading detection unit 36A described hereinafter by the delivery status information generation unit 328A.

It should be noted that the delivery status information may be vehicle location information of the delivery vehicle 3A acquired from the sensor unit 34 of the delivery vehicle 3A, or loading detection information acquired from the loading detection unit 36A. In this case, the delivery status information is information that can be used to determine the delivery status such as, specifically, information indicating that the delivery vehicle has stopped at the delivery destination or the delivery source, information indicating that the delivery object has been loaded at the delivery destination, information indicating that a user has boarded, information indicating that the delivery object has been unloaded at the delivery source, and information indicating that the user has alighted. However, with this configuration, it is necessary for the management device 1A to separately have a function for determining the delivery status using acquired delivery status information.

The control right alteration unit 128A alters the setting of the vehicle control right on the basis of a predetermined condition. The control right alteration unit 128A determines whether or not the predetermined condition has been satisfied, on the basis of the delivery status information acquired by the delivery status information acquisition unit 127A, and alters the setting of the control right on the basis of that determination result. Specifically, in a case where the delivery status information indicates that loading of the delivery object has been completed at the delivery source (dispatch destination), the control right alteration unit 128A cancels the setting of a control right (delivery source vehicle control right) that permits the user to control the delivery vehicle 3A onto which the delivery object is loaded at the delivery source, to the delivery source user identification information. By adopting this configuration, it is possible to ensure that the user corresponding to the delivery source user identification information is not able to control the delivery vehicle 3A located at the delivery source, after loading of the delivery object has been completed at the delivery source. Furthermore, it is possible to prevent the user corresponding to the delivery source user identification information controlling the delivery vehicle 3A improperly even in a case where the delivery vehicle 3A is present in the same location as the delivery source at a different timing.

In the example given here, a case where the delivery vehicle 3A is to deliver an object has been described; however, a similar effect can be obtained also in a case where the delivery vehicle 3A is to deliver a person. In other words, in a case where delivery related information indicates that the user has completed boarding at the delivery source (dispatch destination), the control right alteration unit 128A cancels the setting of a control right (boarding vehicle control right) that permits the user to control the delivery vehicle 3A onto which the user has boarded at the delivery source, to the delivery source user identification information.

In this example, in a case where the delivery status information indicates that loading of the delivery object has been completed at the delivery source, the control right alteration unit 128A cancels the setting of the control right to the delivery source user identification information; however, it should be noted that the present disclosure is not particularly restricted thereto. The control right alteration unit 128A may cancel the setting of the control right to the delivery source user identification information at an arbitrary timing provided that it is after it has been determined that the delivery status information indicates that loading of the delivery object has been completed at the delivery source. For example, the control right alteration unit 128A may cancel the setting of the control right to the delivery source user identification information after a predetermined period has elapsed from it being determined that the delivery status information indicates that loading of the delivery object has been completed at the delivery source.

Furthermore, as another example, the control right alteration unit 128A may cancel the setting of the control right to the delivery source user identification information after the delivery vehicle 3A has moved a predetermined distance from it being determined that the delivery status information indicates that loading of the delivery object has been completed at the delivery source. Furthermore, as another example, the control right alteration unit 128A may cancel the setting of the control right to the delivery source user identification information in a case where a predetermined time has been reached from it being determined that the delivery status information indicates that loading of the delivery object has been completed at the delivery source. For example, the control right alteration unit 128A may cancel the setting of the control right to the delivery source user identification information at the point in time at which it has become the day following the day on which the delivery object was loaded.

However, if a long period of time elapses after it has been determined that the delivery status information indicates that loading of the delivery object has been completed at the delivery source, it is possible for the user corresponding to the delivery source user identification information to control the delivery vehicle 3A present at the delivery source, after loading of the delivery object has been completed at the delivery source. It is therefore preferable for the control right alteration unit 128A to cancel the setting of the control right to the delivery source user identification information as soon as possible after it has been determined that the delivery status information indicates that loading of the delivery object has been completed at the delivery source.

Furthermore, as another example, in a case where delivery related information indicates that unloading of the delivery object has been completed at the delivery destination (destination), the control right alteration unit 128A cancels the setting of a control right (delivery destination vehicle control right) that permits the user to control the delivery vehicle 3A from which the delivery object has been unloaded at the delivery destination, with respect to the delivery destination user identification information. By adopting this configuration, it is possible to ensure that the user corresponding to the delivery destination user identification information is not able to control the delivery vehicle 3A located at the delivery destination, after unloading of the delivery object has been completed at the delivery destination. Furthermore, it is possible to prevent the user corresponding to the delivery destination user identification information controlling the delivery vehicle 3A improperly even in a case where the delivery vehicle 3A is present in the same location as the delivery destination at a different timing.

In the example given here, a case where the delivery vehicle 3A is to deliver an object has been described; however, a similar effect can be obtained also in a case where the delivery vehicle 3A is to deliver a person. In other words, in a case where delivery related information indicates that the user has completed alighting at the delivery destination (destination), the control right alteration unit 128A cancels the setting of a control right (alighting vehicle control right) that permits the user to control the delivery vehicle 3A from which the user has alighted at the delivery destination, to the delivery destination user identification information.

In this example, in a case where the delivery status information indicates that unloading of the delivery object has been completed at the delivery destination, the control right alteration unit 128A cancels the setting of the control right to the delivery destination user identification information; however, it should be noted that the present disclosure is not particularly restricted thereto. The control right alteration unit 128A may cancel the setting of the control right to the delivery destination user identification information at an arbitrary timing provided that it is after it has been determined that the delivery status information indicates that unloading of the delivery object has been completed at the delivery destination. For example, the control right alteration unit 128A may cancel the setting of the control right to the delivery destination user identification information after a predetermined period has elapsed from it being determined that the delivery status information indicates that unloading of the delivery object has been completed at the delivery destination.

Furthermore, as another example, the control right alteration unit 128A may cancel the setting of the control right to the delivery destination user identification information after the delivery vehicle 3A has moved a predetermined distance from it being determined that the delivery status information indicates that unloading of the delivery object has been completed at the delivery destination. Furthermore, as another example, the control right alteration unit 128A may cancel the setting of the control right to the delivery destination user identification information in a case where a predetermined time has been reached from it being determined that the delivery status information indicates that unloading of the delivery object has been completed at the delivery destination. For example, the control right alteration unit 128A may cancel the setting of the control right to the delivery destination user identification information at the point in time at which it has become the day following the day on which the delivery object was unloaded.

Furthermore, in the aforementioned example, the control right alteration unit 128A cancels the setting of the control right to the delivery source user identification information and the setting of the control right to the delivery destination user identification information at the point in time at which the delivery object was loaded at the delivery source and the point in time at which the delivery object was unloaded at the delivery destination, respectively; however, the present disclosure is not particularly restricted thereto. As another example, the control right alteration unit 128A may cancel the setting of the control right to the delivery source user identification information and the setting of the control right to the delivery destination user identification information in a batch manner at the point in time at which the delivery object was unloaded at the delivery destination.

Specifically, in a case where delivery related information indicates that unloading of the delivery object has been completed at the delivery destination, the control right alteration unit 128A cancels the setting of a control right (delivery source vehicle control right) that permits the user to control the delivery vehicle 3A onto which the delivery object is loaded at the delivery source (dispatch destination), to the delivery source user identification information, and the setting of a control right (delivery destination vehicle control right) that permits the user to control the delivery vehicle 3A from which the delivery object is unloaded at the delivery destination (destination), to the delivery destination user identification information. With this configuration, control right setting alteration processing is carried out in a batch manner, and therefore the amount of processing can be reduced.

In the example given here, a case where the delivery vehicle 3A is to deliver an object has been described; however, a similar effect can be obtained also in a case where the delivery vehicle 3A is to deliver a person. In other words, in a case where delivery related information indicates that the user has completed alighting at the dispatch destination, the control right alteration unit 128A cancels the setting of a control right (boarding vehicle control right) that permits the user to control the delivery vehicle 3A onto which the user boards at the delivery source (dispatch destination), to the delivery source user identification information, and the setting of a control right (alighting vehicle control right) that permits the user to control the delivery vehicle 3A from which the user alights at the delivery destination (destination), to the delivery destination user identification information.

In this example, in a case where the delivery status information indicates that unloading of the delivery object has been completed at the delivery destination, the control right alteration unit 128A cancels the setting of a control right to the delivery source user identification information, and the setting of a control right to the delivery destination user identification information; however, it should be noted that the present disclosure is not particularly restricted thereto. The control right alteration unit 128A may cancel the setting of a control right to the delivery source user identification information and the setting of a control right to the delivery destination user identification information at an arbitrary timing provided that it is after it has been determined that the delivery status information indicates that unloading of the delivery object has been completed at the delivery destination. For example, the control right alteration unit 128A may cancel the setting of a control right to the delivery source user identification information and the setting of a control right to the delivery destination user identification information after a predetermined period has elapsed from it being determined that the delivery status information indicates that unloading of the delivery object has been completed at the delivery destination.

Furthermore, as another example, the control right alteration unit 128A may cancel the setting of a control right to the delivery source user identification information and the setting of a control right to the delivery destination user identification information after the delivery vehicle 3A has moved a predetermined distance from it being determined that the delivery status information indicates that unloading of the delivery object has been completed at the delivery destination. Furthermore, as another example, the control right alteration unit 128A may cancel the setting of a control right to the delivery source user identification information and the setting of a control right to the delivery destination user identification information in a case where a predetermined time has been reached from it being determined that the delivery status information indicates that unloading of the delivery object has been completed at the delivery destination. For example, the control right alteration unit 128A may cancel the setting of a control right to the delivery source user identification information and the setting of a control right to the delivery destination user identification information at the point in time at which it has become the day following the day on which the delivery object was unloaded.

However, if a long period of time elapses after it has been determined that the delivery status information indicates that unloading of the delivery object has been completed at the delivery destination, it is possible for the user corresponding to the delivery source user identification information, or the user corresponding to the delivery destination user identification information, to control the delivery vehicle 3A present at the delivery source or the delivery destination, after unloading of the delivery object has been completed at the delivery destination. It is therefore preferable for the control right alteration unit 128A to cancel the setting of a control right to the delivery source user identification information and the setting of a control right to the delivery destination user identification information as soon as possible after it has been determined that the delivery status information indicates that unloading of the delivery object has been completed at the delivery destination.

It should be noted that it is preferable for the administrator or the like to set, in advance, rules regarding the type of delivery status in which the setting of a control right is to be altered and the way in which the setting of a control right is to be altered. Here, a relationship between the delivery status and control right setting alteration processing will be described using FIGS. 24 and 25.

FIG. 24 is a drawing for describing a relationship between the delivery status and control right setting alteration processing when a control right setting alteration is carried out at the delivery source and the delivery destination in the present embodiment 2.

In FIG. 24, the control right alteration unit 128A cancels the setting of a control right to the delivery source user identification information in a case where loading of the delivery object has been completed at the delivery source. Furthermore, the control right alteration unit 128A cancels the setting of a control right to the delivery source user identification information in a case where the user has completed boarding at the delivery source. Furthermore, the control right alteration unit 128A cancels the setting of a control right to the delivery destination user identification information in a case where unloading of the delivery object has been completed at the delivery destination. In addition, the control right alteration unit 128A cancels the setting of a control right to the delivery destination user identification information in a case where the user has completed alighting at the delivery destination.

FIG. 25 is a drawing for describing a relationship between the delivery status and control right setting alteration processing when a control right setting alteration is carried out at the delivery destination in the present embodiment 2.

In FIG. 25, the control right alteration unit 128A cancels the setting of a control right to the delivery source user identification information and the setting of a control right to the delivery destination user identification information in a case where unloading of the delivery object has been completed at the delivery destination. In this case, the setting of a control right to the delivery source user identification information is not canceled even if loading or boarding has been completed at the delivery source.

The control right alteration notification information generation unit 129A generates control right alteration notification information for providing notification that the setting of a control right has been altered, to the user to whom the control right has been set.

Figure 26:
FIG. 26 is a drawing depicting an example of control right alteration notification information in embodiment 2.

FIG. 26 is a drawing depicting an example of control right alteration notification information in the present embodiment 2. FIG. 26 depicts an example of control right alteration notification information generated when unloading of the delivery object has been completed at the delivery destination, and the control right alteration unit 128A has canceled the setting of a control right to the delivery source user identification information and the setting of a control right to the delivery destination user identification information, on the basis of the relationship between the delivery status and the control right setting alteration processing depicted in FIG. 25. It should be noted that the control instruction support information generation unit 125 may generate and transmit control instruction support information that includes the control right alteration notification information in a case where it is clear beforehand that the setting of a control right has been altered, as in the example of FIG. 26.

Figure 27:
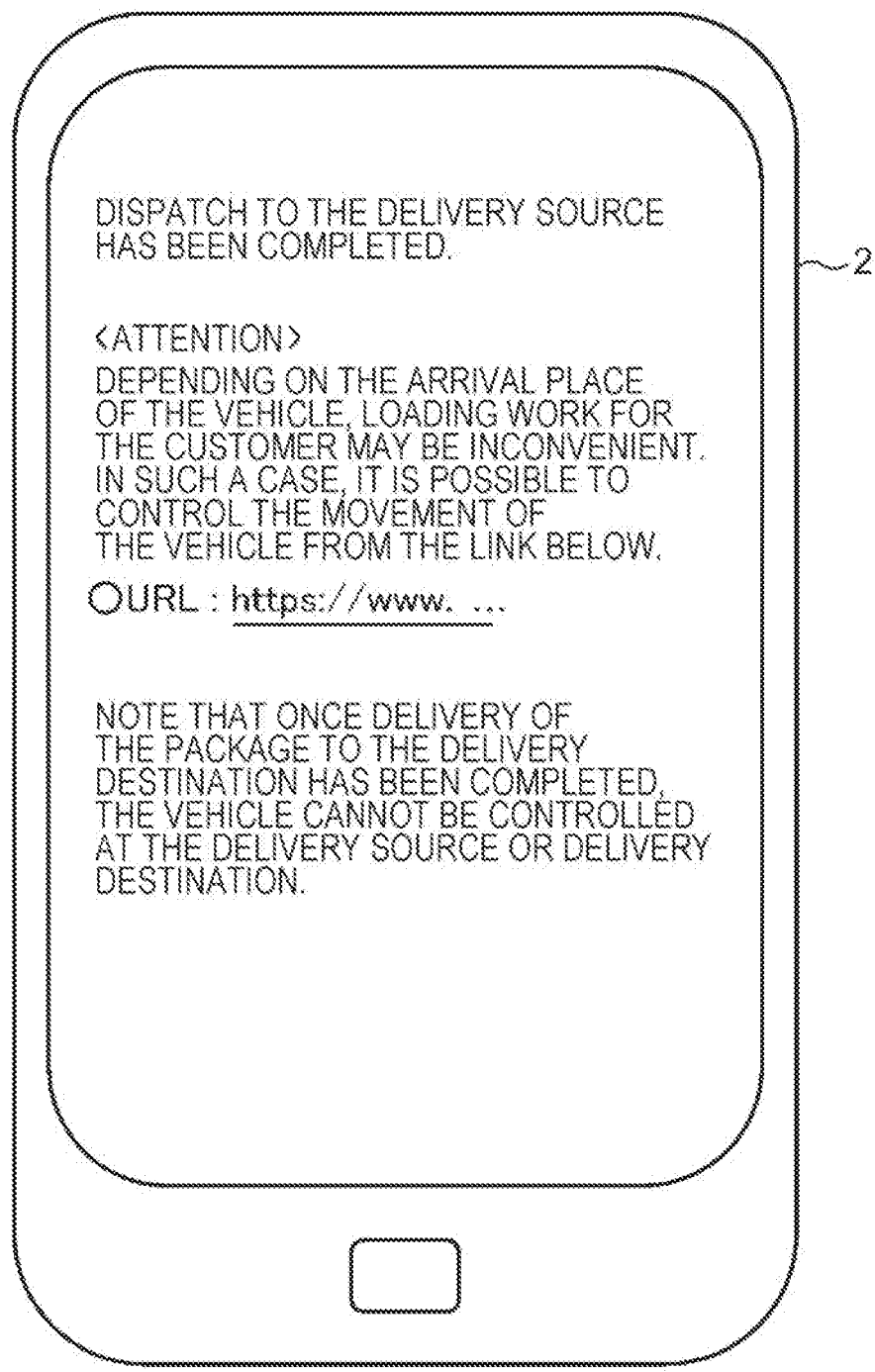
FIG. 27 is a drawing depicting an example of control instruction support information including the control right alteration notification information in embodiment 2.

FIG. 27 is a drawing depicting an example of control instruction support information that includes the control right alteration notification information in the present embodiment 2. FIG. 27 depicts an example of control right alteration notification information for providing notification that the setting of a control right to the delivery source user identification information and the setting of a control right to the delivery destination user identification information have been canceled, in a case where unloading of the delivery object has been completed at the delivery destination, on the basis of the relationship between the delivery status and the control right setting alteration processing depicted in FIG. 25. The user terminal 2 displays the control instruction support information depicted in FIG. 27, when a dispatch has been completed at the delivery source. At such time, the control instruction support information includes the control right alteration notification information.

The storage unit 13A is provided with the dispatch request information storage unit 131, the user information storage unit 132, the vehicle information storage unit 133, the control right information storage unit 134, the delivery vehicle deciding program storage unit 135, the control right setting program storage unit 136, the control instruction support information generation program storage unit 137, a control right setting alteration program storage unit 138A, and a control right alteration notification information generation program storage unit 139A. The control right setting alteration program storage unit 138A and the control right alteration notification information generation program storage unit 139A in the storage unit 13A are different from the storage unit 13 of the management device 1 depicted in FIG. 2.

The control right setting alteration program storage unit 138A stores a control right setting alteration program for determining whether or not a predetermined condition has been satisfied on the basis of delivery status information acquired by the delivery status information acquisition unit 127A, and for altering the setting of a control right on the basis of that determination result. The control right setting alteration program is executed by the control right alteration unit 128A.

The control right alteration notification information generation program storage unit 139A stores a control right alteration notification information generation program for generating control right alteration notification information for providing notification that the setting of a control right has been altered, to the user to whom the control right has been set. The control right alteration notification information generation program is executed by the control right alteration notification information generation unit 129A.

Next, the delivery vehicle 3A in the present embodiment 2 will be described.

Figure 28:
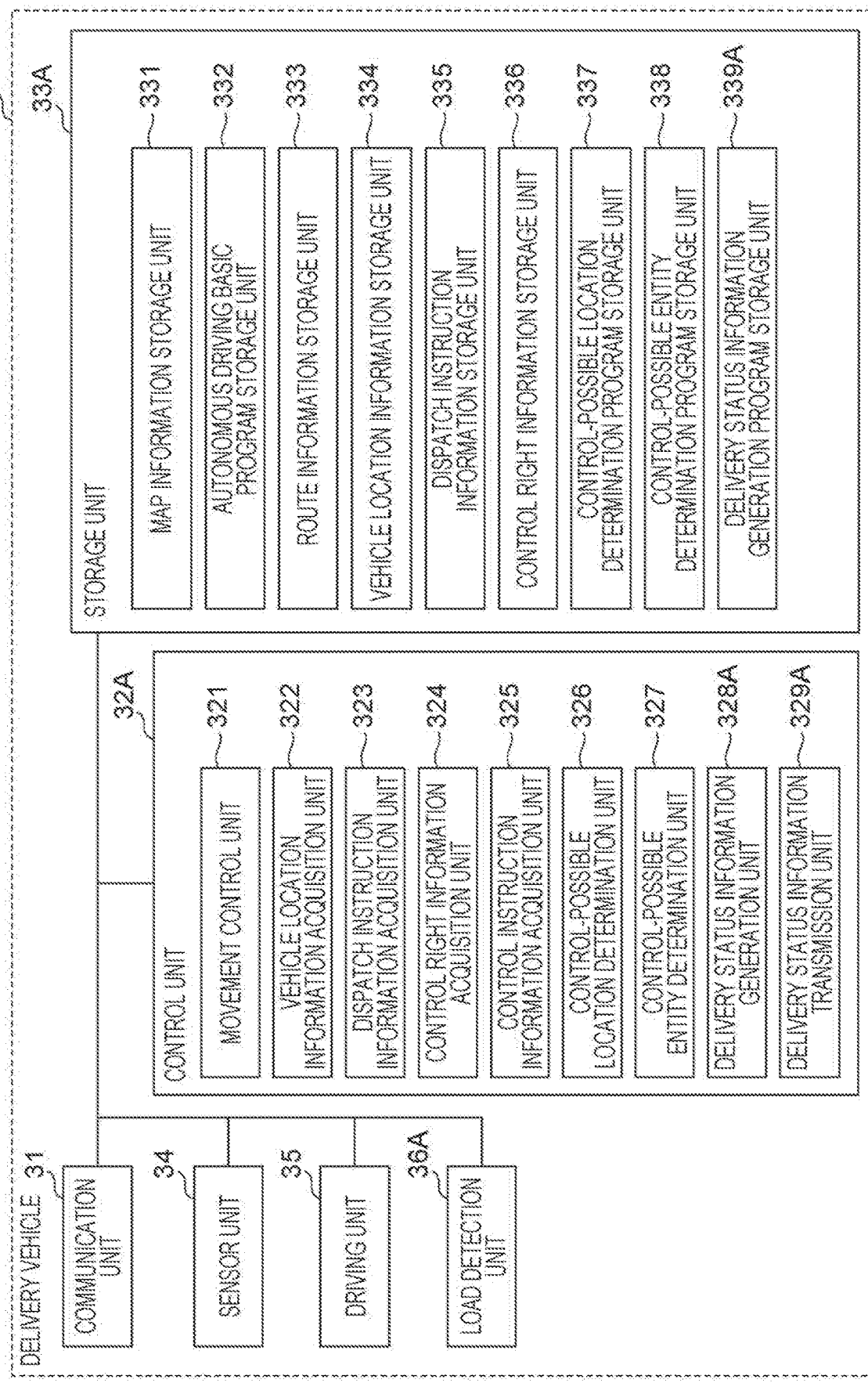
FIG. 28 is a block diagram depicting a configuration of a delivery vehicle in embodiment 2 of the present disclosure.

FIG. 28 is a block diagram depicting a configuration of the delivery vehicle in embodiment 2 of the present disclosure. The delivery vehicle 3A is provided with the communication unit 31, a control unit 32A, a storage unit 33A, the sensor unit 34, the driving unit 35, and the loading detection unit 36A. In FIG. 28, elements similar to those as in FIG. 7 are denoted by the same reference numbers, and detailed descriptions thereof are omitted.

The control unit 32A, the storage unit 33A, and the loading detection unit 36A in the delivery vehicle 3A depicted in FIG. 28 are different from the delivery vehicle 3 depicted in FIG. 7.

The control unit 32A is provided with the movement control unit 321, the vehicle location information acquisition unit 322, the dispatch instruction information acquisition unit 323, the control right information acquisition unit 324, the control instruction information acquisition unit 325, the control-possible location determination unit 326, the control-possible entity determination unit 327, the delivery status information generation unit 328A, and a delivery status information transmission unit 329A. The delivery status information generation unit 328A and the delivery status information transmission unit 329A in the control unit 32A are different from the control unit 32 of the delivery vehicle 3 depicted in FIG. 7.

The delivery status information generation unit 328A generates delivery status information on the basis of vehicle location information of the delivery vehicle 3A acquired from the sensor unit 34, or loading detection information acquired from the loading detection unit 36A.

For example, the delivery status information generation unit 328A detects that the delivery vehicle 3A has restarted moving from the delivery source after having stopped at the delivery source, on the basis of location information of the delivery vehicle 3A acquired from the sensor unit 34. Owing to that detection result, the delivery status information generation unit 328A determines that the delivery vehicle 3A has completed loading of the delivery object at the delivery source, and generates delivery status information indicating that the delivery vehicle 3A has completed loading of the delivery object at the delivery source. It should be noted that, in the case of this example, it is unclear whether or not loading of the delivery object has actually been completed at the delivery source. It is therefore desirable for the delivery status information generation unit 328A to combine location information of the delivery vehicle 3A acquired from the sensor unit 34 and loading detection information acquired from the loading detection unit 36A to determine that the delivery object has actually been loaded at the delivery source and generate delivery status information indicating that the delivery vehicle 3A has completed loading of the delivery object at the delivery source.

Furthermore, for example, the delivery status information generation unit 328A detects that loading of the delivery object has been completed in the delivery vehicle 3A, on the basis of loading detection information indicating that the delivery object has been loaded, acquired from the loading detection unit 36A. Owing to that detection result, the delivery status information generation unit 328A determines that the delivery vehicle 3A has completed loading of the delivery object at the delivery source, and generates delivery status information indicating that the delivery vehicle 3A has completed loading of the delivery object at the delivery source. It should be noted that, in the case of this example, it is unclear whether or not loading of the delivery object has actually been completed at the delivery source. It is therefore desirable for the delivery status information generation unit 328A to combine vehicle location information of the delivery vehicle 3A acquired from the sensor unit 34 and loading detection information acquired from the loading detection unit 36A to determine that the delivery object has been loaded at the delivery source and generate delivery status information indicating that the delivery vehicle 3A has completed loading of the delivery object at the delivery source.

Similar to the example described above, the delivery status information generation unit 328A detects that the delivery object has been unloaded at the delivery destination, and generates delivery status information indicating that the delivery vehicle 3A has completed unloading of the delivery object at the delivery destination.

As another example, the delivery status information generation unit 328A generates delivery status information indicating that the delivery vehicle 3A is moving to the delivery source, when having determined that the delivery vehicle 3A is moving toward the delivery source, on the basis of location information of the delivery vehicle 3A. Similarly, the delivery status information generation unit 328A generates delivery status information indicating that the delivery vehicle 3A is moving to the delivery destination, when having determined that the delivery vehicle 3A is moving toward the delivery destination after having stopped at the delivery source, on the basis of location information of the delivery vehicle 3A.

In the present embodiment 2, descriptions have been given regarding, as delivery statuses, the four statuses of a status in which the delivery vehicle 3A has completed loading of the delivery object at the delivery source, a status in which the delivery vehicle 3A has completed unloading of the delivery object at the delivery destination, a status in which the delivery vehicle 3A is moving to the delivery source, and a status in which the delivery vehicle 3A is moving to the delivery destination; however, it should be noted that the delivery status information generation unit 328A may generate delivery status information with the delivery status being detected in a more detailed manner. Furthermore, the delivery status information generation unit 328A may generate delivery status information also using vehicle state information indicating the vehicle state of the delivery vehicle 3A, other than location information of the delivery vehicle 3A acquired from the sensor unit 34.

The delivery status information generation unit 328A generates delivery status information relating to the status of the delivery vehicle 3A delivering the delivery object, on the basis of location information of the delivery vehicle 3A acquired from the sensor unit 34 or loading detection information acquired from the loading detection unit 36A; however, it should be noted that the delivery status information generation unit 328A may generate the location information itself of the delivery vehicle 3A acquired from the sensor unit 34 or the loading detection information itself acquired from the loading detection unit, as the delivery status information. With this configuration, it is necessary for the management device 1A to separately have a function for determining the delivery status using acquired delivery status information.

It should be noted that the timing at which the delivery status information generation unit 328A generates delivery status information may be an arbitrary timing. For example, the delivery status information generation unit 328A generates the delivery status information periodically. However, because changes in the delivery status information occur when the delivery vehicle 3A is in the periphery of the delivery source and the delivery destination, it is preferable for the delivery status information generation unit 328A to periodically generate delivery status information only when it has been detected that the delivery vehicle 3A is in the periphery of the delivery source and the delivery destination. By adopting this configuration, it is possible to reduce processing in cases where it is deemed that the delivery status will not change.

The delivery status information transmission unit 329A transmits delivery status information generated by the delivery status information generation unit 328A, to the management device 1A via the communication unit 31. The delivery status information transmission unit 329A may periodically transmit delivery status information to the management device 1A, or may transmit delivery status information only when the delivery status has changed.

The storage unit 33A is provided with the map information storage unit 331, the autonomous driving basic program storage unit 332, the route information storage unit 333, the vehicle location information storage unit 334, the dispatch instruction information storage unit 335, the control right information storage unit 336, the control-possible location determination program storage unit 337, the control-possible entity determination program storage unit 338, and a delivery status information generation program storage unit 339A. The delivery status information generation program storage unit 339A in the storage unit 33A is different from the storage unit 33 of the delivery vehicle 3 depicted in FIG. 7.

The delivery status information generation program storage unit 339A stores a delivery status information generation program for generating delivery status information indicating the delivery status of the delivery vehicle 3A. The delivery status information generation program is executed by the delivery status information generation unit 328A.

The loading detection unit 36A detects that the delivery object has been loaded onto the delivery vehicle 3A or that the delivery object has been unloaded from the delivery vehicle 3A. Furthermore, the loading detection unit 36A detects that a user has boarded the delivery vehicle 3A or that a user has alighted from the delivery vehicle 3A. Specifically, the loading detection unit 36A is a pressure sensor arranged in a location where a delivery object is loaded or a location where a user rides in the delivery vehicle 3A. Furthermore, the loading detection unit 36A may be an illuminance sensor arranged in a location where a delivery object is loaded or a location where a user rides in the delivery vehicle 3A. Furthermore, the loading detection unit 36A may be a camera arranged in a location where a delivery object is loaded or a location where a user rides in the delivery vehicle 3A. Furthermore, the loading detection unit 36A may be a sensor that detects the opening and closing of the doors of the delivery vehicle 3A.

A pressure sensor detects whether or not a delivery object has been loaded or whether or not a user has boarded by measuring the pressure caused by the delivery object or the weight of the user who boards. An illuminance sensor detects whether or not a delivery object has been loaded or whether or not a user has boarded by measuring changes in the illuminance at the loading location of the delivery object or the boarding location of the user. A camera detects whether or not a delivery object has been loaded or whether or not a user has boarded by means of differences in images capturing the loading location of the delivery object or the boarding location of the user.

Furthermore, a door is opened and closed when a delivery object is loaded, when a delivery object is unloaded, when a user boards, or when a user alights. Therefore, a door opening/closing sensor of the delivery vehicle 3A detects whether or not a delivery object has been loaded or whether or not a user has boarded by detecting the opening and closing of doors. However, in a case where the loading detection unit 36A is a door opening/closing sensor, although the accuracy of detecting that a delivery object has been loaded in the delivery vehicle 3A, that a delivery object has been unloaded from the delivery vehicle 3A, that a user has boarded the delivery vehicle 3A, or that a user has alighted from the delivery vehicle 3A declines compared to the other aforementioned sensors, the determination can be performed by means of a simple configuration.

Furthermore, in a case where the delivery vehicle 3A is to deliver a person, the boarding or alighting of a user may be detected by means of a person detecting sensor such as an infrared sensor. It should be noted that there is no restriction to the examples described above, and the loading detection unit 36A may use another sensor provided that it can detect that a delivery object has been loaded in the delivery vehicle 3A, that a delivery object has been unloaded from the delivery vehicle 3A, that a user has boarded the delivery vehicle 3A, or that a user has alighted from the delivery vehicle 3A.

Next, processing in which the management device 1A configured as mentioned above alters the setting of a control right for the delivery vehicle 3A on the basis of delivery status information acquired from the delivery vehicle 3A will be described using the flowchart of FIG. 29.

Figure 29:
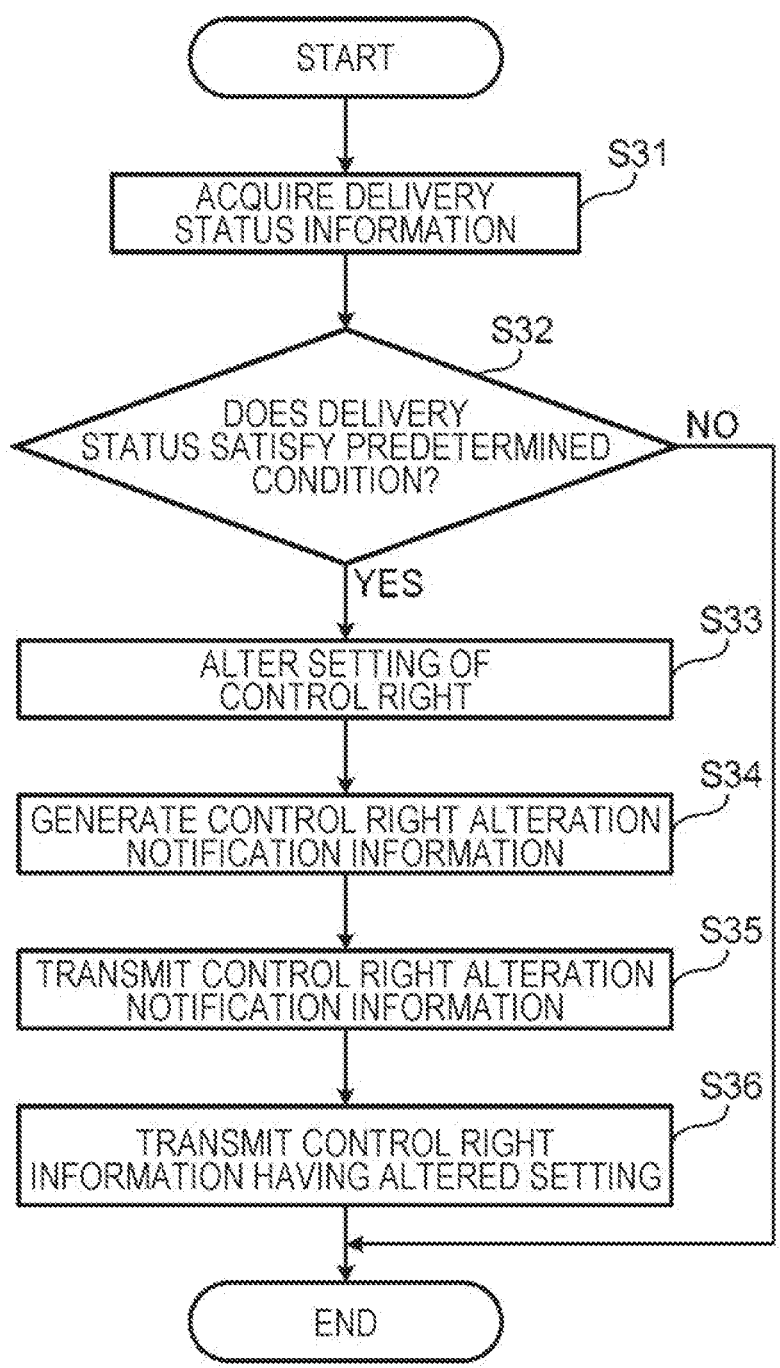
FIG. 29 is a flowchart for describing control right setting alteration processing in embodiment 2 of the present disclosure.

FIG. 29 is a flowchart for describing control right setting alteration processing in embodiment 2 of the present disclosure.

First, the delivery status information acquisition unit 127A of the management device 1A acquires delivery status information transmitted from the delivery vehicle 3A (step S31).

Next, the control right alteration unit 128A determines whether or not the delivery status satisfies a predetermined condition on the basis of the acquired delivery status information (step S32). For example, the control right alteration unit 128A determines whether or not the unloading of a delivery object or the alighting of a user has been completed at the delivery destination, in a case where control right setting alteration processing is to be carried out using the information depicted in FIG. 25. Here, in a case where it has been determined that the delivery status does not satisfy the predetermined condition, in other words, in a case where it has been determined that the unloading of a delivery object has not been completed or the alighting of a user has not been completed at the delivery destination ("no" in step S32), processing ends without the setting of the control right being altered.

However, in a case where it has been determined that the delivery status does satisfy the predetermined condition, in other words, in a case where it has been determined that the unloading of a delivery object has been completed or the alighting of a user has been completed at the delivery destination ("yes" in step S32), the control right alteration unit 128A alters the setting of the control right (step S33). For example, in a case where control right setting alteration processing is to be carried out using the information depicted in FIG. 25, the control right alteration unit 128A cancels the setting of a control right to the delivery source user identification information and the setting of a control right to the delivery destination user identification information when it has been determined that the unloading of a delivery object has been completed or the alighting of a user has been completed at the delivery destination.

Next, the control right alteration notification information generation unit 129A generates control right alteration notification information for providing notification that the setting of a control right has been altered, to the user corresponding to the delivery source user identification information or delivery destination user identification information for which the setting of the control right has been altered (step S34). For example, the user terminal 2 displays control right alteration notification information for notifying that the delivery of a package to the delivery destination has been completed and it is no longer possible to control the delivery vehicle 3A located at the delivery destination, as depicted in FIG. 26. It should be noted that, in a case where the type of condition that will cause the setting of a control right to be altered is known in advance, the control instruction support information generation unit 125 may generate control instruction support information that includes control right alteration notification information. For example, after the delivery of a package to the delivery destination has been completed, the user terminal 2 displays control instruction support information that includes control right alteration notification information for providing notification that it will no longer be possible to control the delivery vehicle 3A, as depicted in FIG. 27.

Next, the information transmission unit 126 transmits control right alteration notification information generated by the control right alteration notification information generation unit 129A, to the user terminal 2 of the user corresponding to the delivery source user identification information or the delivery destination user identification information for which the setting of the control right has been altered (step S35).

Next, the information transmission unit 126 transmits control right information relating to the control right for which the setting has been altered, to the delivery vehicle 3A (step S36).

According to the above processing, the management device 1A can alter the setting of a control right for controlling the delivery vehicle 3A according to dispatch request information, in accordance with the delivery status of the delivery vehicle 3A. Thereby, regardless of whether a delivery based on dispatch request information has been completed, a user for whom a control right has been set can be prevented from controlling the delivery vehicle 3A. For example, in a case where a control right for a delivery vehicle has been previously set to a first user and remains unaltered, and a second user has issued a dispatch request with the same place as the first user as the delivery source or delivery destination and the delivery vehicle has arrived at the delivery source, the first user is still able to issue control instructions to the delivery vehicle that has arrived. The first user, if being a user having malicious intent, is able to cause the delivery vehicle that has arrived to move to a different place. However, according to the configuration of the present embodiment 2, the setting of a control right can be altered, and users other than the second user can be prevented from controlling the delivery vehicle. In particular, in the case of a residential complex such as a condominium, the possibility of being faced with this kind of problem is considered to be high because there are users who will designate the same delivery source or delivery destination.

In the present embodiment 2, a case where delivery processing has been carried out smoothly on the basis of dispatch request information has been described; however, processing is not always carried out smoothly. For example, in a case where the delivery vehicle is to deliver an object, the delivery vehicle cannot conclude delivery processing if the user at the delivery destination is absent. There are cases where the delivery vehicle carries out delivery once again at a different time when the user at the delivery destination was absent. In order to handle this kind of situation, the control right alteration unit 128A may temporarily disable the setting of a control right for the delivery destination user identification information in the case where the user at the delivery destination was absent. The control right alteration unit 128A may then enable the setting of a control right for the delivery destination user identification information in the case where the delivery object is to be resent to the delivery destination.

As a method for enabling or disabling the setting of a control right, the control right alteration unit 128A assigns information indicating whether a control right is enabled or disabled, with respect to a control right that is assigned to delivery source user identification information or delivery destination user identification information, and alters the aforementioned information. Furthermore, as another configuration, the control right alteration unit 128A may delete a control right in a case where a control right is to be disabled, and may register a control right anew in a case where a control right is to be enabled once again. With this configuration, it is necessary for the control right alteration unit 128A to store information for enabling a control right once again in the storage unit 13A. For example, the control right alteration unit 128A can store information relating to a redelivery in the storage unit 13A, and register a control right once again on the basis of information on the delivery destination included in the aforementioned information.

It should be noted that, in a case where the user at the delivery destination is absent and the delivery is to be carried out once again at a different time, if the period to the redelivery being carried out is short, the control right alteration unit 128A may not alter the setting of a control right. This is because the possibility of the control right being improperly used in the short period to the redelivery being carried out is considered to be low. By adopting this configuration, the control right setting alteration processing can be reduced. For example, in a case where the user at the delivery destination is absent and the delivery is to be carried out once again on the same day, the control right alteration unit 128A does not alter the setting of a control right. However, in a case where the day on which the redelivery is to be carried out is the following day or thereafter, the control right alteration unit 128A may alter the setting of the control right. It should be noted that it is preferable for an administrator or the like to set, in advance, a threshold value for determining whether or not the period to the redelivery being carried out is short.

It should be noted that, in the case where the user at the delivery destination is absent and the delivery is to be carried out once again at a different time, if the same delivery vehicle 3 is to carry out deliveries many times to the same delivery destination, it is preferable for the control right alteration unit 128A to alter the setting of a control right even if the period to the redelivery being carried out is short. This is because a user who has a control right is able to control the delivery vehicle 3 improperly. Therefore, by adopting this configuration, it is possible to prevent a user who has a control right from controlling the delivery vehicle 3 improperly. Furthermore, in the case where the user at the delivery destination is absent and the delivery is to be carried out once again at a different time, if the same delivery vehicle 3 is not to carry out deliveries to the same delivery destination, the control right alteration unit 128A may not alter the setting of a control right even if the period to the redelivery being carried out is long. That is, in the examples given here, the control right alteration unit 128A may alter the setting of a control right on the basis of the frequency of the delivery vehicle 3 carrying out deliveries to a delivery destination, irrespective of the period to the redelivery being carried out.

It should be noted that, in a case where a package is to be delivered by a home delivery company, it is feasible for there to be a plurality of delivery destinations and for packages to be delivered sequentially to the plurality of delivery destinations. Therefore, the control right setting unit 124 may enable a control right for only the delivery destination to which the delivery vehicle 3A is heading. In this case, a control right is enabled only for a user who requires a control right, and it is therefore possible to prevent an improper user controlling the delivery vehicle 3A. Furthermore, as another configuration, the control right setting unit 124 may enable control rights for users at all delivery destinations even in a case where there are a plurality of delivery destinations. This is because the user at a delivery destination is able to control the delivery vehicle 3 only at the delivery destination to which a control right has been set and is not able to control the delivery vehicle 3 at other delivery destinations, and therefore users at different delivery destinations never control the delivery vehicle 3A improperly. In this case, control rights are enabled in a batch manner, and therefore the processing for setting control rights can be carried out with fewer processing steps.

It should be noted that, in a case where there has been an alteration request for location information of a delivery source or location information of a delivery destination from the user terminal 2, or there has been an alteration request for delivery source user identification information or delivery destination user identification information, it is preferable for the control right alteration unit 128A to alter the setting of a control right in accordance with the alteration request. According to this configuration, the setting of a control right can be flexibly altered in accordance with a request of a user. Furthermore, it is preferable for the setting of a control right to be similarly canceled also in a case where there has been a request for a dispatch request to be canceled from the user terminal 2. Furthermore, in a case where the setting of a control right has been altered, the control instruction support information generation unit 125 may generate control instruction support information on the basis of the altered control right, and transmit the control instruction support information to the user corresponding to the altered control right. Furthermore, the communication unit 11 may transmit control right information relating to the altered control right, to the delivery vehicle 3A. By adopting this configuration, the user is able to issue a control instruction to the delivery vehicle 3A on the basis of the altered control right, and the delivery vehicle 3A is able to determine whether or not the delivery vehicle 3A is to be controlled in accordance with the control instruction for the delivery vehicle 3A, on the basis of the altered control right.

It should be noted that the users who are able to alter the setting of a control right may be restricted. By adopting such a configuration, for example, it is possible to ensure that a user who is unrelated to a control right does not alter the setting of the control right improperly. Users who are able to alter the setting of a control right may be decided in advance by the administrator or the like of the management device 1A, or may be set by a user who issues a dispatch request. For example, the management device 1A may set, in advance, the user who issues a dispatch request, the user at the delivery source, and the user at the delivery destination as users who are able to alter the setting of a control right.

In the present embodiment 2, the setting of a control right is altered in accordance with the delivery status of the delivery vehicle 3A; however, it should be noted that the setting of a control right may be altered on the basis of information other than the delivery status. For example, a valid period may be provided for a control right, and the control right may be made valid only within that valid period. The control right setting unit 124 sets valid period information indicating a period during which the control right is valid, with respect to a control right. The control right alteration unit 128A then alters the setting of the control right on the basis of the valid period information. For example, the control right setting unit 124 may set valid period information that makes a control right valid only on the day on which the delivery vehicle 3A is to actually deliver a delivery object. The control right alteration unit 128A may cancel the setting of the control right when the day following the delivery day is reached.

With this configuration, the setting of a control right can be altered by means of processing that is simple compared to the case where delivery status information of the delivery vehicle 3A is acquired and the setting of a control right is altered on the basis of the delivery status. Furthermore, it becomes easy for a user to know the timing at which the setting of a control right is to be canceled. Furthermore, the setting of control rights having the same valid period can be altered in a batch manner.

However, if the period in which a control right is enabled becomes long, the possibility of the delivery vehicle 3 being improperly controlled by a user who has a control right increases, and therefore it is preferable for the valid period to be as short as possible. In a case where a valid period is set for a control right, the control instruction support information generation unit 125 may set a valid period also for control instruction support information such as a screen for issuing control instructions, link information for a dedicated web page for issuing control instructions, or password information. In a case where the valid period has been exceeded, the management device 1A ensures that a user is not able to issue a control instruction, by not displaying the screen for issuing control instructions, deleting the link information for the dedicated web page for issuing control instructions, making it not possible for password information to be authenticated even if input, or the like. By adopting this configuration, it is possible to prevent a user issuing a control instruction when a valid period has been exceeded.

Embodiment 3

In the present embodiments 1 and 2, examples were described in which a delivery object is loaded or a user is allowed to board at a delivery source, and then the delivery object is unloaded or the user is allowed to alight at a delivery destination, in a manner similar to an on-demand delivery service for goods or an on-demand taxi service; however, the present disclosure is not restricted to these services. In a case where a delivery vehicle is to deliver a delivery object, other than the aforementioned service, there is a service in which a delivery object is delivered directly to a delivery destination from a delivery center, and the present disclosure can also be applied to this kind of service. In embodiment 3, an example in which a delivery vehicle is to deliver a delivery object directly to a delivery destination from a delivery center will be described.

In the case of embodiment 3, a delivery vehicle delivers a product from a delivery center, and therefore information on the delivery source is not required, and only information on the delivery destination is required. Therefore, in embodiment 3, information on the delivery source is not required in the dispatch request information, and the dispatch request information includes only information on the delivery destination. Furthermore, accordingly, delivery source user information with which the delivery vehicle is used at the delivery source is also not required, and only delivery destination user information with which the delivery vehicle is used at the delivery destination is required, and therefore the management device acquires only the delivery destination user information.

Figure 30:
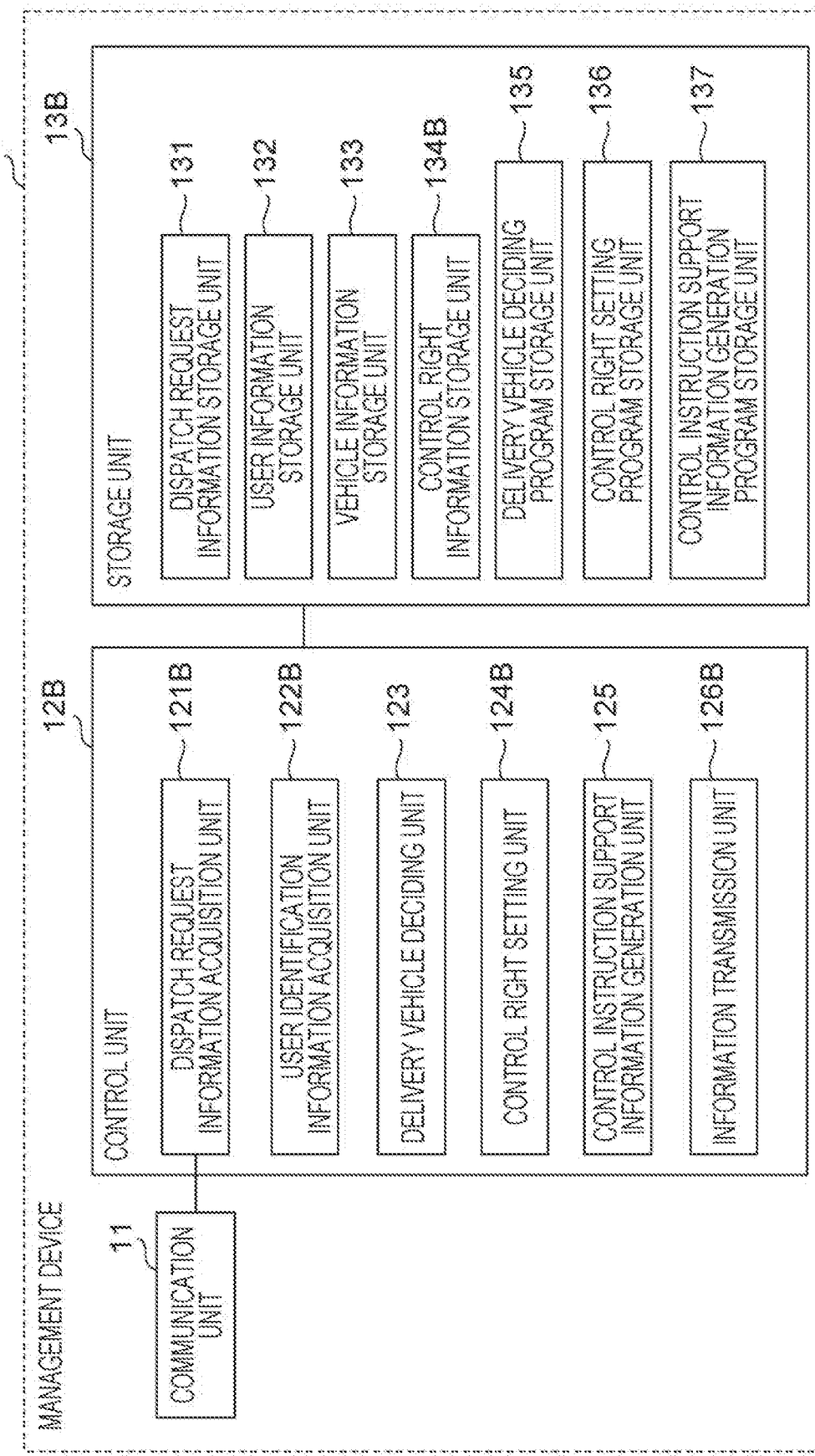
FIG. 30 is a block diagram depicting a configuration of a management device in embodiment 3 of the present disclosure.

FIG. 30 is a block diagram depicting a configuration of a management device in embodiment 3 of the present disclosure. A management device 1B is provided with the communication unit 11, a control unit 12B, and a storage unit 13B. It should be noted that, in FIG. 30, elements similar to those as in FIG. 2 are denoted by the same reference numbers, and detailed descriptions thereof are omitted.

The control unit 12B and the storage unit 13B in the management device 1B depicted in FIG. 30 are different from the management device 1 depicted in FIG. 2.

The control unit 12B is provided with a dispatch request information acquisition unit 121B, a user identification information acquisition unit 122B, the delivery vehicle deciding unit 123, a control right setting unit 124B, the control instruction support information generation unit 125, and an information transmission unit 126B.

The dispatch request information acquisition unit 121B acquires user information indicating a user and dispatch request information that includes location information of a delivery destination from the user terminal 2 via the communication unit 11. The dispatch request information acquisition unit 121B acquires dispatch request information that includes at least location information indicating the location of the dispatch destination to which an autonomous vehicle is to be dispatched. In embodiment 3, the delivery destination is the dispatch destination.

The user identification information acquisition unit 122B acquires delivery destination user identification information for identifying a user who is to use the delivery vehicle located at the delivery destination or the user terminal 2 possessed by the user, from the user terminal 2 via the communication unit 11.

In the present embodiment 3, a configuration is described in which the dispatch request information and the delivery destination user identification information are acquired separately; however, it should be noted that a configuration may be adopted in which these items of information are acquired in a batch manner. For example, the dispatch request information may include the delivery destination user identification information, or the dispatch request information acquisition unit 121B may acquire the dispatch request information and the delivery destination user identification information in a batch manner.

The control right setting unit 124B sets a control right (vehicle control right) that permits control of the delivery vehicle located at the dispatch destination, to a user on the basis of the dispatch request information and the user identification information. The control right setting unit 124B sets a control right for controlling the delivery vehicle 3 located at the delivery destination, to delivery destination user identification information on the basis of the dispatch request information and the delivery destination user identification information.

The information transmission unit 126B transmits control right information relating to the control right that has been set, to the delivery vehicle 3. The information transmission unit 126B transmits control instruction support information to the user terminal 2 at the delivery destination to which the control right has been assigned, via the communication unit 11. In addition, the information transmission unit 126B transmits dispatch instruction information that is based on the dispatch request information, to the delivery vehicle 3. The dispatch instruction information includes at least location information of the delivery destination. The dispatch instruction information may include route information that includes a route from the present location of the vehicle to the delivery destination. In this case, the management device 1B generates route information; however, the delivery vehicle 3 may generate route information.

The storage unit 13B is provided with the dispatch request information storage unit 131, the user information storage unit 132, the vehicle information storage unit 133, a control right information storage unit 134B, the delivery vehicle deciding program storage unit 135, the control right setting program storage unit 136, and the control instruction support information generation program storage unit 137.

The control right information storage unit 134B stores control right information that indicates a control right for controlling the delivery vehicle 3 located at the delivery destination, set by the control right setting unit 124B on the basis of the dispatch request information and the delivery destination user identification information. The control right information includes a dispatch request identification number for identifying dispatch request information, information indicating a delivery destination, a control-possible location, user identification information, and vehicle identification information of a delivery vehicle. The control-possible location indicates location information of the delivery destination. The control-possible location is represented by longitude and latitude, for example.

The configurations of the user terminal and the delivery vehicle in embodiment 3 are basically the same as in embodiment 1. However, in embodiment 3, the dispatch instruction information acquisition unit 323 of the delivery vehicle 3 acquires dispatch instruction information that includes at least location information of the delivery destination, transmitted from the management device 1B. Furthermore, in a case where control instruction information transmitted from outside for controlling the delivery vehicle 3 has been acquired, the control-possible location determination unit 326 determines on the basis of the control right information whether or not the present location of the delivery vehicle 3 is the location of the delivery destination indicated in the control right information. In a case where it has been determined as a result of the aforementioned determination that the location of the delivery vehicle 3 is the location of the delivery destination, processing transitions to the control-possible entity determination unit 327. However, in a case where it has been determined as a result of the aforementioned determination that the location of the delivery vehicle 3 is not the location of the delivery destination, processing ends without following the control instruction information.

According to the above configuration, a control right for controlling the delivery vehicle 3 located at the delivery destination can be set to a user, and therefore the user is able to cause the delivery vehicle 3 to move in a case where the delivery vehicle 3 has stopped in a location that is inconvenient for the user.

Furthermore, in the present configuration, it is possible for the delivery vehicle 3 to be controlled only when the delivery vehicle 3 is located at the delivery destination. It is therefore possible to prevent the user causing the delivery vehicle 3 to move when the delivery vehicle 3 is located in a place other than the delivery destination, that is, when control of the delivery vehicle 3 is not necessary.

Furthermore, in the present embodiment 3, the control right setting unit 124B may decide a delivery destination control right exercisable range representing a region in which a control instruction can be issued to the delivery vehicle 3, in accordance with a predetermined rule and on the basis of location information of the delivery destination, and may set a control right for controlling the delivery vehicle 3 located in the delivery destination control right exercisable range, to the delivery destination user identification information. In a case where the dispatch destination is the delivery destination, the control right setting unit 124B generates a delivery destination control right exercisable range in which a user is permitted to control the delivery vehicle at the delivery destination, on the basis of the location of the delivery destination. Then, in the case where the dispatch destination is the delivery destination, the control right setting unit 124B sets a control right that permits control of the delivery vehicle located within the delivery destination control right exercisable range, to the user.

Furthermore, in the present embodiment 3, the control right setting unit 124B may decide a delivery destination control-possible range representing a region in which the delivery vehicle 3 can move according to control instruction information, in accordance with a predetermined rule and on the basis of location information of the delivery destination, and may set a control right for controlling, within the delivery destination control-possible range, the delivery vehicle 3 located at the delivery destination, to the delivery destination user identification information. In a case where the dispatch destination is the delivery destination, the control right setting unit 124B generates a delivery destination control-possible range in which the delivery vehicle can move at the delivery destination, on the basis of the location of the delivery destination. Then, in the case where the dispatch destination is the delivery destination, the control right setting unit 124B sets a control right that permits movement control of the delivery vehicle within the delivery destination control-possible range, to a user.

It should be noted that, also in the present embodiment 3, the management device 1B may alter the setting of a control right for controlling a delivery vehicle which has been set based on dispatch request information, in accordance with the delivery status of the delivery vehicle. It should be noted that the method for altering the setting of a control right is similar to that of embodiment 2.

Embodiment 4

In the present embodiments 1 and 2, examples were described in which a delivery object is loaded or a user is allowed to board at a delivery source, and then the delivery object is unloaded or the user is allowed to alight at a delivery destination, in a manner similar to an on-demand delivery service for goods or an on-demand taxi service; however, the present disclosure is not restricted to these services. In a case where a delivery vehicle is to deliver a delivery object, other than the aforementioned services, there is a cargo collection service in which a delivery vehicle moves from a delivery center to a delivery source and receives the delivery object at the delivery source, and the present disclosure can also be applied to this kind of cargo collection service. In embodiment 4, an example in which a delivery vehicle moves from a delivery center to a delivery source and collects the delivery object at the delivery source will be described.

In the cargo collection service of embodiment 4, a delivery vehicle moves from a delivery center to a delivery source to receive a product, and therefore information on the delivery destination is not required, and only information on the delivery source is required. Therefore, in embodiment 4, information on the delivery destination is not required in the dispatch request information, and the dispatch request information includes only information on the delivery source. Furthermore, accordingly, delivery destination user information with which the delivery vehicle 3 is used at the delivery destination is also not required, and only delivery source user information with which the delivery vehicle 3 is used at the delivery source is required, and therefore a management device acquires only the delivery source user information.

Figure 31:
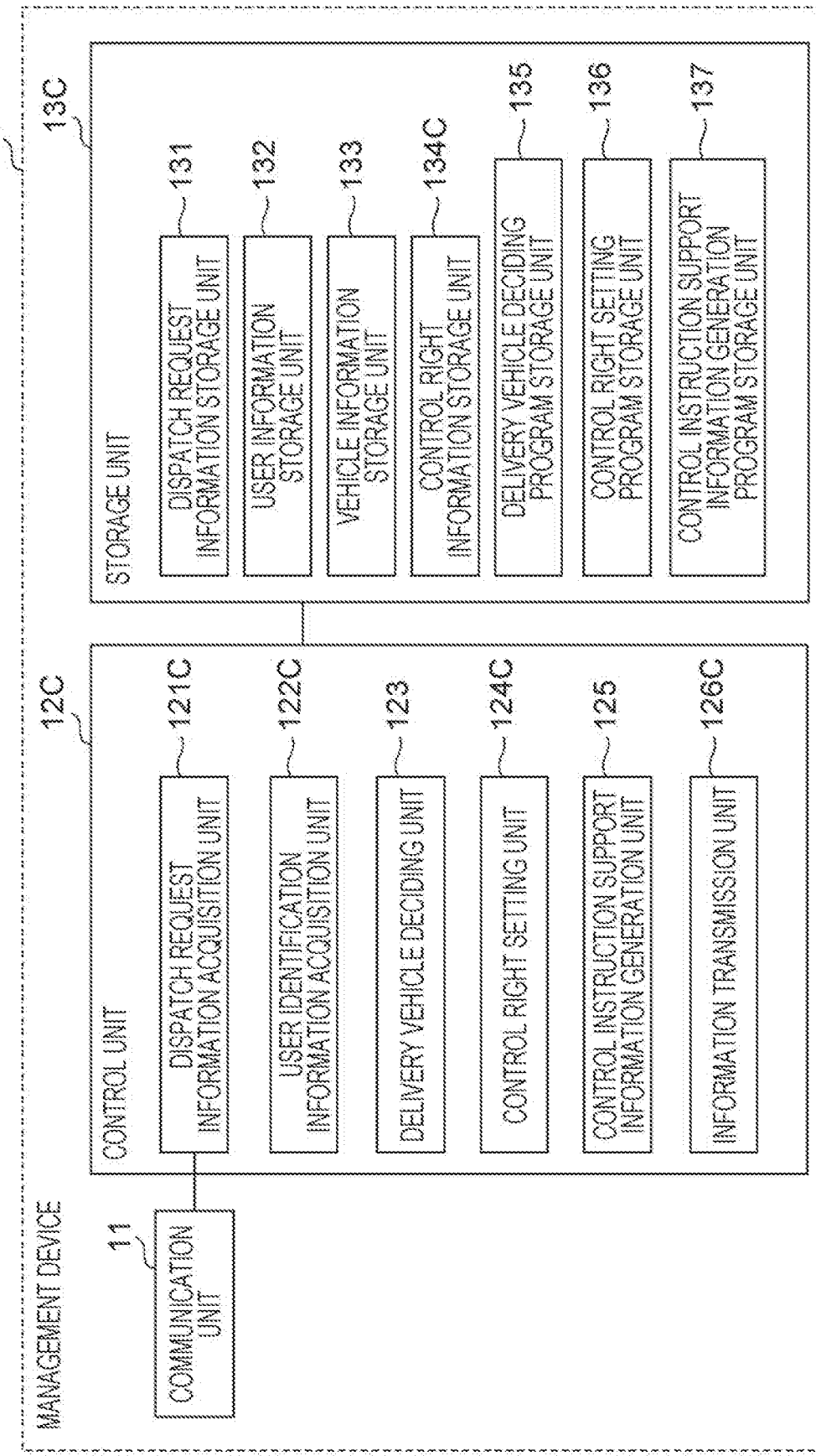
FIG. 31 is a block diagram depicting a configuration of a management device in embodiment 4 of the present disclosure.

FIG. 31 is a block diagram depicting a configuration of a management device in embodiment 4 of the present disclosure. A management device 1C is provided with the communication unit 11, a control unit 12C, and a storage unit 13C. It should be noted that, in FIG. 31, elements similar to those as in FIG. 2 are denoted by the same reference numbers, and detailed descriptions thereof are omitted.

The control unit 12C and the storage unit 13C in the management device 1C depicted in FIG. 31 are different from the management device 1 depicted in FIG. 2.

The control unit 12C is provided with a dispatch request information acquisition unit 121C, a user identification information acquisition unit 122C, the delivery vehicle deciding unit 123, a control right setting unit 124C, the control instruction support information generation unit 125, and an information transmission unit 126C.

The dispatch request information acquisition unit 121C acquires user information indicating a user and dispatch request information that includes location information of a delivery source from the user terminal 2 via the communication unit 11. The dispatch request information acquisition unit 121C acquires dispatch request information that includes at least location information indicating the location of the dispatch destination to which an autonomous vehicle is to be dispatched. In embodiment 4, the delivery source is the dispatch destination.

The user identification information acquisition unit 122C acquires delivery source user identification information for identifying a user who is to use the delivery vehicle located at the delivery source or the user terminal 2 possessed by the user, from the user terminal 2 via the communication unit 11.

In the present embodiment 4, a configuration is described in which the dispatch request information and the delivery source user identification information are acquired separately; however, it should be noted that a configuration may be adopted in which these items of information are acquired in a batch manner. For example, the dispatch request information may include the delivery source user identification information, or the dispatch request information acquisition unit 121C may acquire the dispatch request information and the delivery source user identification information in a batch manner.

The control right setting unit 124C sets a control right (vehicle control right) that permits control of the delivery vehicle located at the dispatch destination, to a user on the basis of the dispatch request information and the user identification information. The control right setting unit 124C sets a control right for controlling the delivery vehicle 3 located at the delivery source, to delivery source user identification information on the basis of the dispatch request information and the delivery source user identification information.

The information transmission unit 126C transmits control right information relating to the control right that has been set, to the delivery vehicle 3. The information transmission unit 126C transmits control instruction support information to the user terminal 2 at the delivery source to which a control right has been assigned, via the communication unit 11. In addition, the information transmission unit 126C transmits dispatch instruction information that is based on the dispatch request information, to the delivery vehicle 3. The dispatch instruction information includes at least location information of the delivery source. The dispatch instruction information may include route information that includes a route from the present location of the vehicle to the delivery source. In this case, the management device 1C generates route information; however, the delivery vehicle 3 may generate route information.

The storage unit 13C is provided with the dispatch request information storage unit 131, the user information storage unit 132, the vehicle information storage unit 133, a control right information storage unit 134C, the delivery vehicle deciding program storage unit 135, the control right setting program storage unit 136, and the control instruction support information generation program storage unit 137.

The control right information storage unit 134C stores control right information that indicates a control right for controlling the delivery vehicle 3 located at the delivery source, set by the control right setting unit 124C on the basis of the dispatch request information and the delivery source user identification information. The control right information includes a dispatch request identification number for identifying dispatch request information, information indicating a delivery source, a control-possible location, user identification information, and vehicle identification information of a delivery vehicle. The control-possible location indicates location information of the delivery source. The control-possible location is represented by longitude and latitude, for example.

The configurations of the user terminal and the delivery vehicle in embodiment 4 are basically the same as in embodiment 1. However, in embodiment 4, the dispatch instruction information acquisition unit 323 of the delivery vehicle 3 acquires dispatch instruction information that includes at least location information of the delivery source, transmitted from the management device 1C. Furthermore, in a case where control instruction information transmitted from outside for controlling the delivery vehicle 3 has been acquired, the control-possible location determination unit 326 determines on the basis of control right information whether or not the present location of the delivery vehicle 3 is the location of the delivery source indicated in the control right information. In a case where it has been determined as a result of the aforementioned determination that the location of the delivery vehicle 3 is the location of the delivery source, processing transitions to the control-possible entity determination unit 327. However, in a case where it has been determined as a result of the aforementioned determination that the location of the delivery vehicle 3 is not the location of the delivery source, processing ends without following the control instruction information.

According to the above configuration, a control right for controlling the delivery vehicle 3 located at the delivery source can be set to a user, and therefore the user is able to cause the delivery vehicle 3 to move in a case where the delivery vehicle 3 has stopped in a location that is inconvenient for the user.

Furthermore, in the present configuration, it is possible for the delivery vehicle 3 to be controlled only when the delivery vehicle 3 is located at the delivery source. It is therefore possible to prevent the user causing the delivery vehicle 3 to move when the delivery vehicle 3 is located in a place other than the delivery source, that is, when control of the delivery vehicle 3 is not necessary.

Furthermore, in the present embodiment 4, the control right setting unit 124C may decide a delivery source control right exercisable range representing a region in which a control instruction can be issued to the delivery vehicle 3, in accordance with a predetermined rule and on the basis of location information of the delivery source, and may set a control right for controlling the delivery vehicle 3 located in the delivery source control right exercisable range, to the delivery source user identification information. In a case where the dispatch destination is the delivery source, the control right setting unit 124C generates a delivery source control right exercisable range in which a user is permitted to control the delivery vehicle at the delivery source, on the basis of the location of the delivery source. Then, in the case where the dispatch destination is the delivery source, the control right setting unit 124C sets a control right that permits control of the delivery vehicle located within the delivery source control right exercisable range, to a user.

Furthermore, in the present embodiment 4, the control right setting unit 124C may decide a delivery source control-possible range representing a region in which the delivery vehicle 3 can move according to control instruction information, in accordance with a predetermined rule and on the basis of location information of the delivery source, and may set a control right for controlling, within the delivery source control-possible range, the delivery vehicle 3 located at the delivery source, to the delivery source user identification information. In a case where the dispatch destination is the delivery destination, the control right setting unit 124C generates a delivery source control-possible range in which the delivery vehicle can move at the delivery source, on the basis of the location of the delivery source. Then, in the case where the dispatch destination is the delivery source, the control right setting unit 124C sets a control right that permits movement control of the delivery vehicle within the delivery source control-possible range, to a user.

It should be noted that, also in the present embodiment 4, the management device 1C may alter the setting of a control right for controlling a delivery vehicle which has been set based on dispatch request information, in accordance with the delivery status of the delivery vehicle. It should be noted that the method for altering the setting of a control right is similar to that of embodiment 2.

Embodiment 5

In embodiment 5, table data having associated therein location information of a dispatch destination of a delivery vehicle designated by the user, and location information of a movement destination of the delivery vehicle when the user has caused the delivery vehicle having arrived at the dispatch destination to move, and thereby, in a case where location information of the same dispatch destination has been designated once again, location information of the movement destination associated with the location information of the designated dispatch destination is extracted from the table data, and the extracted location information of the movement destination is decided as a stopping location for the dispatch destination of the delivery vehicle.

Figure 32:
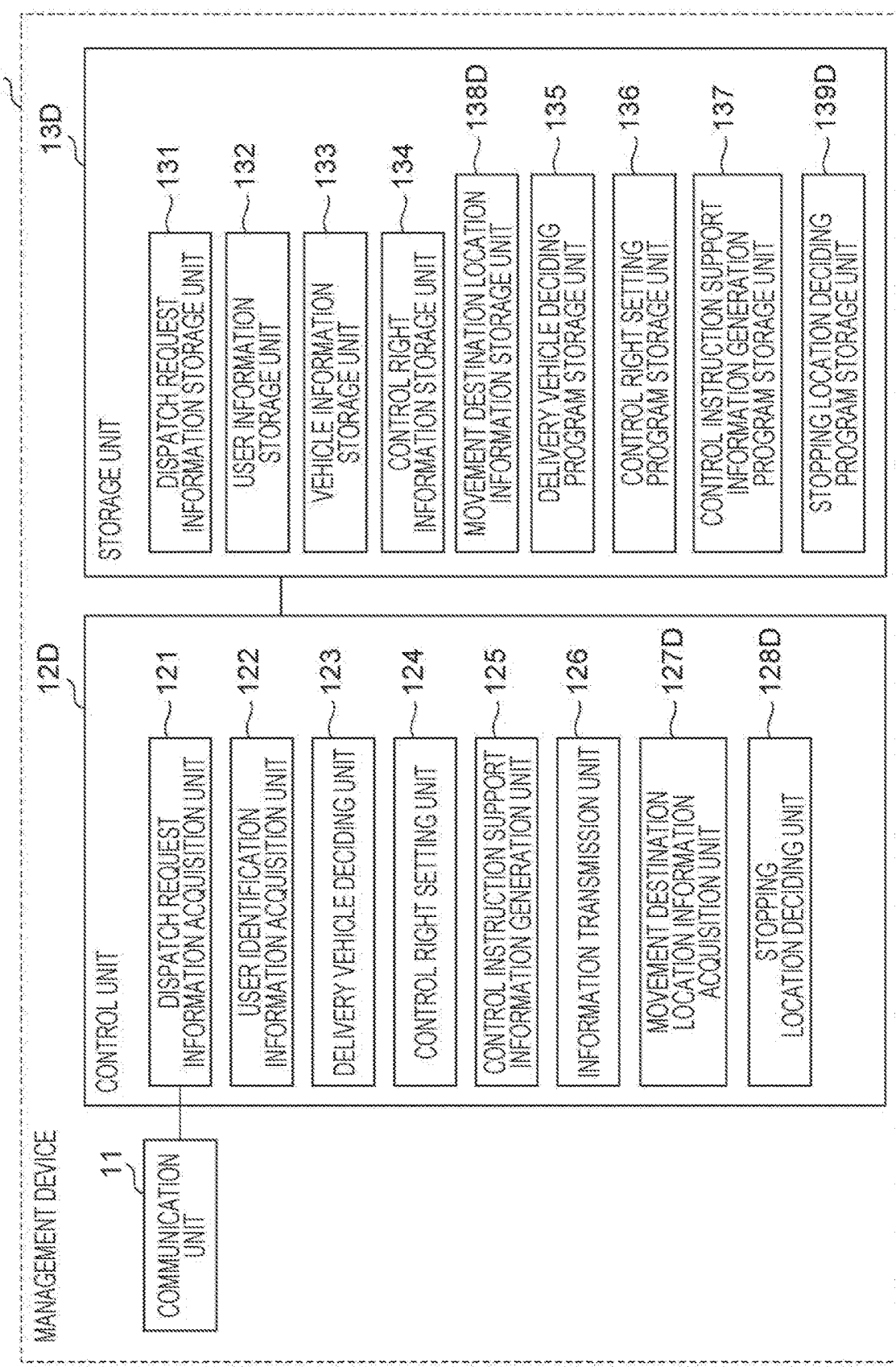
FIG. 32 is a block diagram depicting a configuration of a management device in embodiment 5 of the present disclosure.

FIG. 32 is a block diagram depicting a configuration of a management device in embodiment 5 of the present disclosure. A management device 1D is provided with the communication unit 11, a control unit 12D, and a storage unit 13D. It should be noted that, in FIG. 32, elements similar to those as in FIG. 2 are denoted by the same reference numbers, and detailed descriptions thereof are omitted.

The control unit 12D and the storage unit 13D in the management device 1D depicted in FIG. 32 are different from the management device 1 depicted in FIG. 2.

The control unit 12D is provided with the dispatch request information acquisition unit 121, the user identification information acquisition unit 122, the delivery vehicle deciding unit 123, the control right setting unit 124, the control instruction support information generation unit 125, the information transmission unit 126, a movement destination location information acquisition unit 127D, and a stopping location deciding unit 128D.

The storage unit 13D is provided with the dispatch request information storage unit 131, the user information storage unit 132, the vehicle information storage unit 133, the control right information storage unit 134, the delivery vehicle deciding program storage unit 135, the control right setting program storage unit 136, the control instruction support information generation program storage unit 137, a movement destination location information storage unit 138D, and a stopping location deciding program storage unit 139D.

The movement destination location information acquisition unit 127D acquires movement destination location information indicating the location of a movement destination, from the delivery vehicle 3 which has moved in accordance with control instruction information, via the communication unit 11. The delivery vehicle 3, when having moved in accordance with control instruction information transmitted from the user terminal 2, acquires movement destination location information indicating the location of a movement destination, and transmits the acquired movement destination location information to the management device 1D.

Furthermore, the movement destination location information acquisition unit 127D associates and stores the acquired movement destination location information and the location information of a dispatch destination included in dispatch request information received from the user terminal 2, in the movement destination location information storage unit 138D. It should be noted that the location information of a dispatch destination includes the location information of a delivery destination and the location information of a delivery source. Furthermore, the movement destination location information includes movement destination location information for the delivery destination and movement destination location information for the delivery source.

The movement destination location information storage unit 138D stores table data having associated therein location information of a dispatch destination and movement destination location information.

Figures 33, 34:
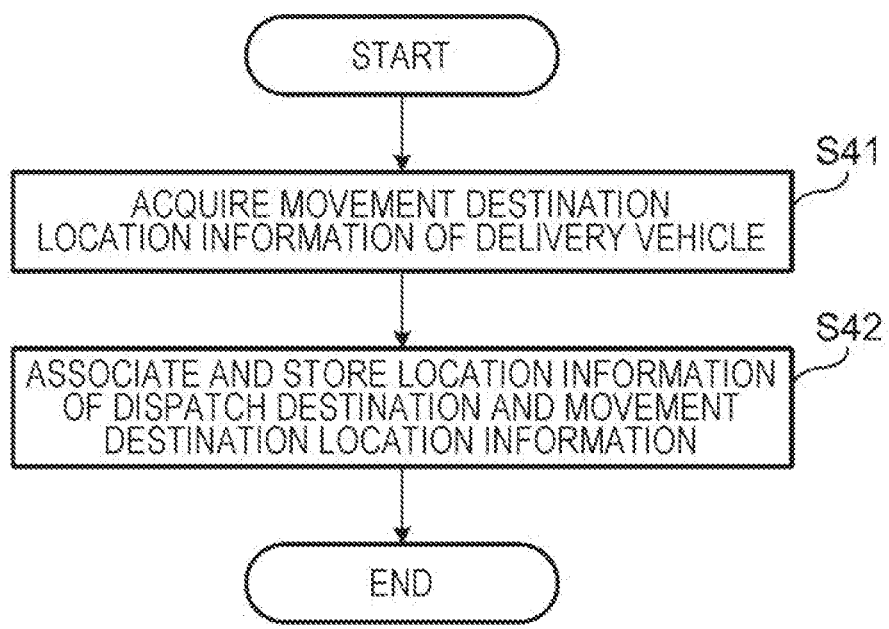
FIG. 33 is a drawing depicting an example of table data stored in a movement destination location information storage unit in embodiment 5.
FIG. 34 is a flowchart for describing movement destination location information storage processing carried out by the management device in embodiment 5 of the present disclosure.

FIG. 33 is a drawing depicting an example of table data stored in the movement destination location information storage unit in the present embodiment 5. As depicted in FIG. 33, location information of a dispatch destination and movement destination location information are represented by GPS information (latitude and longitude).

The location information of a dispatch destination in the present embodiment 5 is GPS information (latitude and longitude); however, it should be noted that the present disclosure is not particularly restricted thereto, and the location information of a dispatch destination may be an address or the name of a facility. Furthermore, the movement destination location information in the present embodiment 5 is GPS information (latitude and longitude); however, the present disclosure is not particularly restricted thereto, and the movement destination location information may be a movement direction and a movement distance with respect to the location information of a dispatch destination. For example, in a case where the delivery vehicle 3 has moved 1 meter in the direction of north from the location of a dispatch destination, the movement destination location information includes the movement direction of "north" and the movement distance of "1 meter".

The stopping location deciding unit 128D extracts movement destination location information associated with the location information of a dispatch destination included in dispatch request information from the table data, and decides the extracted movement destination location information as a stopping location for the dispatch destination of the delivery vehicle 3.

Following on, processing in which the management device 1 stores the movement destination location information received from the delivery vehicle 3 will be described in detail using the flowchart of FIG. 34.

FIG. 34 is a flowchart for describing movement destination location information storage processing carried out by the management device in embodiment 5 of the present disclosure.

First, the movement destination location information acquisition unit 127D of the management device 1 acquires movement destination location information indicating the location of a movement destination, from the delivery vehicle 3 which has moved in accordance with control instruction information (step S41).

Next, the movement destination location information acquisition unit 127D associates and stores the acquired movement destination location information and location information of a dispatch destination included in dispatch request information received from the user terminal 2, in the movement destination location information storage unit 138D (step S42).

Following on, vehicle control processing carried out by the management device 1 in the present embodiment 5 will be described in detail using the flowchart of FIG. 35.

Figure 35:
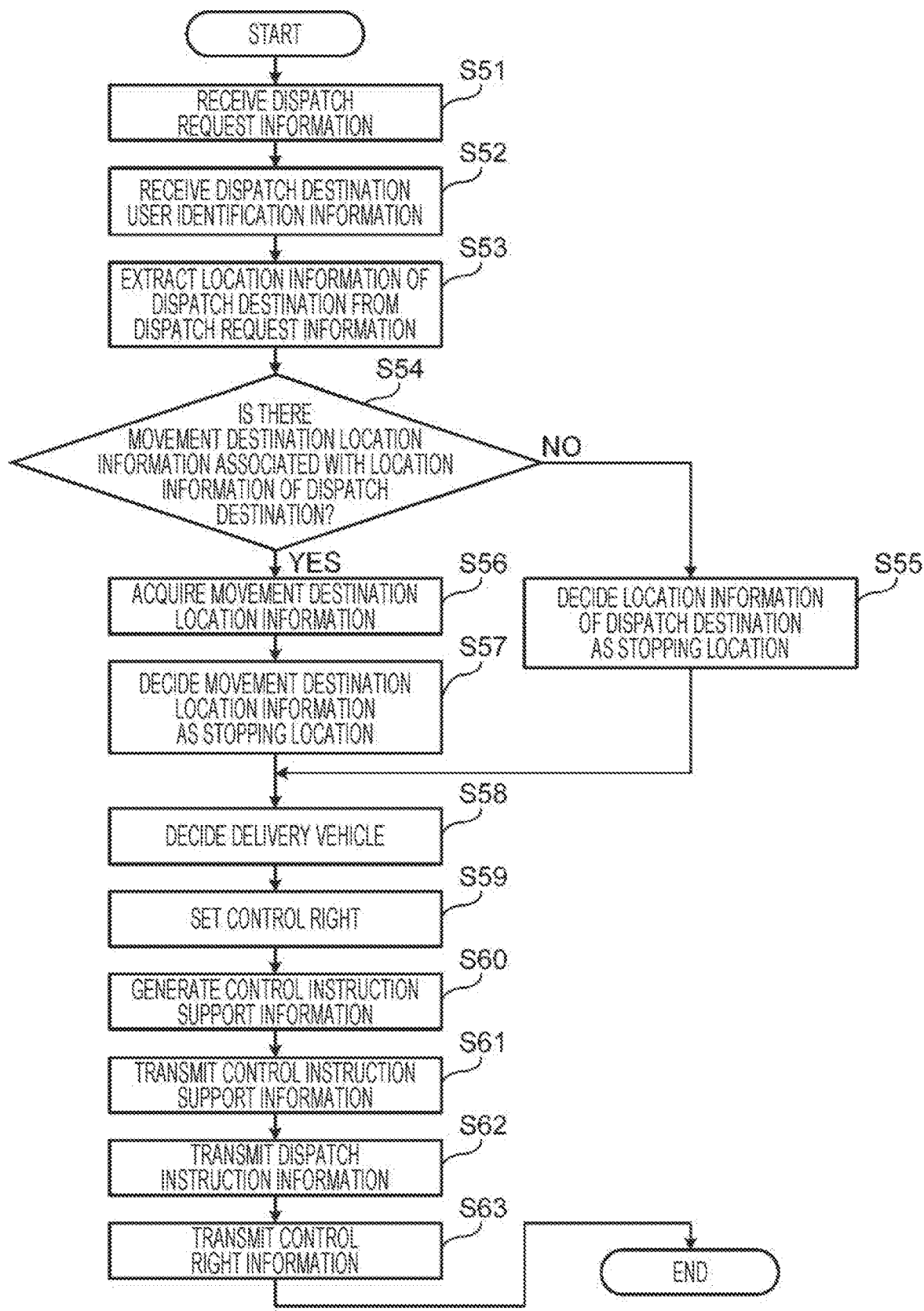
FIG. 35 is a flowchart for describing vehicle control processing carried out by the management device in embodiment 5 of the present disclosure.

FIG. 35 is a flowchart for describing vehicle control processing carried out by the management device in embodiment 5 of the present disclosure.

First, the dispatch request information acquisition unit 121 of the management device 1 receives dispatch request information transmitted from the user terminal 2, and stores the received dispatch request information in the dispatch request information storage unit 131 (step S51). The dispatch request information includes user identification information for identifying a user or the user terminal 2 possessed by the user, and location information of a delivery destination. Next, the user identification information acquisition unit 122 of the management device 1 receives dispatch destination user identification information for identifying a user who is to use the delivery vehicle 3 located at the dispatch destination or the user terminal 2 possessed by the user, from the user terminal 2 (step S52). The dispatch destination user identification information includes: delivery source user identification information for identifying a user who is to use the delivery vehicle 3 located at a delivery source or the user terminal 2 possessed by the user; and delivery destination user identification information for identifying a user who is to use the delivery vehicle 3 located at a delivery destination or the user terminal 2 possessed by the user.

Next, the stopping location deciding unit 128D extracts location information of the dispatch destination from the dispatch request information (step S53).

Next, the stopping location deciding unit 128D determines whether or not movement destination location information associated with the extracted location information of the dispatch destination is in the movement destination location information storage unit 138D (step S54). Here, in a case where it has been determined that the movement destination location information associated with the extracted location information of the dispatch destination is not in the movement destination location information storage unit 138D ("no" in step S54), the stopping location deciding unit 128D decides on the extracted location information of the dispatch destination as a stopping location for the delivery vehicle 3 (step S55).

However, in a case where it has been determined that the movement destination location information associated with the extracted location information of the dispatch destination is in the movement destination location information storage unit 138D ("yes" in step S54), the stopping location deciding unit 128D acquires the movement destination location information associated with the extracted location information of the dispatch destination from the movement destination location information storage unit 138D (step S56).

Next, the stopping location deciding unit 128D decides on the acquired movement destination location information as a stopping location for the delivery vehicle 3 (step S57).

It should be noted that the processing of steps S58 to S61 is the same as the processing of steps S105 to S108 depicted in FIG. 8 and therefore a description thereof is omitted.

Next, the information transmission unit 126 of the management device 1 transmits, to the delivery vehicle 3, dispatch instruction information that is based on the stopping location decided by the stopping location deciding unit 128D (step S62). The dispatch instruction information includes at least the stopping location for the delivery vehicle 3 for the dispatch destination.

It should be noted that the processing of step S63 is the same as the processing of step S112 depicted in FIG. 8 and therefore a description thereof is omitted.

In this way, location information of a dispatch destination included in the dispatch request information received from the user terminal 2, and movement destination location information indicating the location of a movement destination for the delivery vehicle which has moved in accordance with control instruction information, are associated and stored in the movement destination location information storage unit 138D, and therefore, in a case where location information of the same dispatch destination has been requested once again, the location of the movement destination can be decided as a stopping location for the delivery vehicle, and processing for causing the delivery vehicle to move can be reduced.

In the present embodiment 5, after movement destination location information has been acquired, location information of the dispatch destination and movement destination location information are associated and stored in the movement destination location information storage unit 138D; however, it should be noted that the present disclosure is not particularly restricted thereto, and the user terminal 2 may be queried as to whether location information of the dispatch destination and movement destination location information may be associated and stored in the movement destination location information storage unit 138D. There is a possibility of the user having temporarily moved the location of the dispatch destination, and therefore whether the dispatch destination may also be moved next time or thereafter is confirmed with the user.

In this case, the management device 1, when having acquired the movement destination location information, transmits a query as to whether location information of the dispatch destination and movement destination location information may be associated and stored in the movement destination location information storage unit 138D, to the user terminal 2. The user terminal 2 receives the query from the management device 1, and accepts a response from the user as to whether or not location information of the dispatch destination and movement destination location information may be associated and stored in the movement destination location information storage unit 138D. The user terminal 2 transmits, to the management device 1, a response result as to whether or not location information of the dispatch destination and movement destination location information may be associated and stored in the movement destination location information storage unit 138D. When having received a positive response result for the query, the movement destination location information acquisition unit 127D of the management device 1 associates and stores the location information of the dispatch destination and the movement destination location information in the movement destination location information storage unit 138D. However, when having received a negative response result for the query, the movement destination location information acquisition unit 127D discards the acquired movement destination location information without associating and storing the location information of the dispatch destination and the movement destination location information in the movement destination location information storage unit 138D.

Furthermore, in the present embodiment 5, the number of times that the location of a dispatch destination has been moved to a predetermined movement destination is counted, and the location information of the dispatch destination and the movement destination location information may be associated and stored in the movement destination location information storage unit 138D in a case where the counted number of times has become greater than or equal to a threshold value.

In this case, when having acquired movement destination location information, the movement destination location information acquisition unit 127D of the management device 1 associates and stores the location information of the dispatch destination, the movement destination location information, and the number of times that the location of the dispatch destination has been moved to a predetermined movement destination, in the storage unit 13D. Then, when having acquired movement destination location information once again, the movement destination location information acquisition unit 127D increments the number of times associated with the movement destination location information. The movement destination location information acquisition unit 127D determines whether or not the number of times associated with the movement destination location information is greater than or equal to the threshold value. When having determined that the number of times is greater than or equal to the threshold value, the movement destination location information acquisition unit 127D associates and stores the location information of the dispatch destination and the movement destination location information in the movement destination location information storage unit 138D.

Furthermore, in the present embodiment 5, the movement destination location information storage unit 138D may store table data having associated therein location information of a dispatch destination and movement destination location information, for each item of user identification information. Thereby, the location of a dispatch destination can be altered according to a preference of a specific user, and convenience for the specific user can be improved.

Furthermore, in the present embodiment 5, table data having associated therein location information of a dispatch destination and movement destination location information may be associated with other user identification information rather than being associated with only one item of user identification information with respect to which movement control has been carried out. In other words, table data having associated therein location information of a dispatch destination and movement destination location information may be shared by a plurality of users. For example, there is a possibility of one user who designates the same dispatch destination as another user also causing a delivery vehicle at a dispatch destination to move in a manner similar to the other user. In particular, there is a possibility of a plurality of users who live in the same condominium each designating the same dispatch destination and designating the same movement destination. Thus, the stopping location deciding unit 128D refers to table data having associated therein location information of a dispatch destination requested by one user and movement destination location information with respect to which movement has been caused by the one user, and, in a case where location information of a dispatch destination requested by another user is the same as the location information of the dispatch destination requested by the one user, the movement destination location information with respect to which movement has been caused by the one user is decided as a stopping location.

Thus, the movement of the delivery vehicle at the dispatch destination caused by the one user is reflected for the other user as well, and therefore processing in which the other user causes the delivery vehicle to move here can be reduced.

Furthermore, in the present embodiment 5, the movement destination location information storage unit 138D may store table data having associated therein location information of a dispatch destination, movement destination location information, and attribute information of users. The attribute information is, for example, information indicating whether a user is a customer or an employee of a facility at the dispatch destination. At stores, hospitals, and the like, there are cases where the doorways for customers and employees are different. Therefore, by associating movement destination location information and attribute information of users, the location of the dispatch destination can be amended to the location of the movement destination according to an attribute of a user, and convenience for the user can be further improved. In this case, the attribute information is included in the dispatch request information. The user terminal 2 accepts the input of attribute information when the input of the location information of a dispatch destination is accepted. It should be noted that attribute information may be stored in advance in the user information storage unit 132. When having acquired movement destination location information, the movement destination location information acquisition unit 127D may associate and store location information of a dispatch destination, the movement destination location information, and attribute information stored in the user information storage unit 132, in the storage unit 13D.

Furthermore, in a case where a plurality of mutually different users have caused the location of the same dispatch destination to be moved to the same location, the movement destination location information acquisition unit 127D may associate and store location information of the movement destination and movement destination location information in the movement destination location information storage unit 138D.

Furthermore, in the present embodiment 5, in a case where the location information of dispatch destinations is represented by GPS information, if the location information of a dispatch destination included in dispatch request information and the location information of a dispatch destination stored in the movement destination location information storage unit 138D do not match, movement destination location information is never acquired from the movement destination location information storage unit 138D. Therefore, in a case where the location information of a dispatch destination included in dispatch request information and the location information of a dispatch destination stored in the movement destination location information storage unit 138D deviate by just a little, the location information of the dispatch destination included in the dispatch request information is not subject to movement.

Thus, the stopping location deciding unit 128D may determine whether or not location information of a dispatch destination present within a predetermined range is in the movement destination location information storage unit 138D from location information of a dispatch destination extracted from dispatch request information. In a case where it has been determined from location information of a dispatch destination extracted from dispatch request information that location information of a dispatch destination present within a predetermined range is in the movement destination location information storage unit 138D, the stopping location deciding unit 128D acquires movement destination location information associated with the location information of the dispatch destination from the movement destination location information storage unit 138D. However, in a case where it has been determined from location information of a dispatch destination extracted from dispatch request information that location information of a dispatch destination present within a predetermined range is not in the movement destination location information storage unit 138D, the stopping location deciding unit 128D decides on location information of the dispatch destination extracted from the dispatch request information as a stopping location for the delivery vehicle 3.

It should be noted that the stopping location deciding unit 128D may determine whether or not the movement destination location information storage unit 138D includes location information of a dispatch destination with which the distance from the location information of the dispatch destination extracted from the dispatch request information is within a predetermined distance.

Furthermore, in the present embodiment 5, the movement destination location information storage unit 138D may store table data having associated therein location information of a dispatch destination, movement destination location information, and the orientation of a package retrieval opening in the delivery vehicle. There are cases where whether or not the location of a dispatch destination is to be altered is decided depending on whether the package retrieval opening is at the left side surface, right side surface, or rear surface of the delivery vehicle. For example, there are cases where the location of the dispatch destination is not altered when the package retrieval opening is at the left side surface of the delivery vehicle, and the location of the dispatch destination is altered when the package retrieval opening is at the rear surface of the delivery vehicle.

Thus, the movement destination location information storage unit 138D may store table data having associated therein location information of a dispatch destination, movement destination location information, and the orientation of the package retrieval opening in the delivery vehicle. In this case, the management device 1 receives information indicating the orientation of the package retrieval opening together with movement destination location information from the delivery vehicle 3. The management device 1 may store information indicating the orientation of a package retrieval opening in the storage unit 13D in advance, or may receive information indicating the orientation of a package retrieval opening from another device that manages information relating to delivery vehicles.

The stopping location deciding unit 128D then, after the delivery vehicle 3 has been decided and the orientation of a package retrieval opening in the decided delivery vehicle 3 has been specified, determines whether or not movement destination location information associated with location information of a dispatch destination extracted from dispatch request information is in the movement destination location information storage unit 138D. In a case where it has been determined that movement destination location information associated with the extracted location information of the dispatch destination is in the movement destination location information storage unit 138D, the stopping location deciding unit 128D determines whether or not the specified orientation of the package retrieval opening is the same as the orientation of the package retrieval opening associated with the movement destination location information. In a case where it has been determined that the specified orientation of the package retrieval opening is the same as the orientation of the package retrieval opening associated with the movement destination location information, the stopping location deciding unit 128D acquires the movement destination location information associated with the extracted location information of the dispatch destination, from the movement destination location information storage unit 138D. However, in a case where it has been determined that the specified orientation of the package retrieval opening is different from the orientation of the package retrieval opening associated with the movement destination location information, the stopping location deciding unit 128D decides on the extracted location information of the dispatch destination as a stopping location for the delivery vehicle 3.

Furthermore, there are cases where the location is different depending on the vehicle type even if the orientation of the package retrieval opening is the same. For example, even if the orientation of a package retrieval opening is at the left side surface of a delivery vehicle, depending on the vehicle type, a package retrieval opening may also be present at the front side, the center, or the rear side of the delivery vehicle. Thus, the movement destination location information storage unit 138D may store table data having associated therein location information of a dispatch destination, movement destination location information, and the vehicle type of the delivery vehicle. In this case, the management device 1 receives information indicating the vehicle type of the delivery vehicle together with movement destination location information from the delivery vehicle 3. The management device 1 may store information indicating the vehicle type of the delivery vehicle in the storage unit 13D in advance, or may receive information indicating the vehicle type of the delivery vehicle opening from another device that manages information relating to delivery vehicles.

The stopping location deciding unit 128D then, after the delivery vehicle 3 has been decided and the vehicle type of the decided delivery vehicle 3 has been specified, determines whether or not movement destination location information associated with location information of a dispatch destination extracted from dispatch request information is in the movement destination location information storage unit 138D. In a case where it has been determined that movement destination location information associated with the extracted location information of the dispatch destination is in the movement destination location information storage unit 138D, the stopping location deciding unit 128D determines whether or not the specified vehicle type is the same as the vehicle type associated with the movement destination location information. In a case where it has been determined that the specified vehicle type is the same as the vehicle type associated with the movement destination location information, the stopping location deciding unit 128D acquires the movement destination location information associated with the extracted location information of the dispatch destination, from the movement destination location information storage unit 138D. However, in a case where it has been determined that the specified vehicle type is different from the vehicle type associated with the movement destination location information, the stopping location deciding unit 128D decides on the extracted location information of the dispatch destination as a stopping location for the delivery vehicle 3.

Furthermore, in a case where it is possible to acquire information relating to the location of a package retrieval opening for each vehicle type, the movement destination location information storage unit 138D may store table data having associated therein location information of a dispatch destination, movement destination location information that has been corrected according to the vehicle type, and the vehicle type of the delivery vehicle. In this case, the storage unit 13D additionally stores table data having associated therein the vehicle type of the delivery vehicle and the location of the package retrieval opening. For example, in a case where the package retrieval opening of a first vehicle type is in a location that is 1 meter from the front of the vehicle, the package retrieval opening of a second vehicle type is in a location that is 1.5 meters from the front of the vehicle, and the location of the dispatch destination for a delivery vehicle of the first vehicle type has been altered, first, the movement destination location information acquisition unit 127D associates and stores location information of the dispatch destination, movement destination location information, and the first vehicle type in the movement destination location information storage unit 138D. Next, the movement destination location information acquisition unit 127D calculates a location obtained by adding 0.5 meters to the location of the movement destination for the first vehicle type as movement destination location information for the second vehicle type, and associates and stores location information of the dispatch destination, the calculated movement destination location information, and the second vehicle type in the movement destination location information storage unit 138D.

In this way, table data having associated therein a plurality of vehicle types and the locations of package retrieval openings of each of the plurality of vehicle types is stored, and, in a case where movement destination location information of one vehicle type from among the plurality of vehicle types has been acquired, movement destination location information of another vehicle type can be calculated from the relationship between the location of the package retrieval opening of the one vehicle type and the location of the package retrieval opening of the other vehicle type.

Furthermore, there is a possibility of a user causing the delivery vehicle 3 to move a plurality of times up to loading being started or up to unloading being started. Therefore, the movement destination location information storage unit 138D may store table data having associated therein location information of a dispatch destination, and movement destination location information indicating the location of the movement destination at which loading has finally been carried out or movement destination location information indicating the location of the movement destination at which unloading has finally been carried out. The location of movement destinations at which the user has not carried out loading and the location of movement destinations at which the user has not carried out unloading are not necessary, and therefore processing in which unnecessary information is stored can be omitted.

Furthermore, the movement destination location information storage unit 138D may store table data having associated therein location information of a dispatch destination, movement destination location information, and weather information for the delivery destination. There are cases where the stopping location for the delivery vehicle when the weather is sunny and the stopping location for the delivery vehicle when the weather is rainy are different. Thus, the movement destination location information acquisition unit 127D, when having acquired movement destination location information, acquires weather information for the delivery destination. The movement destination location information acquisition unit 127D then associates and stores location information of the dispatch destination, movement destination location information, and the acquired weather information for the delivery destination in the storage unit 13D. It is possible for the management device 1 to acquire weather information for the delivery destination from an external server.

A configuration may be adopted in which weather information is acquired from the delivery vehicle 3 in a case where the delivery vehicle 3 has a rain sensor. Furthermore, a configuration may be adopted in which weather information is acquired from the user terminal 2 by prompting the user to input weather information when a query regarding a stopping location is issued to the user terminal 2.

Furthermore, it is thought that there are many users who wait indoors for the delivery vehicle 3 to arrive on days on which the air temperature is high or days on which the air temperature is low, and in cases such as these, it is desirable for the delivery vehicle 3 to stop near the doorway of the building. Therefore, it is also thought that the stopping location is different between days on which the air temperature is high and days on which the air temperature is low, and days other than these. Therefore, a configuration may be adopted in which information on the air temperature is associated with the stopping location.

Embodiment 6

In embodiments 1 to 5, a control right for the delivery vehicle 3 is assigned to a user, and the user controls the movement of the delivery vehicle 3 using the user terminal 2; however, in embodiment 6, a selection is performed as to whether the control right for the delivery vehicle 3 is to be assigned to the user or whether a vehicle operator who is in a remote location is to be made to remotely operate the delivery vehicle 3, and the user or the vehicle operator controls the movement of the delivery vehicle 3 using the user terminal 2 or a remote operation device.

Figure 36:
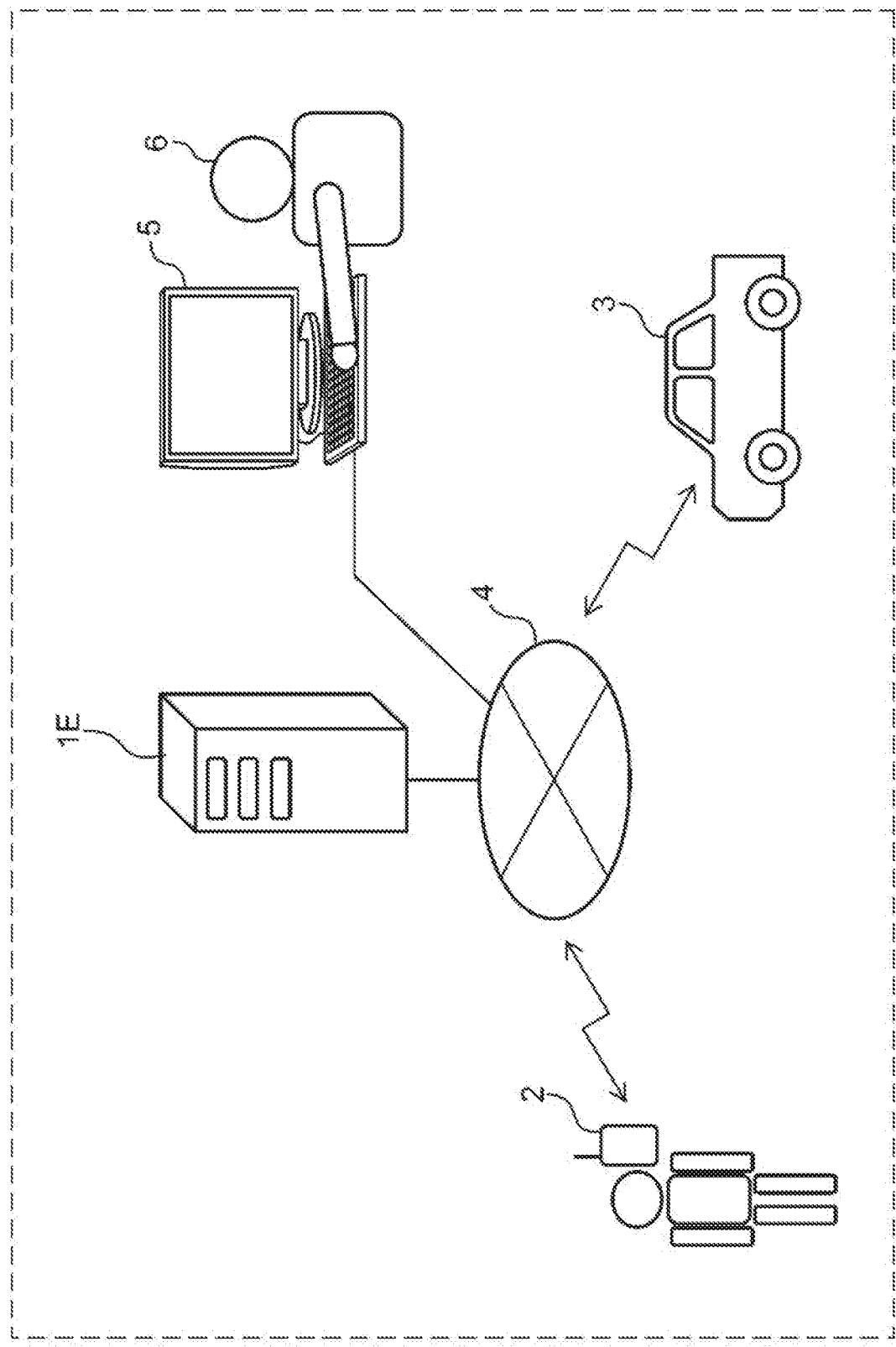
FIG. 36 is a drawing conceptually depicting an overall configuration of a vehicle control system in embodiment 6 of the present disclosure.

FIG. 36 is a drawing conceptually depicting an overall configuration of a vehicle control system in embodiment 6 of the present disclosure.

The vehicle control system depicted in FIG. 36 is provided with a management device 1E, the user terminal 2, the delivery vehicle 3, and a remote operation device 5.

The remote operation device 5 receives, from the delivery vehicle 3, vehicle state information relating to the vehicle main body such as the vehicle speed, present location, and steering angle, or peripheral environment information obtained by capturing the peripheral environment of the delivery vehicle 3, and transmits, to the delivery vehicle 3, travel instruction information indicating a travel instruction for the delivery vehicle 3 that has been input by a vehicle operator 6. The remote operation device 5 is communicably connected to the management device 1E and the delivery vehicle 3 via the network 4.

The remote operation device 5 is installed in a place that is distant from the delivery vehicle 3, and the vehicle operator 6 is not able to observe the delivery vehicle 3. In a case where the control right for the delivery vehicle 3 has been assigned to the remote operation device 5, the remote operation device 5 accepts an operation performed by the vehicle operator 6 and remotely controls the delivery vehicle 3.

For example, in a case where the user at the dispatch destination is not carrying a user terminal, in a case where it is not known whether the user at the dispatch destination is carrying a user terminal, or in a case where it is predicted that the user at the dispatch destination is not skilled at operating a user terminal, it is preferable for the control right for the delivery vehicle 3 to not be assigned to the user, and for the vehicle operator 6 to be made to remotely operate the delivery vehicle 3.

Figure 37:
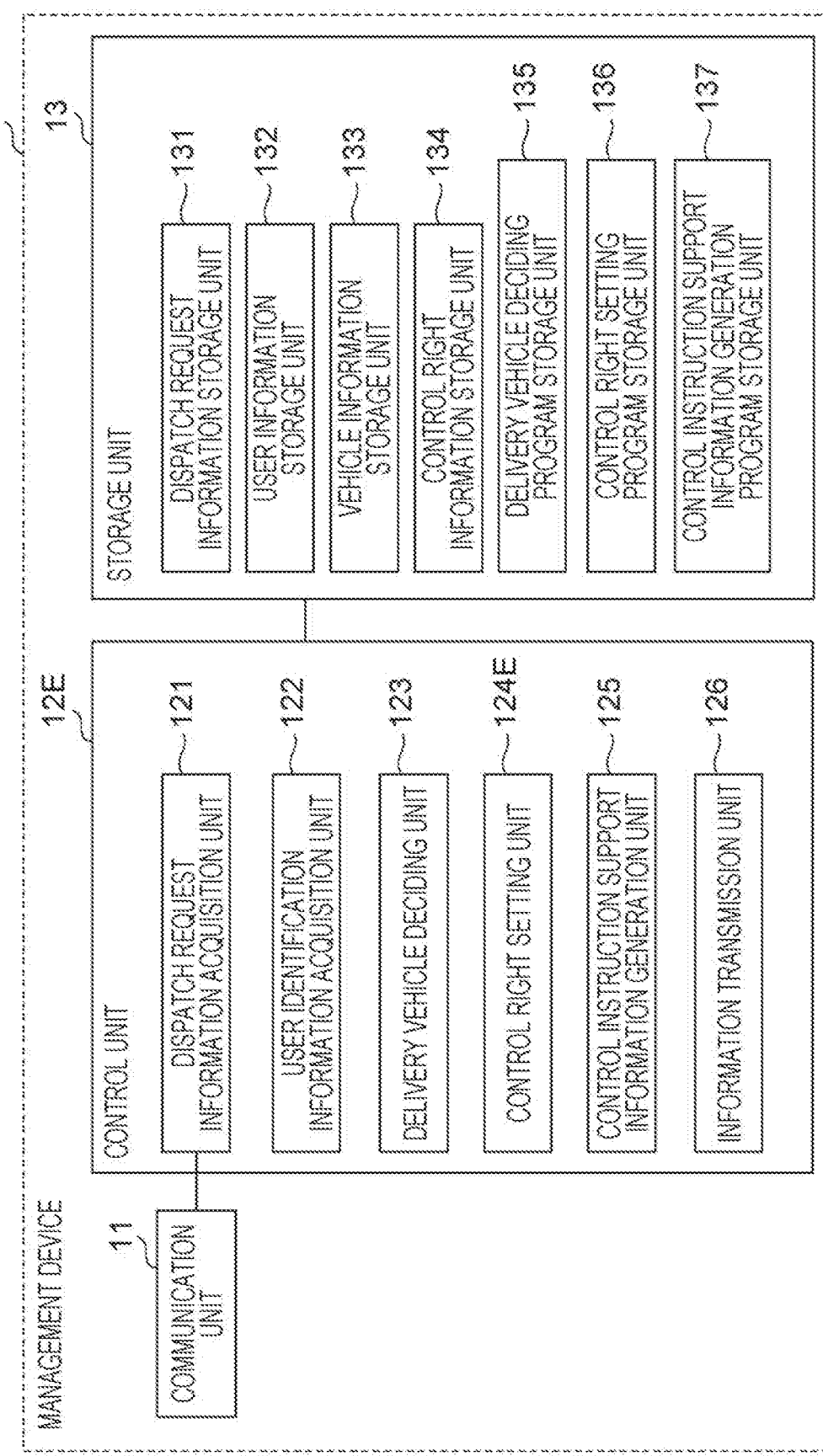
FIG. 37 is a block diagram depicting a configuration of a management device in embodiment 6 of the present disclosure.

FIG. 37 is a block diagram depicting a configuration of a management device in embodiment 6 of the present disclosure. The management device 1E is provided with the communication unit 11, a control unit 12E, and the storage unit 13. It should be noted that, in FIG. 37, elements similar to those as in FIG. 2 are denoted by the same reference numbers, and detailed descriptions thereof are omitted.

The control unit 12E in the management device 1E depicted in FIG. 37 is different from the management device 1 depicted in FIG. 2.

The control unit 12E is provided with the dispatch request information acquisition unit 121, the user identification information acquisition unit 122, the delivery vehicle deciding unit 123, a control right setting unit 124E, the control instruction support information generation unit 125, and the information transmission unit 126.

The control right setting unit 124E determines whether or not the vehicle operator 6 is to be made to remotely operate the delivery vehicle 3, on the basis of attribute information of the user at the dispatch destination. The attribute information is information indicating the age of the user at the dispatch destination, for example. The attribute information is included in the dispatch request information. The user terminal 2 accepts the input of attribute information when the input of the location information of a dispatch destination is accepted. It should be noted that attribute information may be stored in advance in the user information storage unit 132.

The control right setting unit 124E determines whether or not the age of the user at the dispatch destination is less than or equal to a first age, and also determines whether or not the age of the user at the dispatch destination is greater than or equal to a second age that is higher than the first age. The first age is 12 years, for example, and the second age is 70 years, for example. In other words, the control right setting unit 124E determines whether or not the user at the dispatch destination is a child, and whether or not the user at the dispatch destination is an elderly person. The control right setting unit 124E determines that the vehicle operator 6 is to be made to remotely operate the delivery vehicle 3 when having determined that the age of the user at the dispatch destination is less than or equal to the first age, or when having determined that the age of the user at the dispatch destination is greater than or equal to the second age.

However, the control right setting unit 124E sets a control right that permits control of the delivery vehicle 3 to the user at the dispatch destination on the basis of dispatch request information and user identification information when having determined that the age of the user at the dispatch destination is higher than the first age and is lower than the second age.

In the present embodiment 6, the attribute information is information indicating the age of the user at the dispatch destination; however, it should be noted that the present disclosure is not particularly restricted thereto, and the attribute information may be information indicating whether or not the user at the dispatch destination is a handicapped person. The control right setting unit 124E determines that the vehicle operator 6 is to be made to remotely operate the delivery vehicle 3 when having determined that the user at the dispatch destination is a handicapped person. Furthermore, the control right setting unit 124E sets a control right that permits control of the delivery vehicle 3 to the user at the dispatch destination on the basis of dispatch request information and user identification information when having determined that the user at the dispatch destination is not a handicapped person.

In a case where it has been determined that the vehicle operator 6 is to be made to remotely operate the delivery vehicle 3, the information transmission unit 126 transmits control request information for requesting the vehicle operator 6 to control the delivery vehicle 3, to the remote operation device 5. The remote operation device 5 receives the control request information transmitted by the management device 1E, and accepts a remote operation for the delivery vehicle 3 performed by the vehicle operator 6.

In a case where it is predicted that the user at the dispatch destination is not skilled at controlling the delivery vehicle 3 by means of the user terminal 2, the vehicle operator 6 is made to remotely operate the delivery vehicle 3, and therefore it is possible to cause the delivery vehicle 3 having arrived at the dispatch destination to move immediately.

In the present embodiment 6, the control right setting unit 124E determines whether or not the vehicle operator 6 is to be made to remotely operate the delivery vehicle 3, on the basis of attribute information of the user at the dispatch destination; however, it should be noted that the present disclosure is not particularly restricted thereto, and the control right setting unit 124E may determine whether or not the vehicle operator 6 is to be made to remotely operate the delivery vehicle 3, on the basis of a history of past movement control at the dispatch destination. In other words, at a dispatch destination at which movement control has been carried out in the past, there is a high possibility of movement control being carried out at the present time as well. Thus, the vehicle operator 6 is to be made to remotely operate the delivery vehicle 3 in a case where movement control has been carried out in the past at the dispatch destination. The storage unit 13 stores history information having associated therein location information of the dispatch destination and movement destination location information. It should be noted that the history information may be the same as the table data stored by the movement destination location information storage unit of embodiment 5. It should be noted that the history information may be history information of the user at the dispatch destination or may be history information of other users. Furthermore, the history information may be only location information of a dispatch destination at which movement control has been carried out in the past.

In this case, the control right setting unit 124E determines whether or not movement control has been carried out in the past at the dispatch destination. The control right setting unit 124E determines that the vehicle operator 6 is to be made to remotely operate the delivery vehicle 3 when having determined that movement control has been carried out in the past at the dispatch destination. However, the control right setting unit 124 sets a control right that permits control of the delivery vehicle 3 to the user at the dispatch destination, on the basis of dispatch request information and user identification information, when having determined that movement control has not been carried out in the past at the dispatch destination.

Then, in a case where it has been determined that the vehicle operator 6 is to be made to remotely operate the delivery vehicle 3, the information transmission unit 126 transmits control request information for requesting the vehicle operator 6 to control the delivery vehicle 3, to the remote operation device 5. At such time, the control request information may include movement destination location information corresponding to the location information of the dispatch destination. Furthermore, the user may convey the location of the movement destination to the vehicle operator 6.

Furthermore, the control right setting unit 124E may calculate the percentage at which movement control has been carried out in the past at the dispatch destination, and may determine whether or not the calculated percentage is greater than or equal to a predetermined value. For example, the percentage calculated by the control right setting unit 124E is 20% in a case where one user from among five users has carried out movement control at the dispatch destination. The control right setting unit 124E then determines that the vehicle operator 6 is to be made to remotely operate the delivery vehicle 3 when having determined that the calculated percentage is greater than or equal to the predetermined value. However, the control right setting unit 124 sets a control right that permits control of the delivery vehicle 3 to the user at the dispatch destination on the basis of dispatch request information and user identification information when having determined that the calculated percentage is lower than the predetermined value.

In this way, in a case where movement control has been carried out in the past at the dispatch destination, the vehicle operator 6 is made to remotely operate the delivery vehicle 3, and therefore the delivery vehicle 3 having arrived at the dispatch destination can be made to move immediately, and the service for the user can be improved.

Furthermore, the vehicle operator 6 may be made to remotely operate the delivery vehicle 3 at the dispatch destination in a case where a dispatch has been requested by means of a telephone call for which a user has used a landline telephone. In a case where a dispatch has been requested by means of a telephone call for which a user has used a landline telephone, it is unclear whether or not the user is carrying a user terminal. Therefore, when a telephone call is made, work to confirm whether or not the user is carrying a user terminal is necessary; however, this confirmation work can be eliminated by causing the vehicle operator 6 to remotely operate the delivery vehicle 3 at the dispatch destination in a case where a dispatch has been requested by means of a telephone call for which the user has used a landline telephone.

Furthermore, there is no restriction to a landline telephone, and the vehicle operator 6 may be made to remotely operate the delivery vehicle 3 at the dispatch destination in a case where the user has requested a dispatch by means of a telephone call. In a case where the user has requested a dispatch by means of a telephone call, there is a possibility of the user being unfamiliar with operating a user terminal. It is a considerable burden for this kind of user to control the delivery vehicle 3 using a user terminal. Thus, the burden for the user can be reduced by causing the vehicle operator 6 to remotely operate the delivery vehicle 3 at the dispatch destination in a case where the user has requested a dispatch by means of a telephone call.

It should be noted that, in a case where the user requests a dispatch by means of a telephone call, first, the user conveys the location of the dispatch destination to a communication operator (not depicted) by means of the telephone call. The communication operator inputs location information of the dispatch destination to an operator terminal (not depicted). The operator terminal accepts the input of the location information of the dispatch destination performed by the communication operator, and transmits dispatch request information that includes the location information of the dispatch destination to the management device 1E. Whether or not the user has requested a dispatch by means of a telephone call can be determined according to whether or not dispatch request information has been transmitted from the operator terminal. In other words, the control right setting unit 124E determines whether or not received dispatch request information has been transmitted from the operator terminal. The control right setting unit 124E determines that the vehicle operator 6 is to be made to remotely operate the delivery vehicle 3 when having determined that received dispatch request information has been transmitted from the operator terminal. However, the control right setting unit 124E sets a control right that permits control of the delivery vehicle 3 to the user at the dispatch destination, on the basis of dispatch request information and user identification information, when having determined that received dispatch request information has not been transmitted from the operator terminal, in other words, when having determined that received dispatch request information has been transmitted from the user terminal 2. It should be noted that the vehicle operator 6 and the communication operator may be the same person or may be different people, and the remote operation device 5 and the operator terminal may be the same device or different devices.

In this way, in a case where the user has requested a dispatch using an application of the user terminal 2, in other words, in a case where dispatch request information has been transmitted from the user terminal 2, a control right that permits control of the delivery vehicle 3 is set to the user at the dispatch destination.

Furthermore, in the present embodiment 6, a selection is automatically performed as to whether the control right for the delivery vehicle 3 is to be assigned to the user or whether the vehicle operator 6 who is in a remote location is to be made to remotely operate the delivery vehicle 3; however, the vehicle operator 6 may select whether the control right for the delivery vehicle 3 is to be assigned to the user or whether the vehicle operator 6 who is in a remote location is to be made to remotely operate the delivery vehicle 3.

The management device 1E, upon receiving dispatch request information and dispatch destination user identification information from the user terminal 2, transmits, to the operator terminal (not depicted), selection request information for causing the communication operator (not depicted) to select whether the control right for the delivery vehicle 3 is to be assigned to the user or whether the vehicle operator 6 who is in a remote location is to be made to remotely operate the delivery vehicle 3. The operator terminal, upon receiving the selection request information, displays a selection screen for accepting the selection of whether the control right for the delivery vehicle 3 is to be assigned to the user or whether the vehicle operator 6 who is in a remote location is to be made to remotely operate the delivery vehicle 3. The operator terminal, upon receiving the selection request information, then accepts the selection performed by the communication operator for whether the control right for the delivery vehicle 3 is to be assigned to the user or whether the vehicle operator 6 who is in a remote location is to be made to remotely operate the delivery vehicle 3. The operator terminal transmits the result of the selection performed by the communication operator to the management device 1E. The management device 1E selects whether the control right for the delivery vehicle 3 is to be assigned to the user or whether the vehicle operator 6 who is in a remote location is to be made to remotely operate the delivery vehicle 3, in accordance with the received selection result. It should be noted that the vehicle operator 6 and the communication operator may be the same person or may be different people, and the remote operation device 5 and the operator terminal may be the same device or different devices.

It should be noted that, in a case where dispatch request information includes attribute information, the remote operation device 5 may display at least one of the age of the user at the dispatch destination and whether or not the user at the dispatch destination is a handicapped person, on the selection screen. Furthermore, in a case where the management device 1E stores a history of past movement control at the dispatch destination, the remote operation device 5 may display the percentage at which movement control has been carried out in the past at the dispatch destination, on the selection screen. For example, in a case where one user from among five users has carried out movement control at the dispatch destination, the remote operation device 5 displays that the percentage at which movement control has been carried out in the past at the dispatch destination is 20%, on the selection screen. The vehicle operator 6 can thereby select whether the control right for the delivery vehicle 3 is to be assigned to the user or whether the vehicle operator 6 who is in a remote location is to be made to remotely operate the delivery vehicle 3, with reference to the age of the user at the dispatch destination, whether or not the user at the dispatch destination is a handicapped person, or the percentage at which movement control has been carried out in the past at the dispatch destination.

Furthermore, the user may select whether the control right for the delivery vehicle 3 is to be assigned to the user or whether the vehicle operator 6 who is in a remote location is to be made to remotely operate the delivery vehicle 3.

The management device 1E, upon receiving dispatch request information and dispatch destination user identification information from the user terminal 2, transmits, to the user terminal 2, selection request information for causing the user to select whether the control right for the delivery vehicle 3 is to be assigned to the user or whether the vehicle operator 6 who is in a remote location is to be made to remotely operate the delivery vehicle 3. The user terminal 2, upon receiving the selection request information, displays a selection screen for accepting the selection of whether the control right for the delivery vehicle 3 is to be assigned to the user or whether the vehicle operator 6 who is in a remote location is to be made to remotely operate the delivery vehicle 3.

Figure 38:
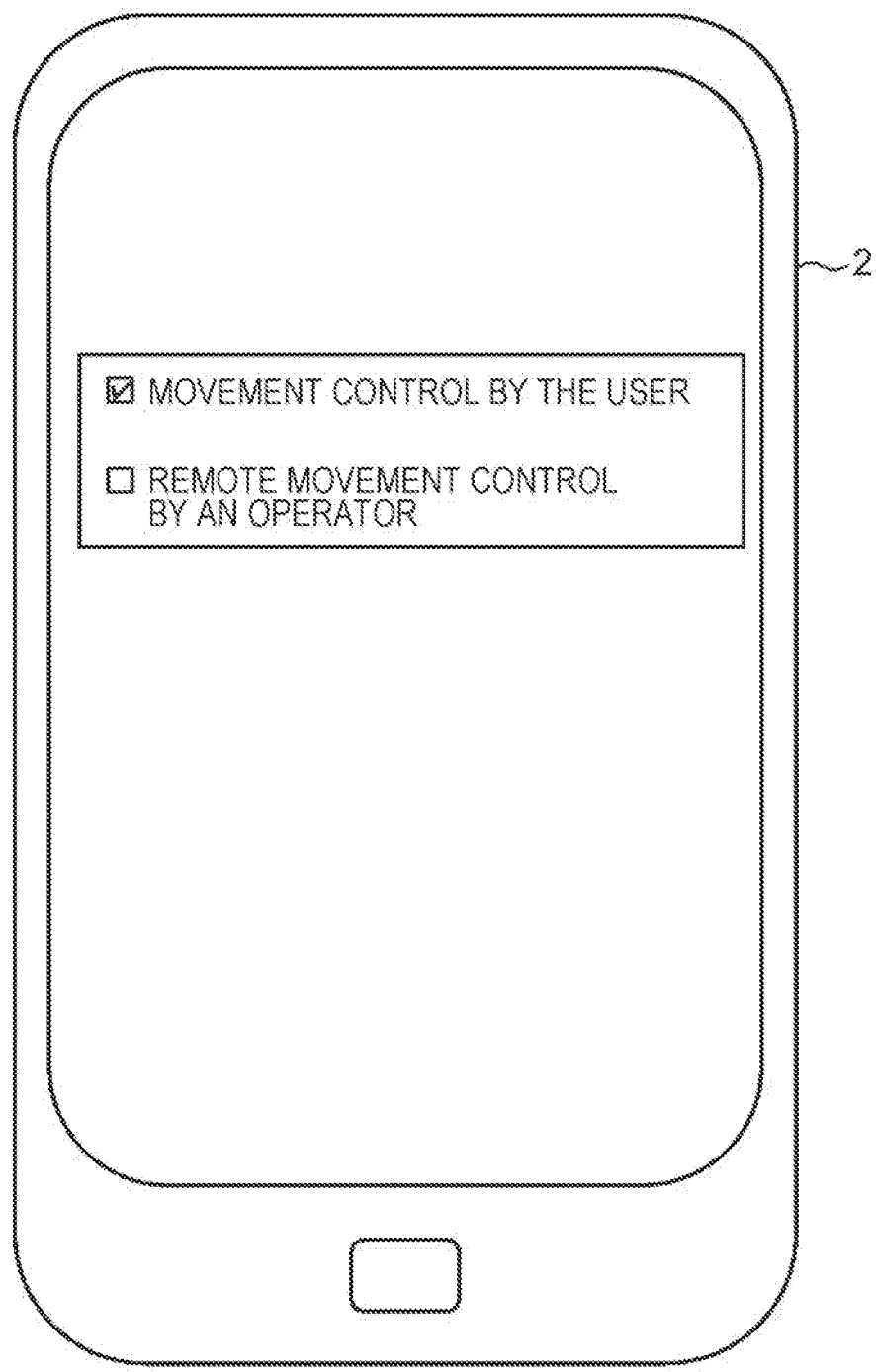
FIG. 38 is a drawing depicting an example of a selection screen displayed on a user terminal in embodiment 6.

FIG. 38 is a drawing depicting an example of a selection screen displayed on the user terminal in the present embodiment 6.

The user terminal 2, upon receiving the selection request information, accepts the selection performed by the user for whether the control right for the delivery vehicle 3 is to be assigned to the user or whether the vehicle operator 6 who is in a remote location is to be made to remotely operate the delivery vehicle 3. The user selects on the selection screen whether the control right for the delivery vehicle 3 is to be assigned to the user or whether the vehicle operator 6 who is in a remote location is to be made to remotely operate the delivery vehicle 3. The user terminal 2 transmits the result of the selection performed by the user to the management device 1E. The management device 1E selects whether the control right for the delivery vehicle 3 is to be assigned to the user or whether the vehicle operator 6 who is in a remote location is to be made to remotely operate the delivery vehicle 3, in accordance with the received selection result.

Furthermore, the vehicle operator 6 who is in a remote location may always be made to remotely operate the delivery vehicle 3, at the time at which the delivery vehicle 3 has arrived at the dispatch destination. In this case, the delivery vehicle 3 acquires vehicle location information indicating the present location of the delivery vehicle 3, and determines whether or not a first travel mode switching condition is satisfied, that is, whether or not the present location of the delivery vehicle 3 is the location of the dispatch destination. When movement in an autonomous travel mode is started, the delivery vehicle 3 determines whether or not the first travel mode switching condition, which is stored in the storage unit 33, is satisfied. In the present description, the first travel mode switching condition is the condition that the travel mode is to be switched from the autonomous travel mode to a remote operation mode in a case where the present location of the delivery vehicle 3 is the location of the dispatch destination. In a case where it has been determined that the first travel mode switching condition is not satisfied, in other words, in a case where it has been determined that the present location of the delivery vehicle 3 is not the location of the dispatch destination, the delivery vehicle 3 acquires vehicle location information of the delivery vehicle 3. However, in a case where it has been determined that the first travel mode switching condition is satisfied, in other words, in a case where it has been determined that the present location of the delivery vehicle 3 is the location of the dispatch destination, the delivery vehicle 3 switches the travel mode from the autonomous travel mode to the remote operation mode. Next, the delivery vehicle 3 controls the travel of the delivery vehicle 3 in the remote operation mode in accordance with travel instruction information received from the remote operation device 5.

It should be noted that the first travel mode switching condition may include the condition that a required distance from the present location of the delivery vehicle 3 to the location of the dispatch destination is to be shorter than a predetermined threshold value, or the condition that a required time from the present location of the delivery vehicle 3 to the location of the dispatch destination is to be shorter than a predetermined threshold value.

After the travel mode has been switched from the autonomous travel mode to the remote operation mode, the delivery vehicle 3 periodically acquires vehicle state information relating to the vehicle main body such as the vehicle speed and steering angle of the delivery vehicle 3, vehicle location information indicating the present location of the delivery vehicle 3, and peripheral environment information obtained by capturing the peripheral environment of the delivery vehicle 3. The delivery vehicle 3 transmits the vehicle state information, the vehicle location information, and the peripheral environment information to the remote operation device 5.

In a period in which the remote operation mode is in effect, the vehicle operator 6 is constantly checking the vehicle state information, the vehicle location information, and the peripheral environment information, but it should be noted that this does not mean that the vehicle operator 6 is constantly carrying out remote operation commands. The vehicle operator 6 carries out remote operation commands when it is determined that it is necessary to do so, and therefore it is not the case that remote operation commands are being constantly transmitted from the remote operation device 5 to the delivery vehicle 3.

Next, the delivery vehicle 3 acquires task state information. The task state information is information indicating whether or not loading of a delivery object onto the delivery vehicle 3 has been completed, for example. Next, the delivery vehicle 3 determines whether or not the state of a predetermined task satisfies a second travel mode switching condition, that is, whether or not loading of a delivery object onto the delivery vehicle 3 has been completed. In a period in which the delivery vehicle 3 is controlled in the remote operation mode, the delivery vehicle 3 determines whether or not the state of a task indicated by the task state information satisfies the second travel mode switching condition, which is stored in the storage unit 33. In the present description, the second travel mode switching condition is the condition that the travel mode is to be switched from the remote operation mode to the autonomous travel mode in a case where loading of a delivery object onto the delivery vehicle 3 has been completed.

It should be noted that the second travel mode switching condition may be the condition that the unloading of a delivery object from the delivery vehicle 3 is to have been completed. Furthermore, the second travel mode switching condition may be the condition that the boarding of a user onto the delivery vehicle 3 is to have been completed. In addition, the second travel mode switching condition may be the condition that the alighting of a user from the delivery vehicle 3 is to have been completed.

In a case where it has been determined that the state of the predetermined task does not satisfy the second travel mode switching condition, in other words, in a case where it has been determined that the loading of the delivery object onto the delivery vehicle 3 has not been completed, the delivery vehicle 3 controls the travel of the delivery vehicle 3 in the remote operation mode in accordance with travel instruction information from the remote operation device 5. However, in a case where it has been determined that the state of the predetermined task satisfies the second travel mode switching condition, in other words, in a case where it has been determined that the loading of the delivery object onto the delivery vehicle 3 has been completed, the delivery vehicle 3 switches the travel mode from the remote operation mode to the autonomous travel mode. Then, when the travel mode is switched from the remote operation mode to the autonomous travel mode, the delivery vehicle 3 decides the next stopping location and starts moving in the autonomous travel mode toward the next stopping location.

In this way, at the point in time at which the delivery vehicle 3 has arrived at the dispatch destination, the vehicle operator 6 is able to confirm whether the stopping location of the delivery vehicle 3 is a place that is inconvenient for the user, and is able to immediately cause the delivery vehicle 3 to move in a case where the stopping location of the delivery vehicle 3 is a place that is inconvenient for the user.

Furthermore, as mentioned above, at the time at which the delivery vehicle 3 has arrived at the dispatch destination, ordinarily, the burden for the vehicle operator 6 increases in a case where the vehicle operator 6 is made to remotely operate the delivery vehicle 3. Thus, at the time at which the delivery vehicle 3 has arrived at the dispatch destination, the delivery vehicle 3 may determine whether or not a user to which a control right has been set is present at the dispatch destination. The delivery vehicle 3 may then cancel the remote operation of the delivery vehicle 3 by the vehicle operator 6 in a case where it has been determined that a user to which a control right has been set is present at the dispatch destination, or may cause the vehicle operator 6 to remotely operate the delivery vehicle 3 in a case where it has been determined that a user to which a control right has been set is not present at the dispatch destination.

In this way, in a case where a user is present in the vicinity of the delivery vehicle 3 at the point in time at which the delivery vehicle 3 has arrived at the dispatch destination, the user is able to confirm whether the stopping location of the delivery vehicle 3 is a place that is inconvenient for the user, and therefore it is not necessary for the vehicle operator 6 to always monitor the delivery vehicle 3, and the burden for the vehicle operator 6 can be reduced.

Following on, the remote control performed by the remote operation device 5 in the remote operation mode will be described in detail.

In the remote operation mode, images captured by the delivery vehicle 3 are presented to at least the vehicle operator 6 in such a way that the vehicle operator 6 is able to carry out a remote operation immediately. The vehicle operator 6 remotely operates the delivery vehicle 3 while viewing the images captured by the delivery vehicle 3. It should be noted that it is preferable for images of the periphery of the delivery vehicle 3, which are required at the time of a remote operation, to be presented to the vehicle operator 6 in order for driving to be carried out safely. Furthermore, the remote operation device 5 may output speech and present road sign information regarding the location of the dispatch destination, not only images. The road sign information indicates matters that are prohibited, regulated, or restricted on the road at the dispatch destination, for example.

Figure 39:
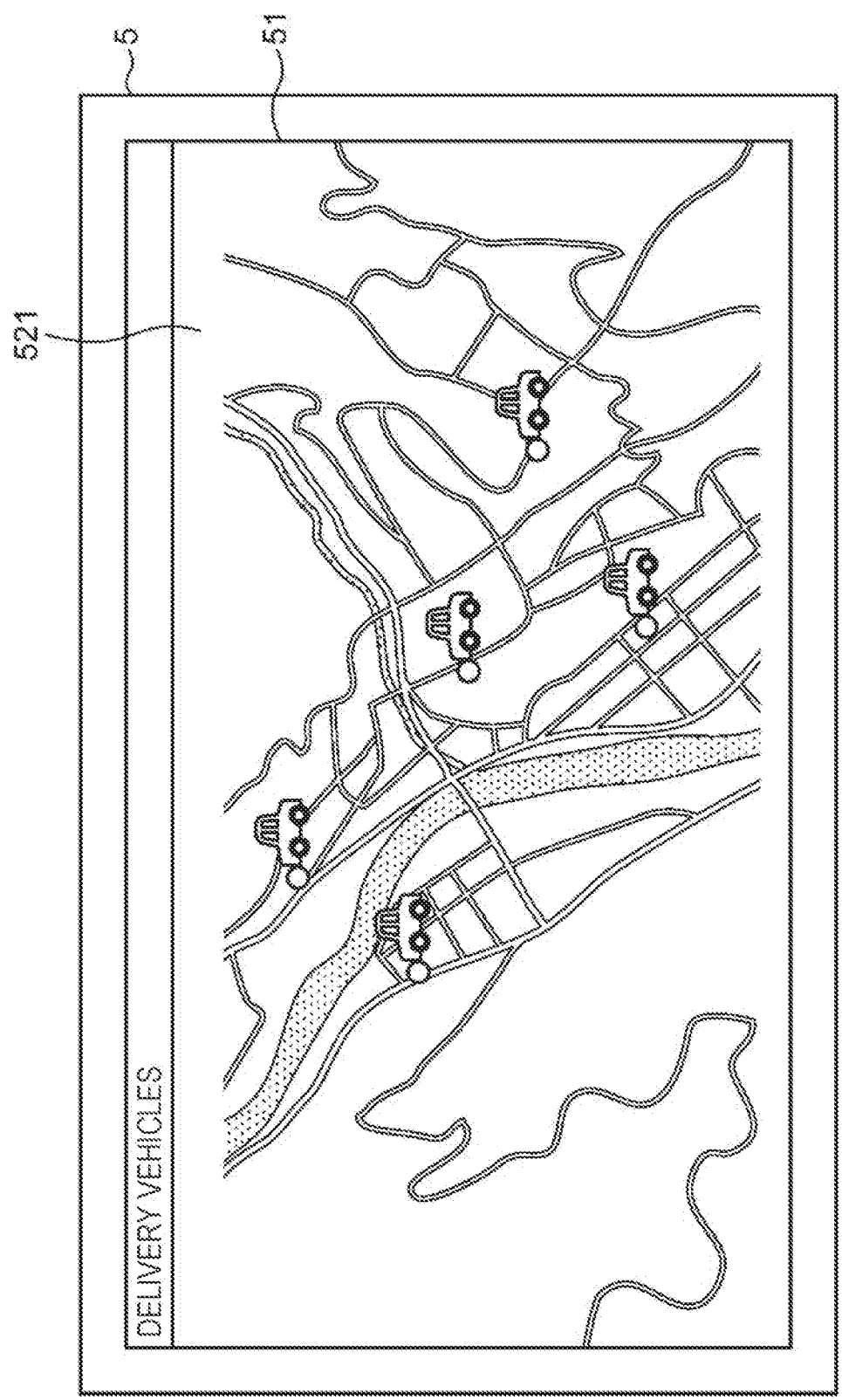
FIG. 39 is a drawing depicting a first example of a vehicle monitoring screen displayed on a remote operation device.

FIG. 39 is a drawing depicting a first example of a vehicle monitoring screen displayed on a remote operation device.

A display unit 51 of the remote operation device 5 displays a vehicle monitoring screen for the vehicle operator 6 to monitor delivery vehicles. The vehicle monitoring screen includes a map image 521. The present locations of a plurality of delivery vehicles are displayed on the map image 521. In FIG. 39, five delivery vehicles are moving, and the remote operation device 5 receives location information periodically from each delivery vehicle, and displays icons indicating each delivery vehicle at locations on the map image corresponding to the present location of each delivery vehicle. The vehicle operator 6 monitors the dispatch status of the plurality of delivery vehicles by means of the vehicle monitoring screen.

Figure 40:
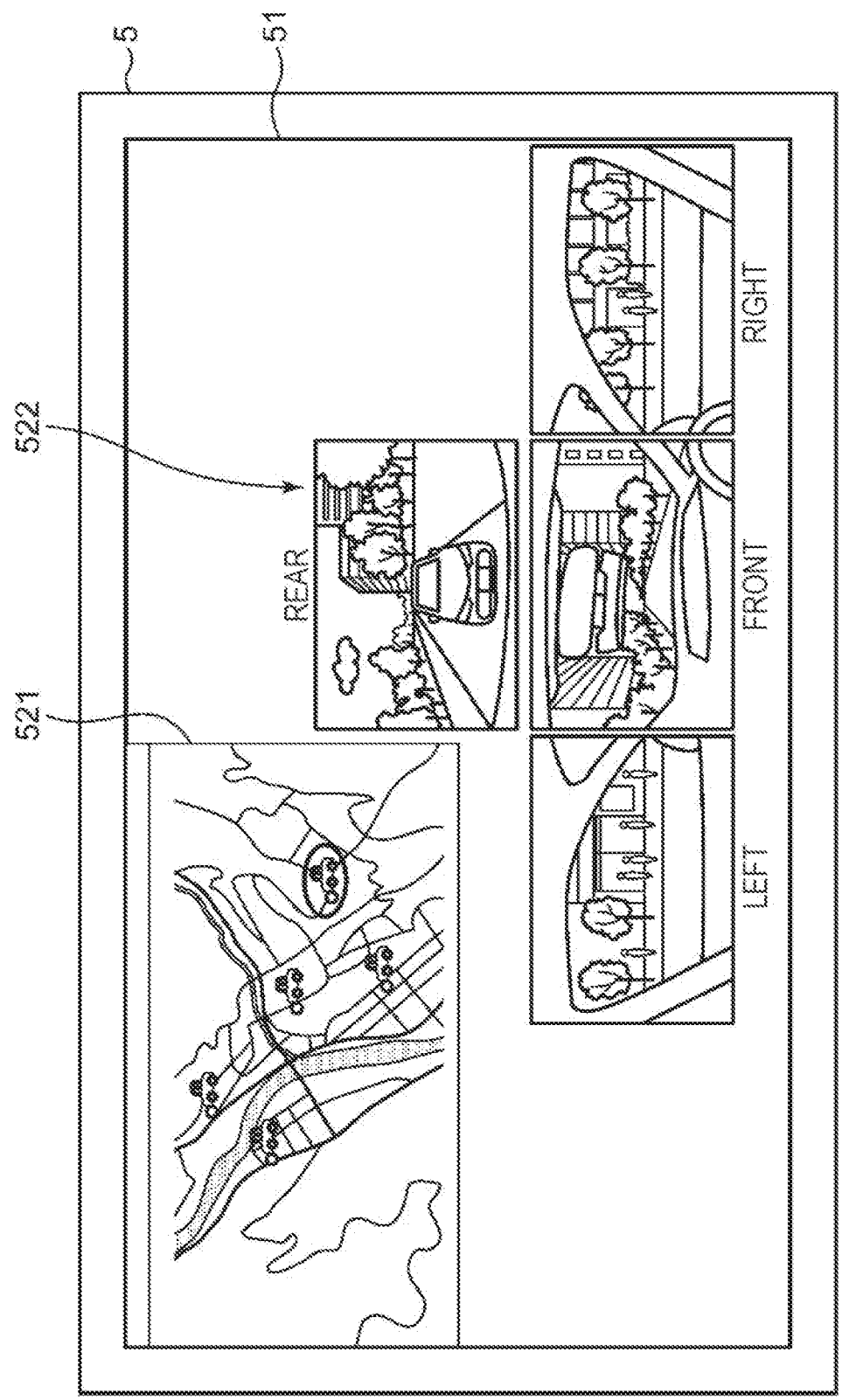
FIG. 40 is a drawing depicting a first example of a remote operation screen displayed on the remote operation device.

FIG. 40 is a drawing depicting a first example of a remote operation screen displayed on the remote operation device.

The display unit 51 of the remote operation device 5 displays a remote operation screen for the vehicle operator 6 to remotely operate a delivery vehicle, at a timing at which the delivery vehicle has arrived at the dispatch destination and remote operation by the vehicle operator 6 has become possible. The remote operation screen includes the map image 521 and camera images 522. On the map image 521, the present locations of a plurality of delivery vehicles are displayed, and a delivery vehicle that has arrived at a dispatch destination is displayed in a visible manner. In FIG. 40, a border that encloses an icon indicating a delivery vehicle that has arrived at a dispatch destination is displayed in a predetermined color. The camera images 522 include images in which the regions at the front, rear, right, and left of the delivery vehicle that has arrived at the dispatch destination have been captured in real time. The remote operation device 5 receives camera images transmitted by the delivery vehicle that has arrived at the dispatch destination, and displays the received camera images. The vehicle operator 6 remotely operates the delivery vehicle while viewing the camera images 522.

In the present embodiment, when a delivery vehicle has arrived at the dispatch destination, the camera images 522 of the delivery vehicle that has arrived are automatically displayed; however, it should be noted that the present disclosure is not particularly restricted thereto, and a delivery vehicle to be remotely controlled by the vehicle operator 6 may be selected from the map image 521, and the camera images 522 of the selected delivery vehicle may be displayed. Furthermore, the map image 521 is displayed on the remote operation screen depicted in FIG. 40; however, only the camera images 522 may be displayed. Furthermore, the management device 1E may notify the remote operation device 5 of the delivery vehicle that has arrived at the dispatch destination, and the remote operation device 5 may display the camera images 522 as a result of the vehicle operator 6 selecting the delivery vehicle with regard to which notification has been provided.

In addition, the remote operation device 5 displays the map image 521 and the camera images 522 at the same time in order for delivery vehicles to be remotely monitored and delivery vehicles to be remotely operated; however, in a case where a remote monitoring device for remotely monitoring delivery vehicles and a remote operation device for remotely operating delivery vehicles are arranged separately, the remote monitoring device may display the map image 521 and the remote operation device may display the camera images 522.

Figure 41:
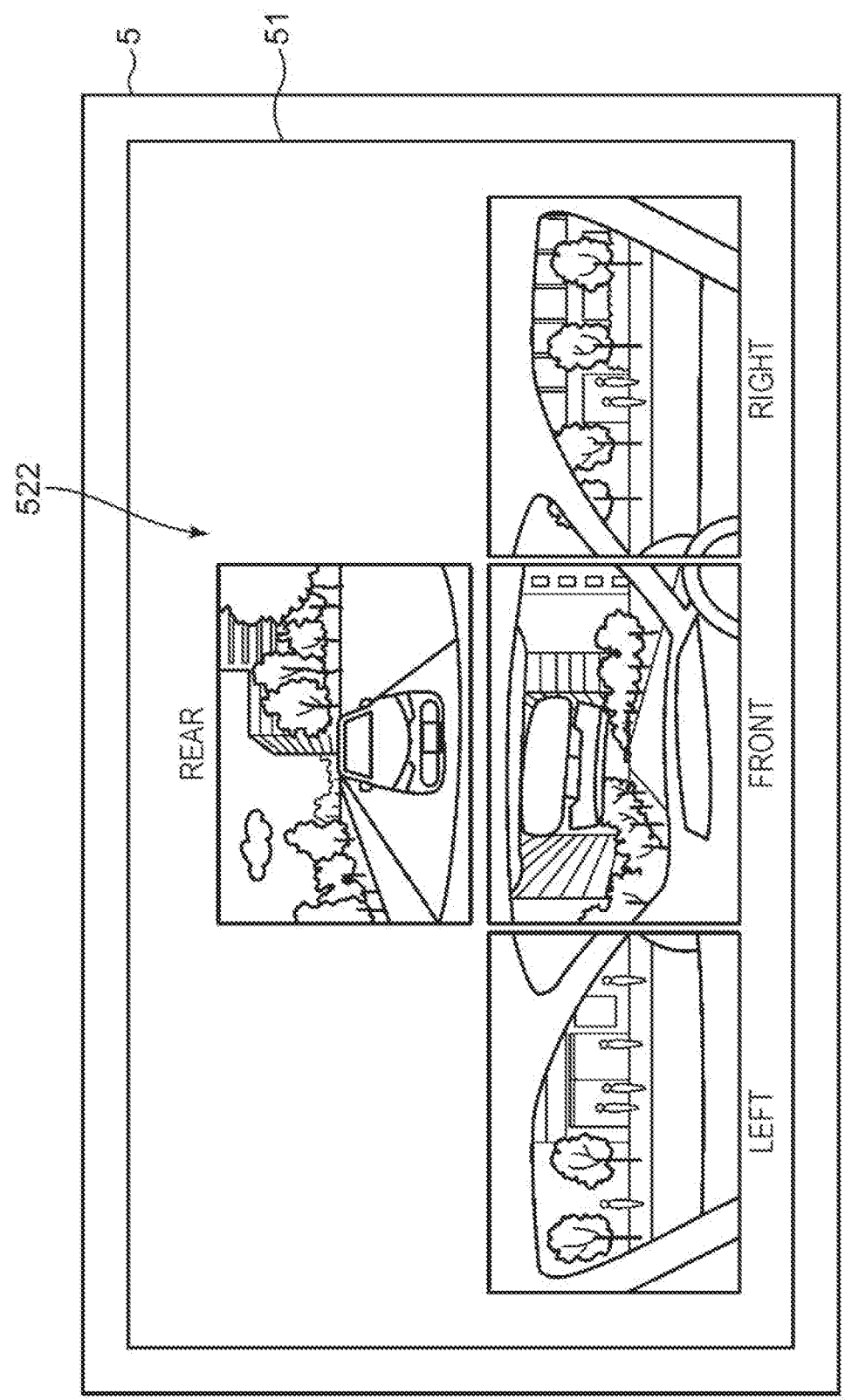
FIG. 41 is a drawing depicting a second example of a remote operation screen displayed on the remote operation device.

FIG. 41 is a drawing depicting a second example of a remote operation screen displayed on the remote operation device.

The remote operation device 5 depicted in FIG. 41 displays only the remote operation screen and does not display the vehicle monitoring screen. The remote operation screen includes the camera images 522. The camera images 522 include images in which the regions at the front, rear, right, and left of the delivery vehicle that has arrived at the dispatch destination have been captured in real time. The remote operation device 5 receives camera images transmitted by the delivery vehicle that has arrived at the dispatch destination, and displays the received camera images. The vehicle operator 6 remotely operates the delivery vehicle while viewing the camera images 522.

It should be noted that the vehicle control system may be provided with a plurality of remote operation devices. In a case where a delivery vehicle has arrived at a dispatch destination, images in which the regions at the front, rear, right, and left of the delivery vehicle that has arrived at the dispatch destination have been captured in real time are displayed on a remote operation device that is not being used from among the plurality of remote operation devices. Furthermore, in a case where the plurality of remote operation devices have been allocated respectively to a plurality of delivery vehicles, images in which the regions at the front, rear, right, and left of a delivery vehicle that has arrived at a dispatch destination have been captured in real time may be displayed on the remote operation device that is allocated to the delivery vehicle that has arrived at the dispatch destination.

Figure 42:
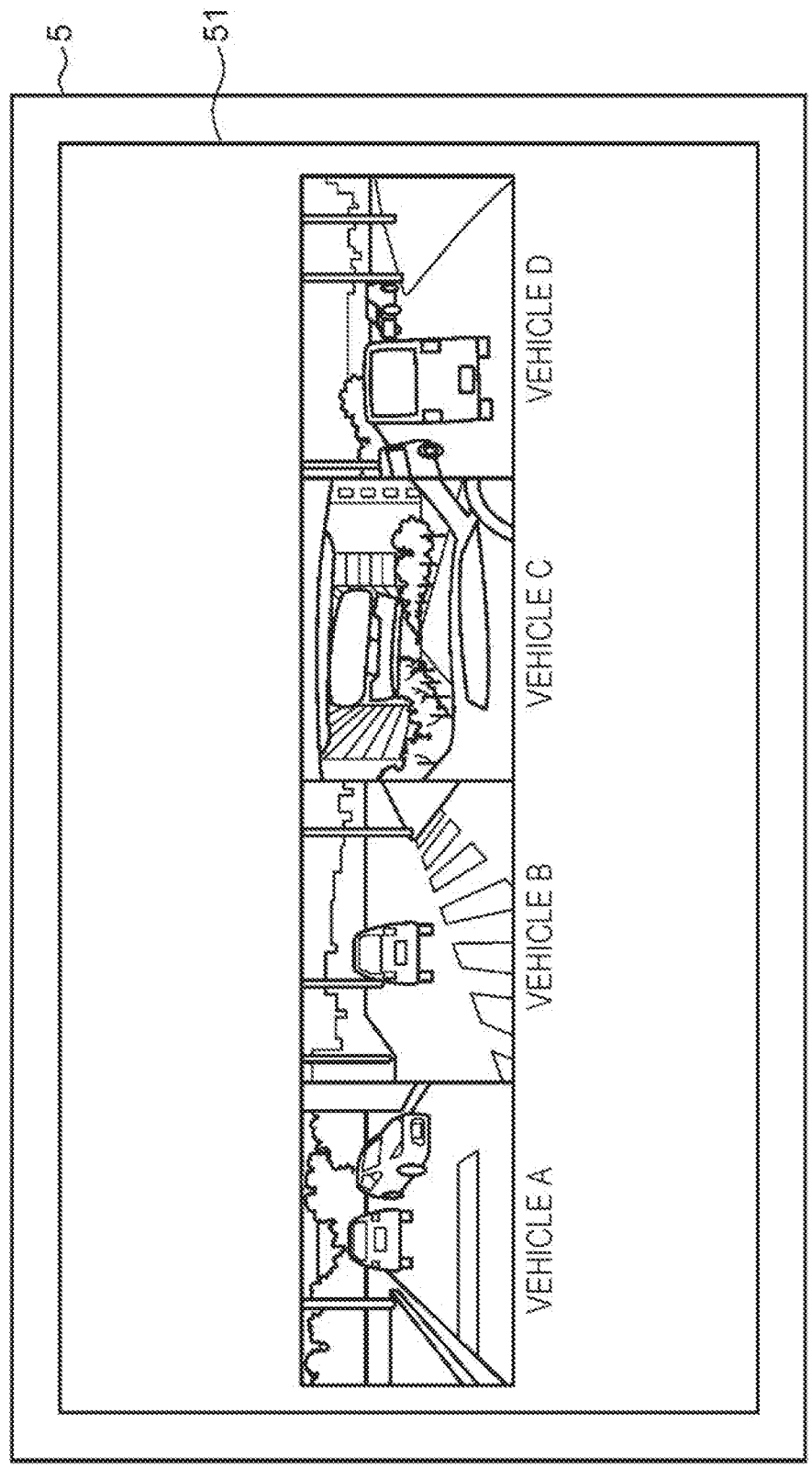
FIG. 42 is a drawing depicting a second example of a vehicle monitoring screen displayed on the remote operation device.

FIG. 42 is a drawing depicting a second example of a vehicle monitoring screen displayed on a remote operation device.

The display unit 51 of the remote operation device 5 displays a vehicle monitoring screen for the vehicle operator 6 to monitor delivery vehicles. The vehicle monitoring screen includes a plurality of camera images. The plurality of camera images are images in which the region at the front of each of the plurality of delivery vehicles has been captured. In FIG. 42, four delivery vehicles are moving, and the remote operation device 5 receives camera images in which only the region at the front has been captured, periodically from each delivery vehicle, and displays the received camera images. The vehicle operator 6 monitors the dispatch status of the plurality of delivery vehicles by means of the vehicle monitoring screen.

In FIG. 42, the remote operation device 5 displays camera images in which only the region at the front of each delivery vehicle has been captured; however, it should be noted that the present disclosure is not particularly restricted thereto, and camera images in which another direction of each delivery vehicle has been captured may be displayed, or camera images in which all directions of each delivery vehicle have been captured may be displayed. Furthermore, in order to reduce the amount of data, the remote operation device 5 may receive and display camera images having a reduced resolution.

Figure 43:
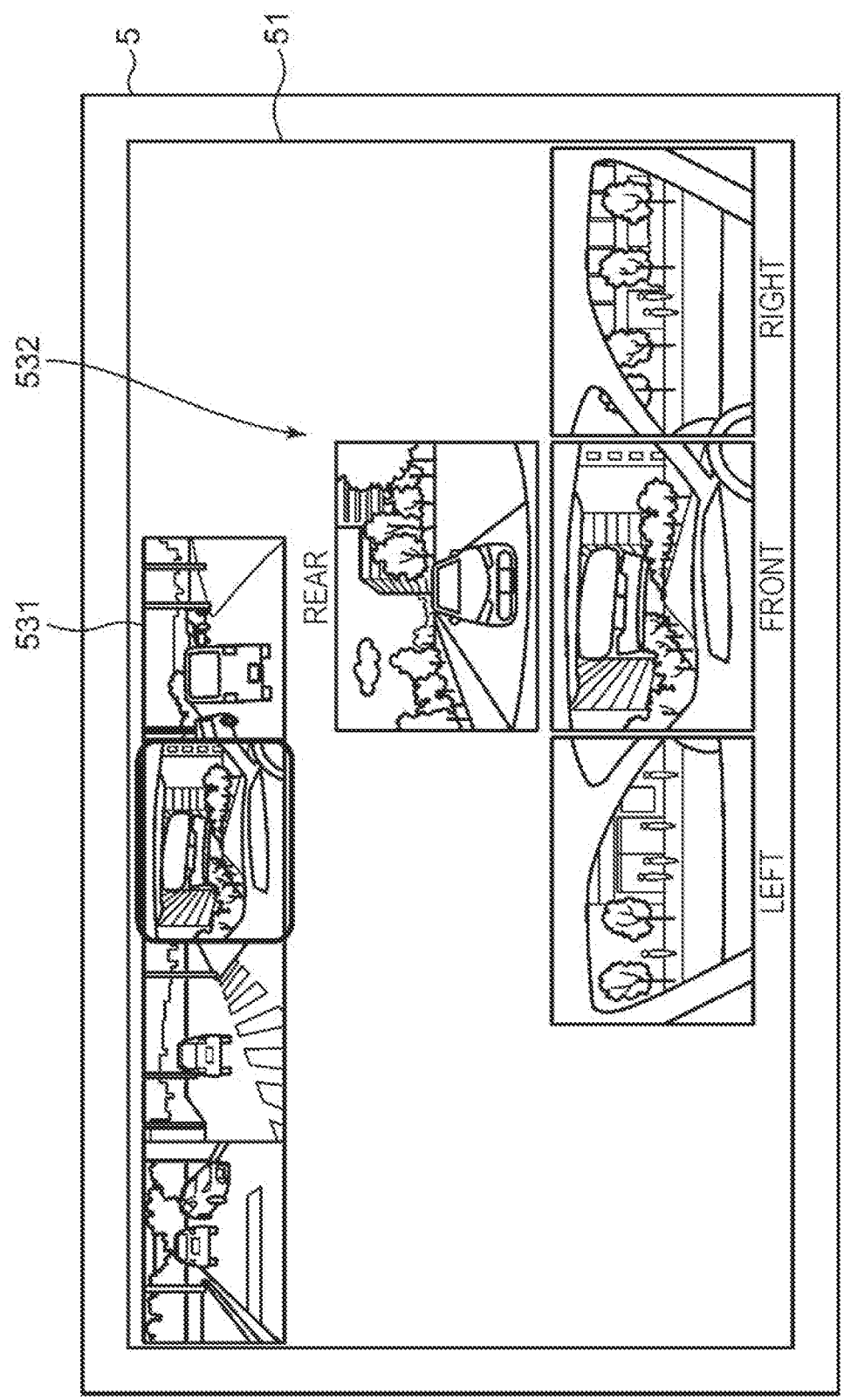
FIG. 43 is a drawing depicting a third example of a remote operation screen displayed on the remote operation device.

FIG. 43 is a drawing depicting a third example of a remote operation screen displayed on the remote operation device.

The display unit 51 of the remote operation device 5 displays a remote operation screen for the vehicle operator 6 to remotely operate a delivery vehicle, at a timing at which the delivery vehicle has arrived at the dispatch destination and remote operation by the vehicle operator 6 has become possible. The remote operation screen includes first camera images 531 and second camera images 532. The first camera images 531 include a plurality of camera images in which the region at the front of each of a plurality of delivery vehicles has been captured, in which a camera image of a delivery vehicle that has arrived at a dispatch destination is displayed in a visible manner. In FIG. 43, a border that encloses a camera image of a delivery vehicle that has arrived at a dispatch destination is displayed in a predetermined color.

The second camera images 532 include images in which the regions at the front, rear, right, and left of the delivery vehicle that has arrived at the dispatch destination have been captured in real time. Not only a camera image in which the region at the front has been captured but also camera images in which the regions at the rear, right, and left have been captured are transmitted from the delivery vehicle that has arrived at the dispatch destination. The remote operation device 5 receives camera images transmitted by the delivery vehicle that has arrived at the dispatch destination, and displays the received camera images. The vehicle operator 6 remotely operates the delivery vehicle while viewing the second camera images 532.

Figure 44:
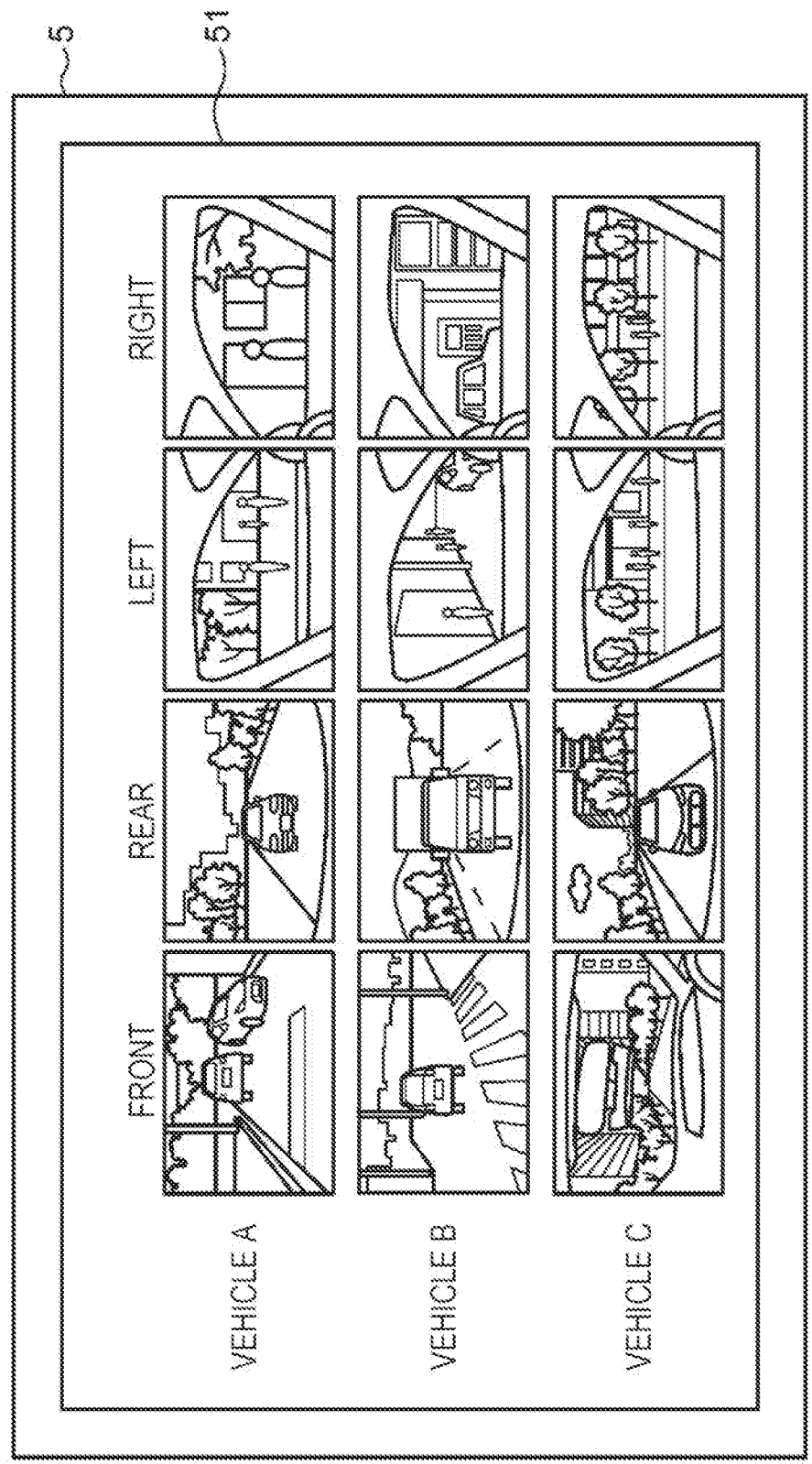
FIG. 44 is a drawing depicting a third example of a vehicle monitoring screen displayed on the remote operation device.

FIG. 44 is a drawing depicting a third example of a vehicle monitoring screen displayed on a remote operation device.

The display unit 51 of the remote operation device 5 displays a vehicle monitoring screen for the vehicle operator 6 to monitor delivery vehicles. The vehicle monitoring screen includes a plurality of camera images. The plurality of camera images are images in which the regions at the front, rear, right, and left of each of a plurality of delivery vehicles have been captured. In FIG. 44, three delivery vehicles are moving, and the remote operation device 5 receives camera images in which the regions at the front, rear, right, and left have been captured, periodically from each delivery vehicle, and displays the received camera images. The vehicle operator 6 monitors the dispatch status of the plurality of delivery vehicles by means of the vehicle monitoring screen.

Figure 45:
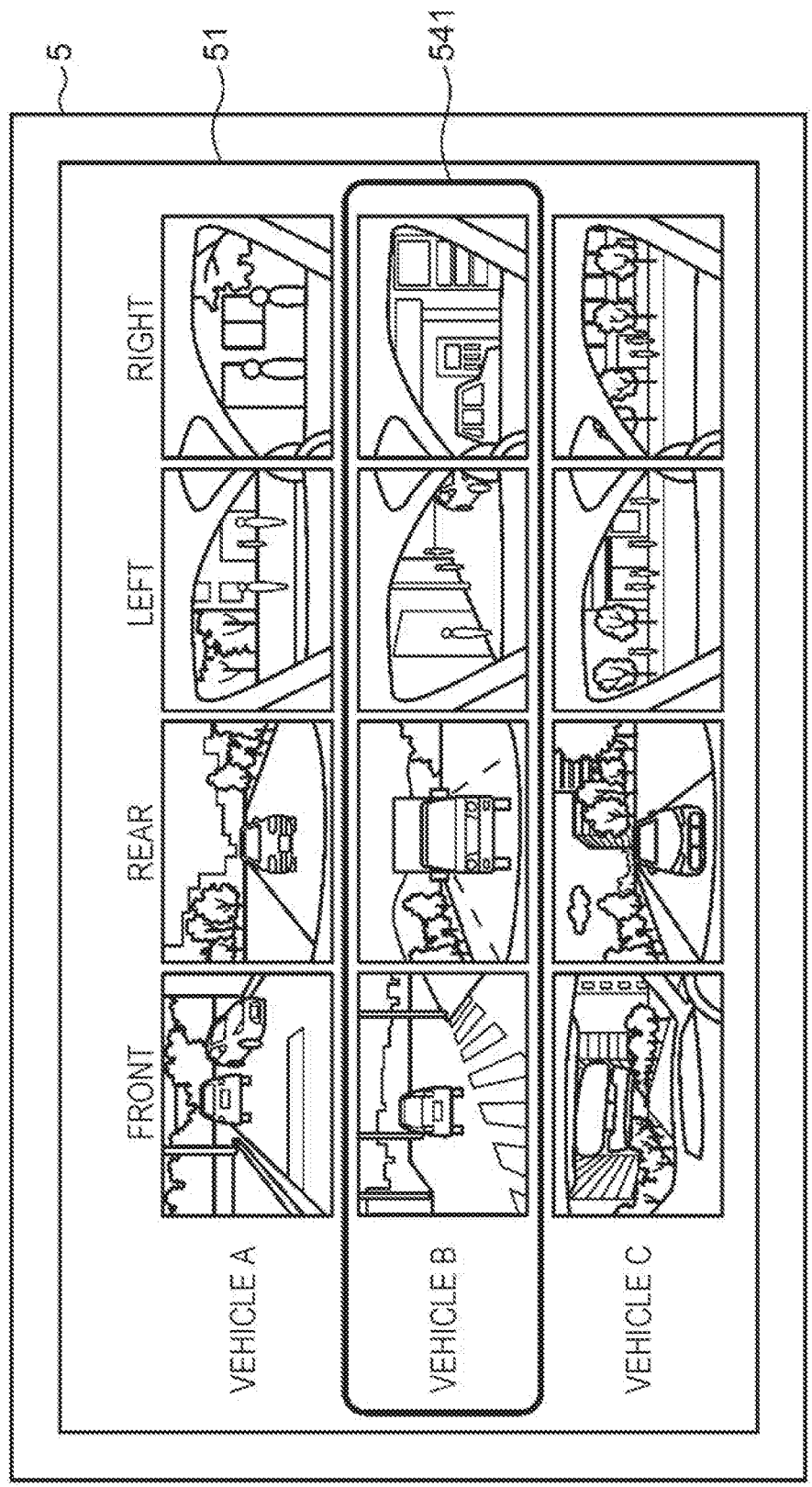
FIG. 45 is a drawing depicting a fourth example of a remote operation screen displayed on the remote operation device.

FIG. 45 is a drawing depicting a fourth example of a remote operation screen displayed on the remote operation device.

The display unit 51 of the remote operation device 5 displays a remote operation screen for the vehicle operator 6 to remotely operate a delivery vehicle, at a timing at which the delivery vehicle has arrived at the dispatch destination and remote operation by the vehicle operator 6 has become possible. The remote operation screen depicted in FIG. 45 is the same as the vehicle monitoring screen depicted in FIG. 44. In FIG. 45, a border 541 that encloses camera images of a delivery vehicle that has arrived at a dispatch destination is displayed in a predetermined color. The vehicle operator 6 remotely operates the delivery vehicle while viewing the camera images.

It should be noted that the remote operation device 5 may switch from the remote operation screens depicted in FIGS. 40, 43, and 45 to the vehicle monitoring screens depicted in FIGS. 39, 42, and 44 at the point in time at which the task at the dispatch destination has been completed. A task in a delivery service represents a package being loaded or a package being unloaded, and a task in a taxi service represents a user boarding or a user alighting.

Furthermore, in the present embodiment 6, in a case where movement control of the delivery vehicle 3 has been carried out a predetermined number of times or more by a user, the delivery vehicle 3 may notify the remote operation device 5 that movement control of the delivery vehicle 3 has been carried out a predetermined number of times or more by the user. In a case where a user has carried out movement control a predetermined number of times, the user is considered to have not carried out movement control in a suitable manner. Thus, in such a case, the movement control of the delivery vehicle 3 may be supported by the vehicle operator 6 remotely controlling the delivery vehicle 3. The delivery vehicle 3 stores a history of the movement control of the delivery vehicle 3 carried out by the user. The delivery vehicle 3 determines whether or not movement control of the delivery vehicle 3 has been carried out a predetermined number of times or more by the user, on the basis of the movement control history. In a case where it has been determined that movement control of the delivery vehicle 3 has been carried out a predetermined number of times or more by the user, the delivery vehicle 3 notifies the remote operation device 5 that movement control of the delivery vehicle 3 has been carried out a predetermined number of times or more by the user. The remote operation device 5, having received the notification, queries the user terminal 2 as to whether or not support for movement control of the delivery vehicle 3 is desired. In a case where a response indicating that support for movement control is desired has been received from the user terminal 2, the remote operation device 5 accepts remote operation of the delivery vehicle 3 performed by the vehicle operator 6.

In the aforementioned example, the delivery vehicle 3 notifies the remote operation device 5 that movement control of the delivery vehicle 3 has been carried out a predetermined number of times or more by the user; however, it should be noted that the present disclosure is not particularly restricted thereto, and the user terminal 2 may notify the remote operation device 5 that movement control of the delivery vehicle 3 has been carried out a predetermined number of times or more by the user, in a case where movement control of the delivery vehicle 3 performed by the user has been carried out a predetermined number of times or more. The user terminal 2 stores a history of the movement control of the delivery vehicle 3 performed by the user. The user terminal 2 determines whether or not movement control of the delivery vehicle 3 has been carried out a predetermined number of times or more by the user, on the basis of the movement control history. In a case where it has been determined that movement control of the delivery vehicle 3 has been carried out a predetermined number of times or more by the user, the user terminal 2 notifies the remote operation device 5 that movement control of the delivery vehicle 3 has been carried out a predetermined number of times or more by the user.

It should be noted that a configuration may be adopted in which the management device 1 or the remote operation device 5 acquires movement control history of the delivery vehicle 3 or the user terminal 2, and the management device 1 or the remote operation device 5 determines whether or not movement control has been carried out a predetermined number of times or more. The management device 1, when having acquired movement control history of the delivery vehicle 3 or the user terminal 2 and determined that movement control has been carried out a predetermined number of times or more, notifies the remote operation device 5 that movement control has been carried out a predetermined number of times or more.

Furthermore, the vehicle control system may be provided with the management device 1E, the user terminal 2, the delivery vehicle 3, and a remote monitoring device (not depicted). The remote monitoring device is operated by a monitoring operator (not depicted). The delivery vehicle 3 transmits, to the remote monitoring device, movement control information indicating movement control of the delivery vehicle 3 carried out by the user terminal 2. The remote monitoring device receives the movement control information transmitted by the delivery vehicle 3. The remote monitoring device displays the information on the movement control of the delivery vehicle 3 carried out by the user terminal 2. The monitoring operator is thereby able to monitor the movement control of the delivery vehicle 3 carried out by the user terminal 2. The monitoring operator is then able to know that control which is different from the original purpose is being carried out such as the delivery vehicle 3 being made to move a long distance, for example, or that suitable control is not being carried out such as the delivery vehicle 3 being made to move a plurality of times, for example.

Figure 46:
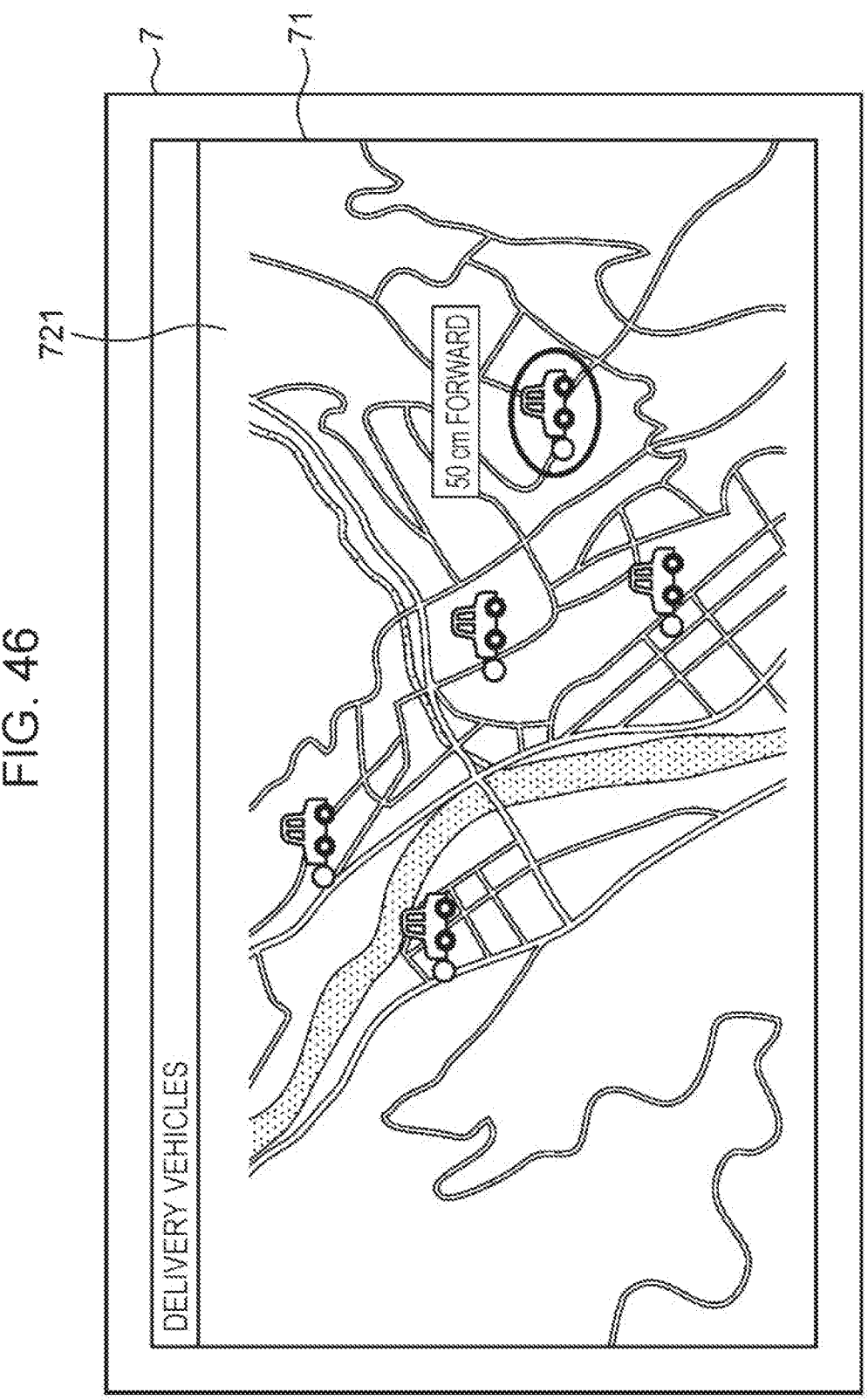
FIG. 46 is a drawing depicting an example of a vehicle monitoring screen displayed on the remote monitoring device.

FIG. 46 is a drawing depicting an example of a vehicle monitoring screen displayed on the remote monitoring device.

A display unit 71 of a remote monitoring device 7 displays a vehicle monitoring screen for the monitoring operator to monitor delivery vehicles. The vehicle monitoring screen includes a map image 721. The present locations of a plurality of delivery vehicles are displayed on the map image 721. In FIG. 46, five delivery vehicles are moving, and the remote monitoring device 7 receives location information periodically from each delivery vehicle, and displays icons indicating each delivery vehicle at locations on the map image 721 corresponding to the present location of each delivery vehicle. The monitoring operator monitors the dispatch status of the plurality of delivery vehicles by means of the vehicle monitoring screen.

The display unit 71 of the remote monitoring device 7 may display delivery vehicles the movements of which are being controlled by users, and delivery vehicles the movements of which are not being controlled by users, in mutually different modes. In FIG. 46, a delivery vehicle that has been made to move 50 centimeters to the front is displayed in a highlighted manner, a border that encloses an icon indicating a delivery vehicle the movement of which is being controlled is displayed in a predetermined color, and content of the movement control is displayed as additional information. The additional information includes a movement direction and a movement distance, for example. Furthermore, the additional information may include the number of times that movement control has been carried out, for example.

It should be noted that the display unit 71 may display icons indicating delivery vehicles the movements of which are being controlled by users, and icons indicating delivery vehicles the movements of which are not being controlled by users, in mutually different colors, shapes, transparencies, or modes. The monitoring operator is thereby able to comprehend which delivery vehicles are being controlled by users. Furthermore, by displaying what kind of movement control has been carried out, the monitoring operator is able to comprehend what kind of movement control has been carried out by a user. In addition, by displaying the number of times that movement control has been carried out, the monitoring operator is able to comprehend whether the user is carrying out movement control in a suitable manner.

Furthermore, the management device may associate and store, in the storage unit, user identification information for identifying a user or a user terminal that has carried out movement control which is different from the original purpose, and improper control information indicating that movement control which is different from the original purpose has been carried out, in a case where movement control which is different from the original purpose has been carried out. Then, when a control right is to be set, the control right setting unit determines whether or not improper control information is associated with user identification information for identifying a user at the dispatch destination. In a case where it has been determined that improper control information is not associated with user identification information for identifying the user at the dispatch destination, the control right setting unit sets a control right to the user identification information. However, in a case where it has been determined that improper control information is associated with user identification information for identifying the user at the dispatch destination, the control right setting unit does not set a control right to the user identification information.

Furthermore, in a case where movement control which is different from the original purpose has been carried out, the management device may notify the remote monitoring device 7 that movement control which is different from the original purpose has been carried out by the user and query whether or not a control right is to be set to the user. The remote monitoring device 7 accepts the selection performed by the monitoring operator as to whether or not a control right is to be set to the user who has carried out movement control which is different from the original purpose. The remote monitoring device 7 transmits, to the management device, the selection result as to whether or not a control right is to be set to the user who has carried out movement control which is different from the original purpose. The management device sets a control right on the basis of the selection result from the remote monitoring device 7. It should be noted that, in a case where a user to whom a control right has not been set is to cause a delivery vehicle to move at the dispatch destination, it is preferable for the user to issue a request for movement of the delivery vehicle to the remote monitoring device 7, and the delivery vehicle to be made to move by means of remote control carried out by the remote monitoring device 7.

Furthermore, control right information may include improper control information indicating that movement control which is different from the original purpose has been carried out. The delivery vehicle 3, in a case where improper control information is associated with the user identification information of the user at the delivery destination when having arrived at the delivery destination, notifies such to the remote monitoring device 7. The monitoring operator is thereby able to monitor the movement control carried out by the user. Furthermore, the user carries out movement control under the monitoring of the monitoring operator, and it is therefore possible to restrict the user carrying out movement control which is different from the original purpose. Furthermore, in this case, the user terminal 2 may display that movement control is being monitored by the monitoring operator. It is therefore possible to restrict the user carrying out movement control which is different from the original purpose.

In the present embodiment 5, the movement destination location information acquisition unit 127D of the management device 1D acquires movement destination location information indicating the location of a delivery destination from the delivery vehicle 3 which has moved in accordance with control instruction information, and associates and stores location information of a dispatch destination included in dispatch request information received from the user terminal 2 and the acquired movement destination location information, in the movement destination location information storage unit 138D; however, the present disclosure is not particularly restricted thereto, and, in a case where movement destination location information indicating the location of a movement destination has been acquired by the movement destination location information acquisition unit 127D from the delivery vehicle 3, the information transmission unit 126 may query the vehicle operator 6 as to whether or not location information of the dispatch destination and the movement destination location information are to be associated and stored.

Figure 47:
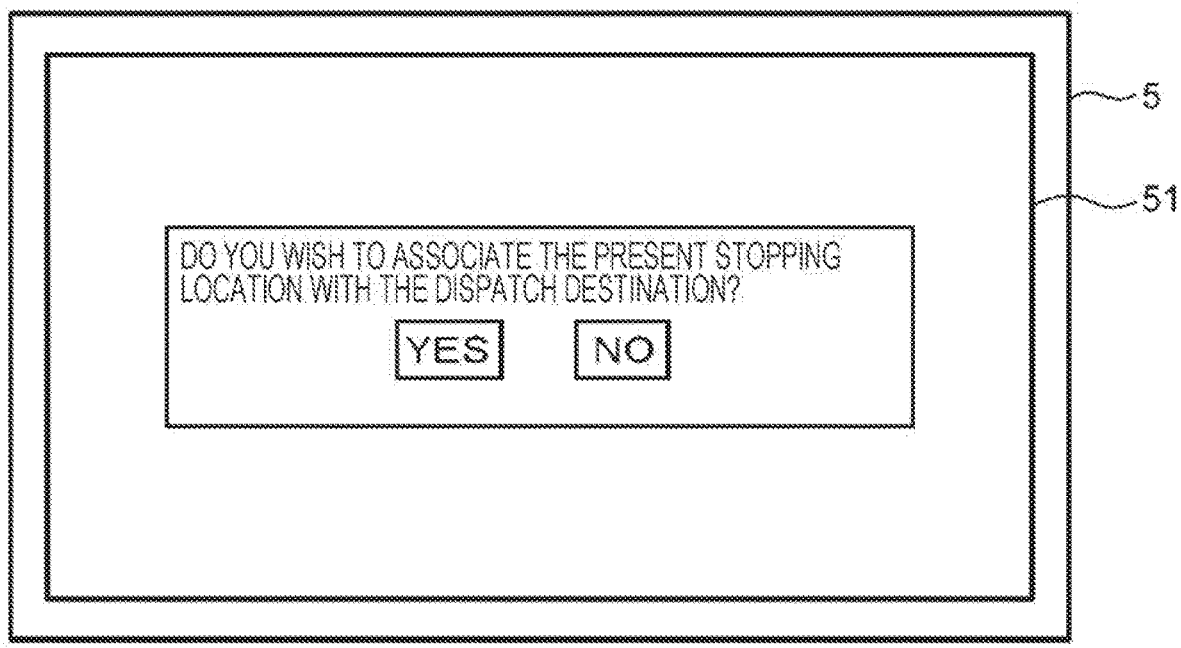
FIG. 47 is a drawing depicting an example of a query screen displayed on the remote operation device.

FIG. 47 is a drawing depicting an example of a query screen displayed on the remote operation device.

The management device 1D, when having acquired the movement destination location information, may transmit, to the remote operation device 5, a query as to whether the location information of the dispatch destination and the movement destination location information may be associated and stored in the movement destination location information storage unit 138D. The remote operation device 5 receives the query from the management device 1D, and accepts a response from the vehicle operator 6 as to whether or not the location information of the dispatch destination and the movement destination location information may be associated and stored in the movement destination location information storage unit 138D. At such time, the display unit 51 of the remote operation device 5 displays a query screen for querying the vehicle operator 6 as to whether or not the location information of the dispatch destination and the movement destination location information are to be associated and stored. The vehicle operator 6 selects whether or not the location information of the dispatch destination and the movement destination location information are to be associated and stored, on the query screen. The remote operation device 5 transmits, to the management device 1D, a response result as to whether or not the location information of the dispatch destination and the movement destination location information may be associated and stored in the movement destination location information storage unit 138D. When having received a positive response result for the query, the movement destination location information acquisition unit 127D of the management device 1D associates and stores the location information of the dispatch destination and the movement destination location information in the movement destination location information storage unit 138D. However, when having received a negative response result for the query, the movement destination location information acquisition unit 127D discards the acquired movement destination location information without associating and storing the location information of the dispatch destination and the movement destination location information in the movement destination location information storage unit 138D.

In the query screen depicted in FIG. 47, the vehicle operator 6 is queried as to whether or not the location information of the dispatch destination and the movement destination location information are to be associated and stored; however, it should be noted that, in addition, the vehicle operator 6 may be queried for the selection of information to be associated with the location information of the dispatch destination and the movement destination location information.

Figure 48:
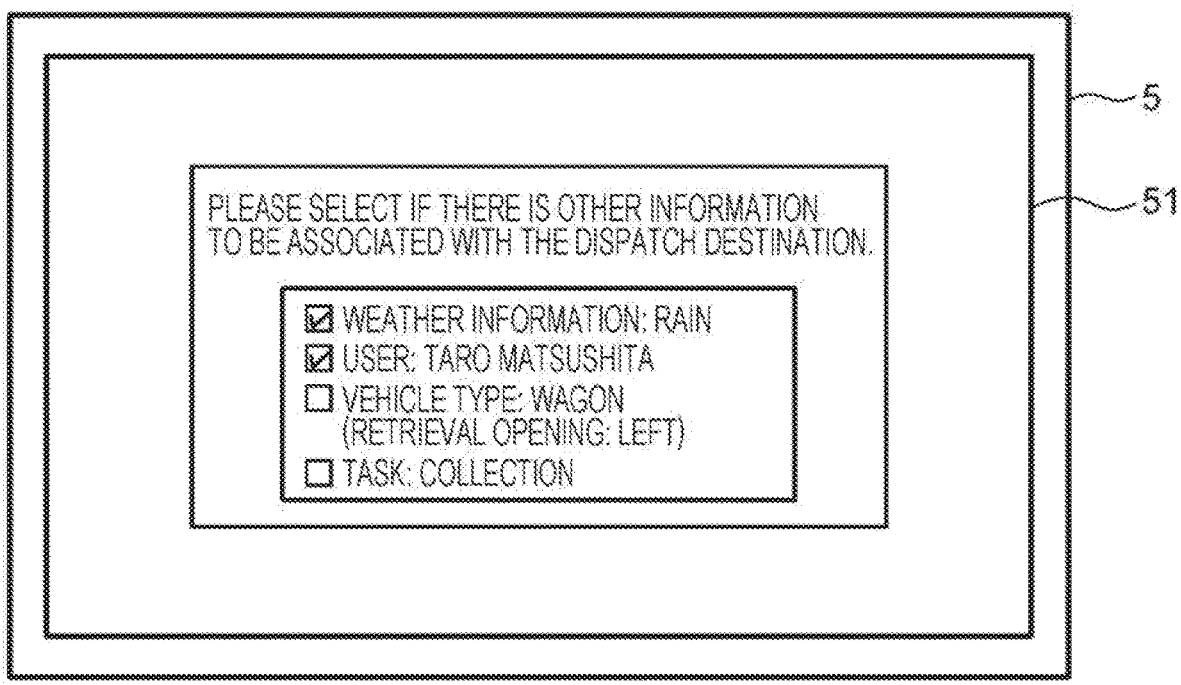
FIG. 48 is a drawing depicting an example of an information input screen displayed on the remote operation device.

FIG. 48 is a drawing depicting an example of an information input screen displayed on the remote operation device.

The display unit 51 of the remote operation device 5 displays an information input screen for accepting the input of information to be additionally associated and stored with respect to location information of the dispatch destination and movement destination location information. The vehicle operator 6 selects information to be additionally associated and stored with respect to the location information of the dispatch destination and the movement destination location information, on the information input screen. For example, in the information input screen depicted in FIG. 48, whether or not weather information, the name of the user, the vehicle type of the delivery vehicle, and the task are to be associated is displayed in a selectable manner. The remote operation device 5 transmits the information to be associated with the location information of the dispatch destination and the movement destination location information, to the management device 1D. The management device 1D associates and stores the location information of the dispatch destination, the movement destination location information, and the received information in the movement destination location information storage unit 138D.

Furthermore, in the aforementioned embodiment 5, in a case where the delivery vehicle has been additionally moved by the user even though the movement destination location information associated with the location information of the dispatch destination has been decided as a stopping location for the delivery vehicle 3, the vehicle operator 6 may be queried as to whether or not the location information of the dispatch destination and the movement destination location information are to be associated and stored. The location information of the dispatch destination and the movement destination location information can thereby be associated and stored in accordance with the judgment of the vehicle operator 6.

Hereinabove, the system of the present disclosure has been described on the basis of embodiments; however, the present disclosure is not restricted to these embodiments. Modes in which various modifications conceived by a person skilled in the art have been implemented in the present embodiments, and modes constructed by combining the constituent elements in different embodiments may also be included within the scope of the one or more aspects of the present disclosure provided they do not depart from the purpose of the present disclosure.

It should be noted that, in the aforementioned embodiments, the constituent elements may be configured by using dedicated hardware, or may be realized by executing a software program suitable for the constituent elements. The constituent elements may be realized by a program execution unit such as a CPU or a processor reading out and executing a software program recorded in a recording medium such as a hard disk or a semiconductor memory.

Some or all of the functions of the devices according to embodiments 1 to 6 of the present disclosure are typically realized as an LSI, which is an integrated circuit. These may be implemented separately as single chips, or may be implemented as a single chip in such a way as to include some or all of the functions. Furthermore, the circuit integration is not restricted to an LSI, and the functions may be realized using a dedicated circuit or a general-purpose processor. After an LSI is manufactured, a field-programmable gate array (FPGA) that can be programmed, or a reconfigurable processor with which the connections and settings of circuit cells within the LSI can be reconfigured, may be used.

Furthermore, some or all of the functions of the devices according to embodiments 1 to 6 of the present disclosure may be realized by a processor such as a CPU executing a program.

Furthermore, the numerals used hereinabove are all examples for describing the present disclosure in a specific manner, and the present disclosure is not limited to the numerals given as examples.

Furthermore, the order in which the steps depicted in the aforementioned flowcharts is executed is an exemplary order for describing the present disclosure in a specific manner, and may be an order other than the aforementioned provided a similar effect can be obtained. Furthermore, some of the steps may be executed at the same time as (in parallel with) other steps.

In addition, various modified examples obtained by implementing alterations that are within the scope and conceived by a person skilled in the art with respect to the embodiments of the present disclosure are also included in the present disclosure provided they do not depart from the purpose of the present disclosure.

The vehicle control right setting method, the vehicle control right setting device, the vehicle control right setting program, and the vehicle control method according to the present disclosure make it possible for a user of an autonomous vehicle to control the autonomous vehicle at a dispatch destination, and are useful as a vehicle control right setting method, a vehicle control right setting device, and a vehicle control right setting program for setting a control right for an autonomous vehicle, and a vehicle control method for controlling the autonomous vehicle.

SUMMARY OF THE PRESENT EMBODIMENTS

A method according to an aspect of the present disclosure includes: (A) acquiring, via a network, identification information for identifying a user or a terminal of the user, and dispatch request information that indicates a dispatch request for an autonomous vehicle issued by the user; (B) selecting the autonomous vehicle to be dispatched to the user from among a plurality of autonomous vehicles, based on the dispatch request information; and (C) assigning a control right for the selected autonomous vehicle, to the user or the terminal, based on the identification information.

The dispatch request information may include dispatch location information that indicates a dispatch location to which the autonomous vehicle is to be dispatched. The control right may be set in such a way that the selected autonomous vehicle can be controlled by the user when the selected autonomous vehicle is located at the dispatch location or within a first range from the dispatch location.

The control right may be restricted to control with which the selected autonomous vehicle is made to move within a predetermined movement range from the dispatch location.

In the (A), the identification information and the dispatch request information may be acquired from the terminal via the network. In the (B), the autonomous vehicle may be selected based on a vehicle information database in which location information of the plurality of autonomous vehicles is recorded, and the dispatch location information.

In the (A), in addition, destination information that indicates a destination to which the autonomous vehicle is to transport the user may be acquired via the network.

The control right may be set in such a way that it is not possible for movement of the selected autonomous vehicle to be controlled by the user after the user has boarded the selected autonomous vehicle. The control right may be set in such a way that it is once again possible for movement of the selected autonomous vehicle to be controlled by the user when the selected autonomous vehicle is located at the destination or within a second range from the destination. The control right may be set in such a way that it is not possible for movement of the selected autonomous vehicle to be controlled by the user after the user has alighted from the selected autonomous vehicle.

The control right may be set in such a way that it is not possible for movement of the selected autonomous vehicle to be controlled by the user after the user has loaded a package onto the selected autonomous vehicle.

The selected autonomous vehicle may be an autonomous vehicle that transports a package to be received by the user. The control right may be set in such a way that it is not possible for movement of the selected autonomous vehicle to be controlled by the user after the user has unloaded the package from the selected autonomous vehicle.

A method according to an aspect of the present disclosure includes: (A) acquiring, via a network, first identification information for identifying a first user or a first terminal of the first user, and first dispatch request information that indicates a dispatch request for an autonomous vehicle issued by the first user; (B) selecting the autonomous vehicle to be dispatched to the first user from among a plurality of autonomous vehicles, based on the first dispatch request information; (C) assigning a first control right for the selected autonomous vehicle, to the first user or the first terminal, based on the first identification information; and (D) assigning a second control right for the selected autonomous vehicle, to a second user or a second terminal of the second user. The first dispatch request information includes first dispatch location information that indicates a first dispatch location to which the autonomous vehicle is to be dispatched. The first control right is set in such a way that movement of the selected autonomous vehicle can be controlled by the first user when the selected autonomous vehicle is located at the first dispatch location or within a first range from the first dispatch location. The second control right is set in such a way that movement of the selected autonomous vehicle can be controlled by the second user when the selected autonomous vehicle is located at a second dispatch location or within a second range from the second dispatch location.

In the (A), in addition, second identification information for identifying the second user or the second terminal of the second user, and second dispatch request information that indicates a dispatch request for an autonomous vehicle issued by the second user, may be acquired via the network. In the (B), the autonomous vehicle to be dispatched to the first and second users may be selected from among a plurality of autonomous vehicles, based on the first and second dispatch request information. The second dispatch request information may include second dispatch location information that indicates the second dispatch location to which the autonomous vehicle is to be dispatched.

The first control right may be set in such a way that it is not possible for movement of the selected autonomous vehicle to be controlled by the first user after the first user has loaded a package onto the selected autonomous vehicle. The second control right may be set in such a way that it is not possible for movement of the selected autonomous vehicle to be controlled by the second user after the second user has unloaded the package from the selected autonomous vehicle.

Alternatively, a valid period from the control rights being assigned to the users or the terminals may be set for the control rights.

What is claimed is:

1. A method comprising:
    acquiring, by a server and via a network, identification information for identifying a user or a terminal of the user, and dispatch request information that indicates a dispatch request for an autonomous vehicle issued by the user and a target stopping location;
    selecting, by the server, the autonomous vehicle to be dispatched to the user from among a plurality of autonomous vehicles, based on the dispatch request information; and
    assigning, by the server, a control right for the selected autonomous vehicle, to the user or the terminal, based on the identification information after the autonomous vehicle stops at the target stopping location, wherein
    the control right grants the user to control, via the terminal and while the user is outside of the selected autonomous vehicle, a movement of the selected autonomous vehicle within a predetermined movement range with respect to the target stopping location, and
    the selected autonomous vehicle performs a movement operation within the predetermined movement range with respect to the target stopping location in accordance to instruction provided by the user or the terminal of the user while the user is outside of the selected autonomous vehicle.

2. The method according to claim 1, wherein
    the dispatch request information includes dispatch location information that indicates a dispatch location to which the autonomous vehicle is to be dispatched, the target stopping location including the dispatch location, and
    the control right is set in such a way that the selected autonomous vehicle is controllable by the user when the selected autonomous vehicle is located at the dispatch location or within a first range from the dispatch location.

3. The method according to claim 2, wherein
    the control right is restricted to control with which the selected autonomous vehicle is made to move within the predetermined movement range from the dispatch location.

4. The method according to claim 3, wherein
    the identification information and the dispatch request information are acquired from the terminal via the network, and
    the autonomous vehicle is selected based on the dispatch location information, and location information of the plurality of autonomous vehicles, the location information being recorded in a vehicle information database.

5. The method according to claim 3, wherein
    the control right is set in such a way that the selected autonomous vehicle is uncontrollable by the user after the user has boarded the selected autonomous vehicle.

6. The method according to claim 3, further comprising:
    acquiring, via the network, destination information that indicates a destination to which the autonomous vehicle is to transport the user, wherein
    the control right is set in such a way that movement of the selected autonomous vehicle is controllable by the user when the selected autonomous vehicle is located at the destination or within a second range from the destination.

7. The method according to claim 5, further comprising:
    acquiring, via the network, destination information that indicates a destination to which the autonomous vehicle is to transport the user, wherein
    the control right is set in such a way that movement of the selected autonomous vehicle is controllable by the user when the selected autonomous vehicle is located at the destination or within a second range from the destination.

8. The method according to claim 7, wherein
the control right is set in such a way that the movement of the selected autonomous vehicle is uncontrollable by the user after the user has alighted from the selected autonomous vehicle.

9. The method according to claim 3, wherein
the control right is set in such a way that movement of the selected autonomous vehicle is controllable by the user after the user has loaded a package onto the selected autonomous vehicle.

10. The method according to claim 3, wherein
the selected autonomous vehicle is an autonomous vehicle that transports a package to be received by the user, and
the control right is set in such a way that movement of the selected autonomous vehicle is controllable by the user after the user has unloaded the package from the selected autonomous vehicle.

11. The method according to claim 2, wherein
the user, the terminal, the control right, and the dispatch location are a first user, a first terminal, a first control right, and a first dispatch location, respectively,
the method further comprises assigning a second control right for the selected autonomous vehicle to a second user or a second terminal of the second user,
the first control right is set in such a way that movement of the selected autonomous vehicle is controllable by the first user when the selected autonomous vehicle is located at the first dispatch location or within the first range from the first dispatch location, and
the second control right is set in such a way that the movement of the selected autonomous vehicle is controllable by the second user when the selected autonomous vehicle is located at a second dispatch location or within a second range from the second dispatch location.

12. The method according to claim 11, wherein
the first control right is set in such a way that the movement of the selected autonomous vehicle is uncontrollable by the first user after the first user has loaded a package onto the selected autonomous vehicle, and
the second dispatch location is a transport destination for the package.

13. The method according to claim 12, wherein
the second control right is set in such a way that the movement of the selected autonomous vehicle is uncontrollable by the second user after the second user has unloaded the package from the selected autonomous vehicle.

14. The method according to claim 2, wherein
a valid period for the control right being assigned to the user or the terminal is set for the control right.

15. A computer comprising:
a processor; and
a memory having recorded thereon a program for causing the processor to execute the method according to claim 1.

16. A non-transitory recording medium having recorded thereon a program for causing a processor to execute the method according to claim 1.

17. The method according to claim 1, wherein the control right allows the user to specify, via the terminal, a direction of the movement with respect to the target stopping location.

18. The method according to claim 1, wherein the control right allows the user to specify, via the terminal, a distance of the movement with respect to the target stopping location.

19. The method according to claim 1, wherein the control right limits the movement operation of the selected autonomous vehicle to move along a linear axis with respect to the target stopping location in a direction selected by the user.

* * * * *